US012005664B2

(12) United States Patent
Hartmann et al.

(10) Patent No.: US 12,005,664 B2
(45) Date of Patent: Jun. 11, 2024

(54) SYSTEMS AND METHODS FOR MANUFACTURING A PORTION OF AN ARTICLE OF FOOTWEAR FROM A MOLD

(71) Applicant: PUMA SE, Herzogenaurach (DE)

(72) Inventors: Matthias Hartmann, Forchheim (DE); Reinhold Sussmann, Scheinfeld (DE)

(73) Assignee: PUMA SE, Herzogenaurach (DE)

( * ) Notice: Subject to any disclaimer, the term of this patent is extended or adjusted under 35 U.S.C. 154(b) by 79 days.

(21) Appl. No.: 17/694,914

(22) Filed: Mar. 15, 2022

(65) Prior Publication Data

US 2022/0297401 A1 Sep. 22, 2022

Related U.S. Application Data

(60) Provisional application No. 63/161,634, filed on Mar. 16, 2021.

(51) Int. Cl.
*B29D 35/12* (2010.01)
*B29D 35/00* (2010.01)

(52) U.S. Cl.
CPC ....... *B29D 35/122* (2013.01); *B29D 35/0018* (2013.01); *B29D 35/128* (2013.01)

(58) Field of Classification Search
CPC . B29D 35/122; B29D 35/0018; B29D 35/128
See application file for complete search history.

(56) References Cited

U.S. PATENT DOCUMENTS

| | | | | |
|---|---|---|---|---|
| 5,972,257 A | * | 10/1999 | Liu | B29D 35/0009 264/161 |
| 10,299,722 B1 | * | 5/2019 | Tran | B33Y 80/00 |
| 2017/0173872 A1 | * | 6/2017 | McCall | B29C 64/124 |
| 2020/0238626 A1 | * | 7/2020 | Bleicher | B33Y 30/00 |

* cited by examiner

*Primary Examiner* — Alison L Hindenlang
*Assistant Examiner* — Erica Hartsell Funk
(74) *Attorney, Agent, or Firm* — Quarles & Brady LLP

(57) ABSTRACT

A method for manufacturing a midsole of an article of footwear includes generating a positive model of a midsole. The positive model includes a region of empty volume that defines an aperture or channel. The method further includes creating a negative model based on the positive model, and printing, layer by layer, a negative mold to form a physical representation of the negative model. The negative mold includes a region of solid volume that corresponds with the region of empty volume in the positive model. The method further includes supplying a midsole material to the negative mold to form the midsole. The midsole includes a midsole aperture or channel formed therein by the region of solid volume in the negative mold.

21 Claims, 28 Drawing Sheets

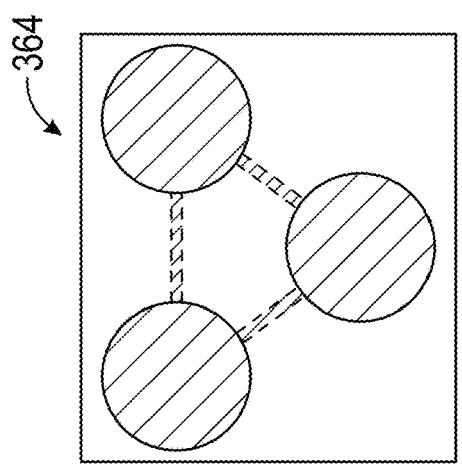
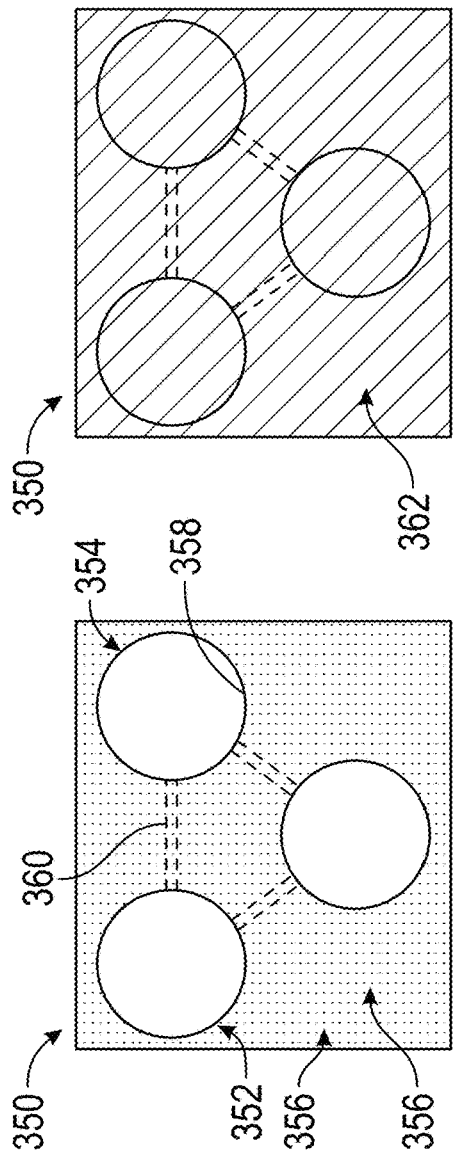
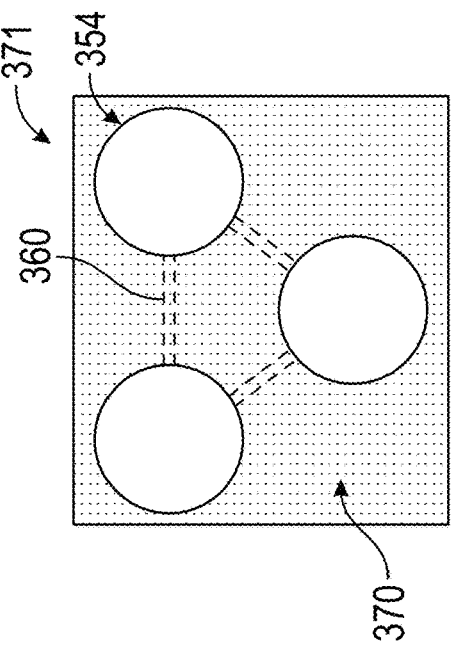
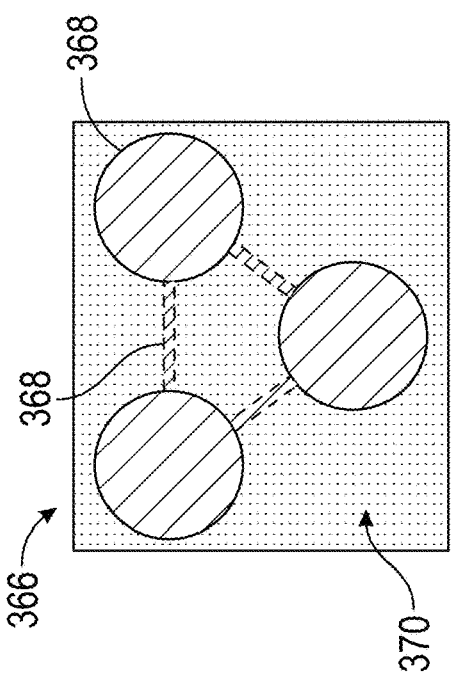

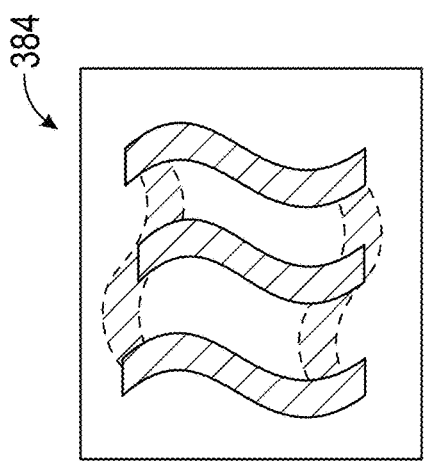
FIG. 16
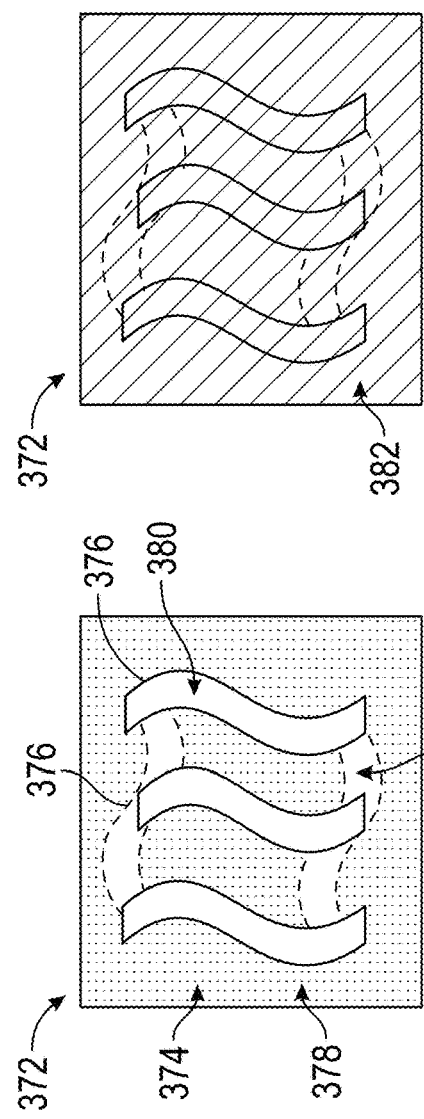
FIG. 15
FIG. 14
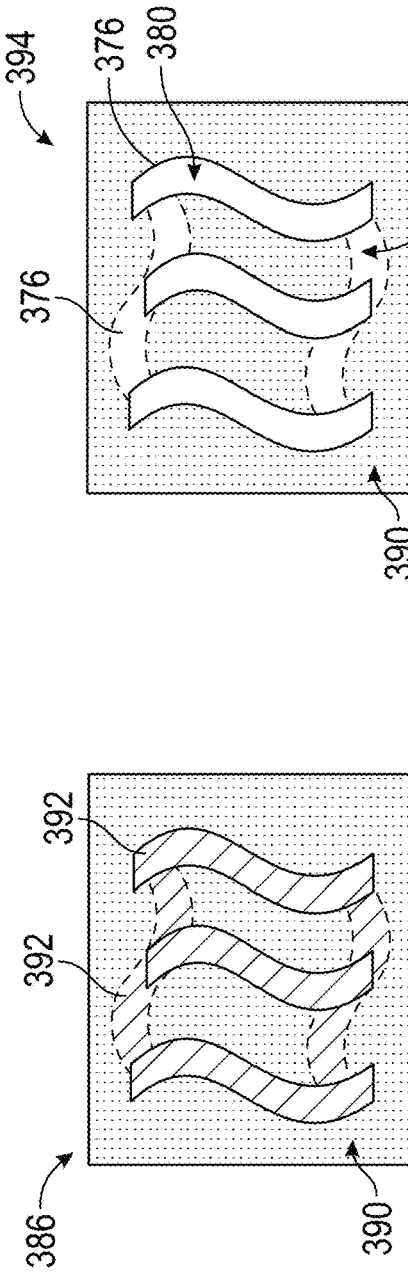
FIG. 18
FIG. 17

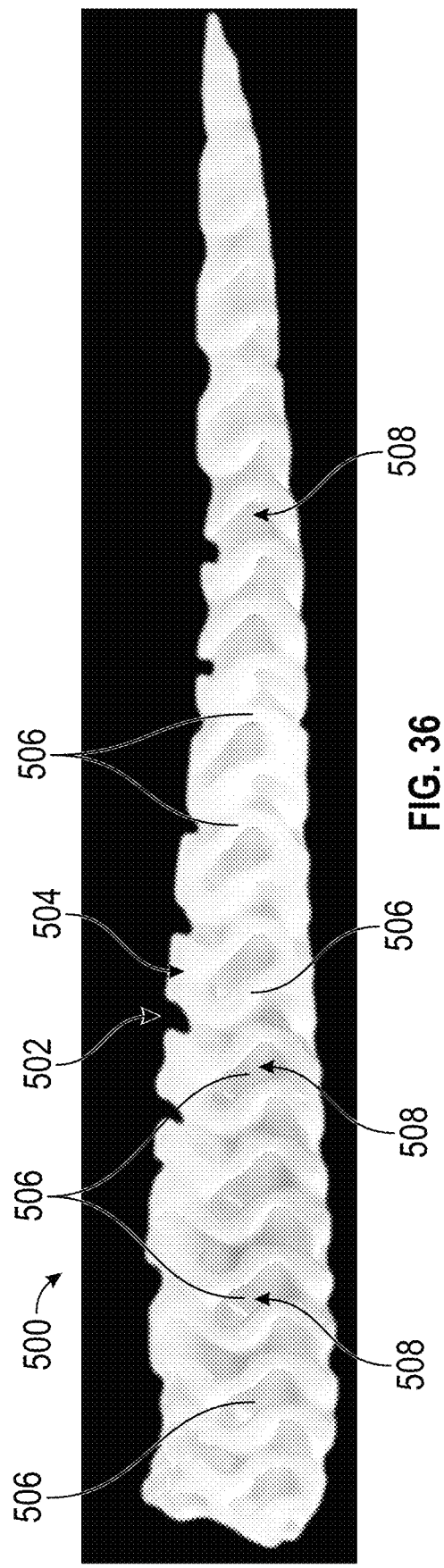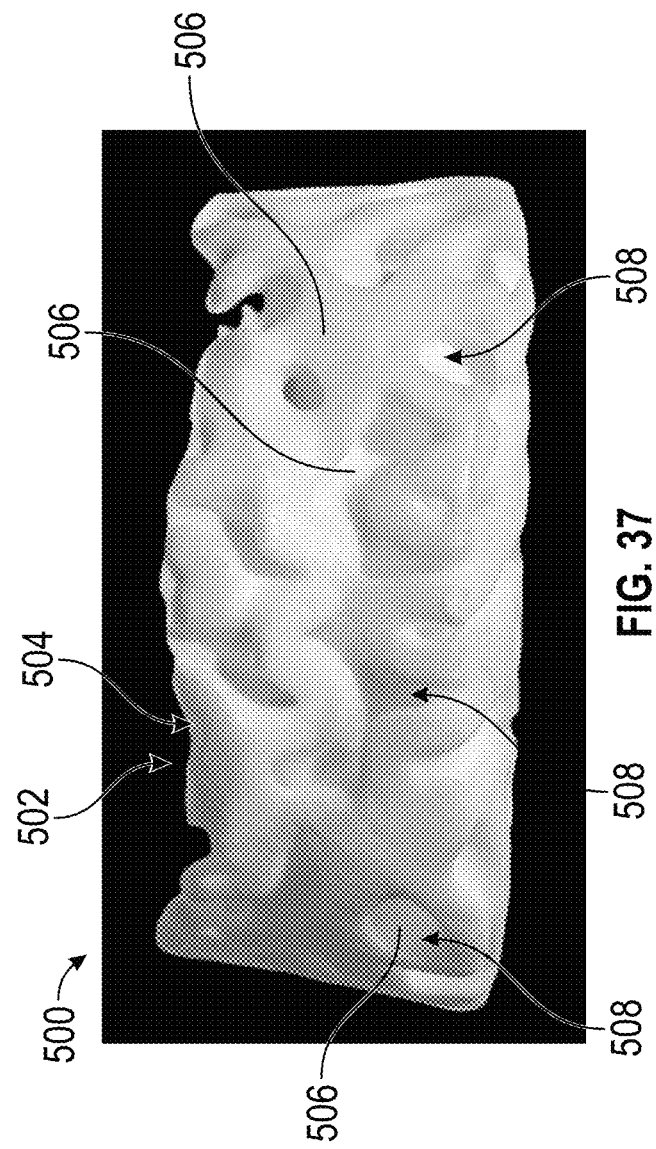

SYSTEMS AND METHODS FOR MANUFACTURING A PORTION OF AN ARTICLE OF FOOTWEAR FROM A MOLD

CROSS REFERENCE TO RELATED APPLICATIONS

The present application is based on and claims priority to U.S. Provisional Patent Application No. 63/161,634, filed Mar. 16, 2021, which is incorporated herein by reference in its entirety.

REFERENCE REGARDING FEDERALLY SPONSORED RESEARCH OR DEVELOPMENT

Not applicable.

SEQUENCE LISTING

Not applicable.

BACKGROUND

1. Field of the Invention

The present disclosure relates generally to manufacturing a portion of an article of footwear from a mold.

2. Description of the Background

Many conventional shoes or articles of footwear generally comprise an upper and a sole attached to a lower end of the upper. Conventional shoes further include an internal space, e.g., a void or cavity, which is created by interior surfaces of the upper and sole, that receives a foot of a user before securing the shoe to the foot. The sole is attached to a lower surface of the upper and is positioned between the upper and the ground. As a result, the sole typically provides stability and cushioning to the user when the shoe is being worn and/or is in use. In some instances, the sole may include multiple components, such as an outsole, a midsole, and an insole. The outsole may provide traction to a bottom surface of the sole, and the midsole may be attached to an inner surface of the outsole.

Typically, at least a portion of the sole is formed from a mold, but conventional molding processes are limited by geometry of the formed sole. The soles formed from a mold in conventional footwear articles are accordingly limited to simplistic geometries that are capable of being produced with conventional molding processes.

SUMMARY

An article of footwear, as described herein, may have various configurations. The article of footwear may have an upper and a sole structure connected to the upper. In some embodiments, the sole structure may include a midsole that is formed from a mold. The mold may be formed by an additive manufacturing process (e.g., three-dimensional printing (3D printing)), which allows the midsole to be molded with a complex structure/features (e.g., undercuts, overhangs, lattice structures, etc.).

In some embodiments, a method for manufacturing a midsole of an article of footwear includes generating a positive model of a midsole. The positive model includes a region of empty volume that defines an aperture or channel. The method further includes creating a negative model based on the positive model, and printing, layer by layer, a negative mold to form a physical representation of the negative model. The negative mold includes a region of solid volume that corresponds with the region of empty volume in the positive model. The method further includes supplying a midsole material to the negative mold to form the midsole. The midsole includes a midsole aperture or channel formed therein by the region of solid volume in the negative mold.

In some embodiments, a positive model includes a lattice structure with a unit cell that defines a repeating pattern, and wherein the repeating pattern includes an aperture or channel.

In some embodiments, a region of solid volume in a negative mold defines a mold repeating pattern that is based on a lattice structure in a positive model.

In some embodiments, a midsole includes a midsole lattice structure with a midsole unit cell that is formed by a mold repeating pattern and that includes a midsole aperture or channel.

In some embodiments, the method further includes arranging a negative mold within a mold base, and enclosing the negative mold within the mold base using a cover plate.

In some embodiments, a region of empty volume in a positive model is defined by an inner surface, and the inner surface is a minimal surface in a gyroid pattern.

In some embodiments, a negative mold is printed, layer by layer, by an additive manufacturing system.

In some embodiments, a method for manufacturing a midsole of an article of footwear includes generating a positive model of a midsole. The positive model includes a surface defining an aperture or channel. The method further includes creating a negative model based on the positive model, and printing, layer by layer, a negative mold to form a physical representation of the negative model. The negative mold includes a region of solid volume that corresponds with the aperture or channel in the positive model. The method further includes supplying a midsole material to the negative mold to form the midsole, so that the midsole material expands throughout and fills the negative mold, and forming a midsole from the midsole material expanded throughout the negative mold. The midsole material expanding around the region of solid volume forms a midsole aperture or channel in the midsole.

In some embodiments, a surface in a positive model is a minimal surface in a gyroid pattern.

In some embodiments, a positive model includes a lattice structure with a unit cell that defines a repeating pattern, and the repeating pattern includes an aperture or channel.

In some embodiments, a region of solid volume in a negative mold defines a mold repeating pattern that is based on a lattice structure in a positive model.

In some embodiments, a midsole includes a midsole lattice structure with a midsole unit cell that is formed by a mold repeating pattern and that includes a midsole aperture or channel.

In some embodiments, the method further includes arranging the negative mold within a mold base, and enclosing the negative mold within the mold base using a cover plate.

In some embodiments, a method for manufacturing a midsole of an article of footwear includes generating a positive model of a midsole. The positive model includes an aperture or channel. The method further includes creating a negative model based on the positive model, and printing, layer by layer, a negative mold to form a physical representation of the negative model. The negative mold includes a region of solid volume that corresponds with the aperture or channel in the positive model. The method further includes arranging the negative mold within a mold base, injecting a midsole material into the negative mold to form the midsole to expand and fill the negative mold with the midsole material, and forming the midsole from the midsole material expanded and filled throughout the negative mold. The midsole material expanding around the region of solid volume forms a midsole aperture or channel in the midsole.

In some embodiments, an aperture or channel is defined by an inner surface, and the inner surface in a positive model is a minimal surface in a gyroid pattern.

In some embodiments, a positive model includes a lattice structure with a unit cell that defines a repeating pattern, and the repeating pattern includes an aperture or channel.

In some embodiments, a region of solid volume in the negative mold defines a mold repeating pattern that is based on a lattice structure in a positive model.

In some embodiments, a midsole includes a midsole lattice structure with a midsole unit cell that is formed by a mold repeating pattern and that includes a midsole aperture or channel.

In some embodiments, arranging a negative mold within a mold base comprises printing, layer by layer, the negative mold and the base mold as a unitary component.

In some embodiments, a negative mold and a mold base are formed as separate components.

In some embodiments, a mold generating system for an article of footwear includes a print head configured to deposit, fuse, melt, or bind a material layer by layer, and a controller in communication with the print head. The controller is configured to receive or generate a positive model of a midsole for the article of footwear, create a negative model based on the positive model, and instruct the print head to print, layer by layer, a negative mold that forms a physical representation of the negative model.

In some embodiments, a positive model includes an aperture or channel.

In some embodiments, an aperture or channel forms a region of empty volume in a positive model.

In some embodiments, a negative mold includes a region of solid volume that corresponds with a region of empty volume in a positive model.

In some embodiments, an aperture or channel in a positive model is defined by an inner surface, and the inner surface is a minimal surface in a gyroid pattern.

In some embodiments, a positive model includes a lattice structure with a unit cell that defines a repeating pattern, and the repeating pattern includes an aperture or channel.

In some embodiments, a negative mold includes a region of solid volume that defines a mold repeating pattern that is based on a lattice structure in a positive model.

In some embodiments, a region of solid volume in a negative mold is configured to form a midsole lattice structure in a midsole material that is supplied to a negative mold.

In some embodiments, a negative mold is printed from a sand, wax, or resin material.

In some embodiments, a controller is configured to generate a positive model in response to input data that includes information relating to an end user's physical characteristics.

In some embodiments, a method of forming a mold for an article of footwear includes receiving or generating a positive model of a midsole for the article of footwear, create a negative model based on the positive model, printing, layer by layer, a negative mold that forms a physical representation of the negative model.

In some embodiments, a positive model includes an aperture or channel.

In some embodiments, an aperture or channel forms a region of empty volume in a positive model.

In some embodiments, a negative mold includes a region of solid volume that corresponds with the region of empty volume in a positive model.

In some embodiments, an aperture or channel in the positive model is defined by an inner surface, and the inner surface is a minimal surface in a gyroid pattern.

In some embodiments, a positive model includes a lattice structure with a unit cell that defines a repeating pattern, and the repeating pattern includes an aperture or channel.

In some embodiments, a negative mold includes a region of solid volume that defines a mold repeating pattern that is based on a lattice structure in a positive model.

In some embodiments, a region of solid volume in a negative mold is configured to form a midsole lattice structure in a midsole material that is supplied to a negative mold.

In some embodiments, a negative mold is printed from a sand, wax, or resin material.

In some embodiments, a controller is configured to generate the positive model in response to input data that includes information relating to an end user's physical characteristics.

In some embodiments, a method of forming a mold for an article of footwear with a mold generating system includes generating a positive model of a midsole, creating a negative model based on the positive model, and printing, layer by layer, a scaled negative mold to form a physical representation of the negative model. The scaled negative mold defines a scaled down size relative to a final size of the midsole. The method further includes supplying a midsole material to the negative mold to form the midsole, and expanding the midsole from the scaled down size to a final size.

In some embodiments, a scaled down size is about 70% smaller than a final size.

In some embodiments, a scaled down size is about 25% smaller than a final size.

In some embodiments, a scaled down size is between about 70% and about 50% smaller than a final size.

In some embodiments, a positive model includes a region of empty volume that defines an aperture or channel.

In some embodiments, an aperture or channel in a positive model is defined by an inner surface, and the inner surface is a minimal surface in a gyroid pattern.

In some embodiments, a negative mold includes a region of solid volume that corresponds with a region of empty volume in a positive model.

In some embodiments, a positive model includes a lattice structure with a unit cell that defines a repeating pattern, and wherein the repeating pattern includes an aperture or channel.

In some embodiments, a negative mold includes a region of solid volume that defines a mold repeating pattern that is based on a lattice structure in a positive model.

In some embodiments, a region of solid volume in the negative mold is configured to form a midsole lattice structure in a midsole material that is supplied to a negative mold.

In some embodiments, expanding the midsole from the scaled down size to the final size comprises expanding the midsole from the scaled down size to an intermediate size; placing the midsole defining the intermediate size into a forming mold, and expanding the midsole to the final size within the forming mold.

In some embodiments, a mold generating system for an article of footwear includes a print head configured to deposit, fuse, melt, or bind a material layer by layer, and a controller in communication with the print head. The controller being configured to generate a positive model of a midsole, create a negative model based on the positive model, and instruct the print head to print, layer by layer, a scaled negative mold to form a physical representation of the negative model. The scaled negative mold defines a scaled down size relative to a final size of the midsole. A midsole material is supplied to the negative mold to form the midsole, and the midsole is expanded from the scaled down size to a final size.

In some embodiments, a scaled down size is about 70% smaller than a final size.

In some embodiments, a scaled down size is about 25% smaller than a final size.

In some embodiments, a scaled down size is between about 70% and about 50% smaller than a final size.

In some embodiments, a positive model includes a region of empty volume that defines an aperture or channel.

In some embodiments, an aperture or channel in a positive model is defined by an inner surface, and the inner surface is a minimal surface in a gyroid pattern.

In some embodiments, a negative mold includes a region of solid volume that corresponds with a region of empty volume in a positive model.

In some embodiments, a positive model includes a lattice structure with a unit cell that defines a repeating pattern, and the repeating pattern includes an aperture or channel.

In some embodiments, a negative mold includes a region of solid volume that defines a mold repeating pattern that is based on a lattice structure in a positive model.

In some embodiments, a region of solid volume in a negative mold is configured to form a midsole lattice structure in a midsole material that is supplied to a negative mold.

Other aspects of the articles of footwear or portions of the articles of footwear described herein, including features and advantages thereof, will become apparent to one of ordinary skill in the art upon examination of the figures and detailed description herein. Therefore, all such aspects of the articles of footwear are intended to be included in the detailed description and this summary.

BRIEF DESCRIPTION OF THE DRAWINGS

FIG. 9 is a schematic illustration of a portion of a positive model of a midsole including interconnected openings;

FIG. 10 is a schematic illustration of an intersection of a portion of a filler volume and the portion of the positive model of FIG. 9;

FIG. 11 is a schematic illustration of a portion of a negative mold based on the portion of the positive model of FIG. 9;

FIG. 12 is a schematic illustration of the portion of the negative mold of FIG. 11 being filled with a material;

FIG. 13 is a schematic illustration of a portion of a midsole formed from the portion of the negative mold of FIG. 11;

FIG. 14 is a schematic illustration of a portion of a positive model of a midsole including interconnected differential surfaces;

FIG. 15 is a schematic illustration of an intersection of a portion of a filler volume and the portion of the positive model of FIG. 14;

FIG. 16 is a schematic illustration of a portion of a negative mold based on the portion of the positive model of FIG. 14;

FIG. 17 is a schematic illustration of the portion of the negative mold of FIG. 16 being filled with a material;

FIG. 18 is a schematic illustration of a portion of a midsole formed from the portion of the negative mold of FIG. 16;

FIG. 36 is a side view of a formed midsole having a gyroid pattern;

FIG. 37 is a rear view of the formed midsole of FIG. 36;

DETAILED DESCRIPTION OF THE DRAWINGS

Figure 1:
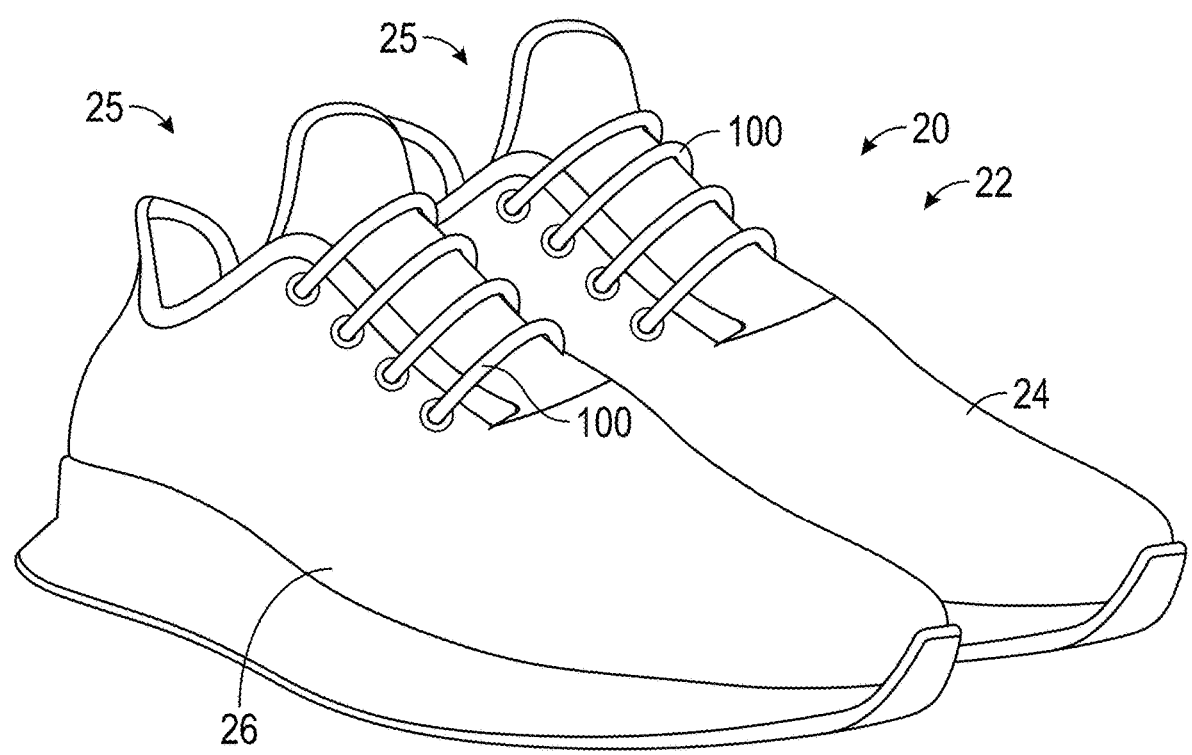
FIG. 1 is a perspective view of a footwear assembly including an article of footwear.
Figure 2:
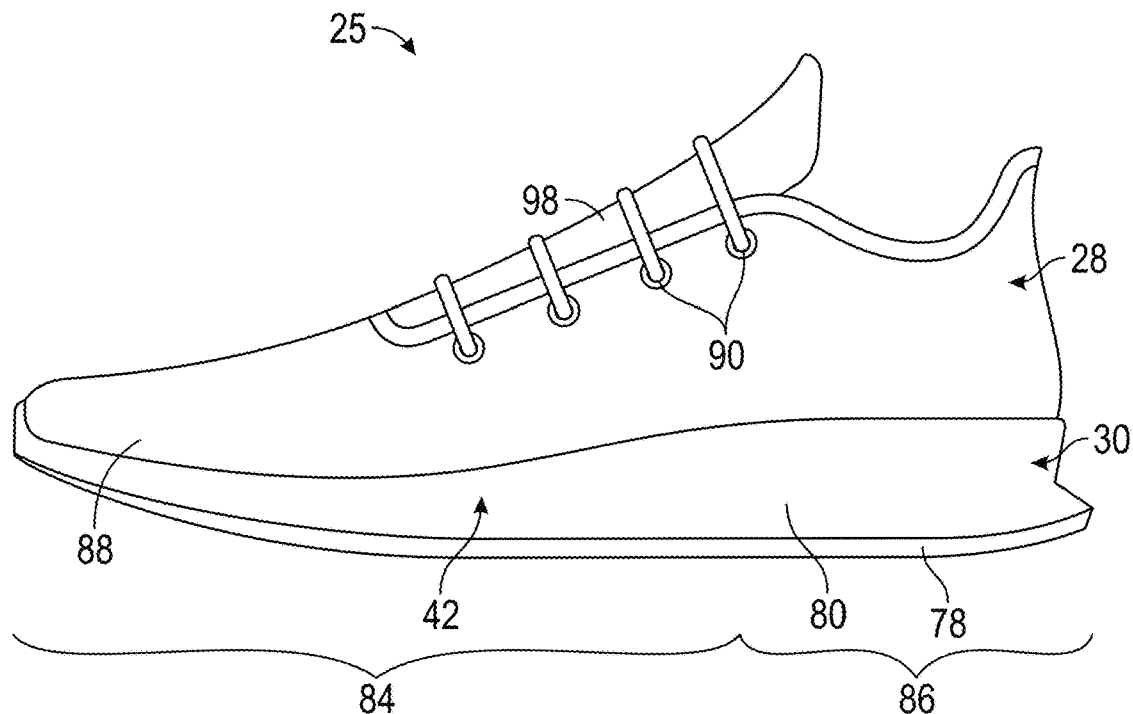
FIG. 2 is a left or lateral side view of an article of footwear in the form of a left shoe.

The following discussion and accompanying figures disclose various embodiments or configurations of a shoe. Although embodiments are disclosed with reference to a sports shoe, such as a running shoe, tennis shoe, basketball shoe, etc., concepts associated with embodiments of the shoe may be applied to a wide range of footwear and footwear styles, including basketball shoes, cross-training shoes, football shoes, golf shoes, hiking shoes, hiking boots, ski and snowboard boots, soccer shoes and cleats, walking shoes, and track cleats, for example. Concepts of the shoe may also be applied to articles of footwear that are considered non-athletic, including dress shoes, sandals, loafers, slippers, and heels. In addition to footwear, particular concepts described herein may also be applied and incorporated in other types of articles, including apparel or other athletic equipment, such as helmets, padding or protective pads, shin guards, and gloves. Even further, particular concepts described herein may be incorporated in cushions, backpacks, suitcases, backpack straps, golf clubs, or other consumer or industrial products. Accordingly, concepts described herein may be utilized in a variety of products.

The term "about," as used herein, refers to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values±5% of the numeric value that the term precedes.

The present disclosure is directed to an article of footwear and/or specific components or portions of the article of footwear, such as a midsole, an outsole or a sole structure. The article of footwear may include an upper that is at least partially formed from a knitted component, a woven textile, a non-woven textile, leather, mesh, suede, and/or a combination of one or more of the aforementioned materials. The knitted component may be made by knitting of yarn, the woven textile by weaving of yarn, and the non-woven textile by manufacture of a unitary non-woven web. Knitted textiles include textiles formed by way of warp knitting, weft knitting, flat knitting, circular knitting, and/or other suitable knitting operations. The knit textile may have a plain knit structure, a mesh knit structure, and/or a rib knit structure, for example. Woven textiles include, but are not limited to, textiles formed by way of any of the numerous weave forms, such as plain weave, twill weave, satin weave, dobbin weave, jacquard weave, double weaves, and/or double cloth weaves, for example. Non-woven textiles include textiles made by air-laid and/or spun-laid methods, for example. The upper may comprise a variety of materials, such as a first yarn, a second yarn, and/or a third yarn, which may have varying properties or varying visual characteristics.

FIG. 1 depicts a footwear assembly 20 that includes a pair of shoes 22 that are wearable by a user. In some embodiments, the footwear assembly 20 may include a left shoe 24 and a right shoe 26. The left shoe 24 and the right shoe 26 may be similar in all material aspects, except that the left shoe 24 and the right shoe 26 are sized and shaped to receive a left foot and a right foot of a user, respectively. For ease of disclosure, a single shoe or article of footwear 25 will be referenced to describe aspects of the disclosure. In some figures, the article of footwear 25 is depicted as a right shoe, and in some figures the article of footwear is depicted as a left shoe. The disclosure below with reference to the article of footwear 25 is applicable to both the left shoe 24 and the right shoe 26

FIGS. 2-5 depict an exemplary embodiment of the article of footwear 25 including an upper 28 and a sole assembly 30. As will be further discussed herein, the upper 28 is attached to the sole assembly 30 and together define an interior cavity 32 (see FIGS. 4 and 5) into which a foot of a user may be inserted. For reference, the article of footwear 25 defines a forefoot region 34, a midfoot region 36, and a heel region 38 (see FIG. 5). The forefoot region 34 generally corresponds with portions of the article of footwear 25 that encase portions of the foot that include the toes, the ball of the foot, and joints connecting the metatarsals with the toes or phalanges. The midfoot region 36 is proximate and adjoining the forefoot region 34, and generally corresponds with portions of the article of footwear 25 that encase the arch of a foot, along with the bridge of a foot. The heel region 38 is proximate and adjoining the midfoot region 36 and generally corresponds with portions of the article of footwear 25 that encase rear portions of the foot, including the heel or calcaneus bone, the ankle, and/or the Achilles tendon.

Figure 3:
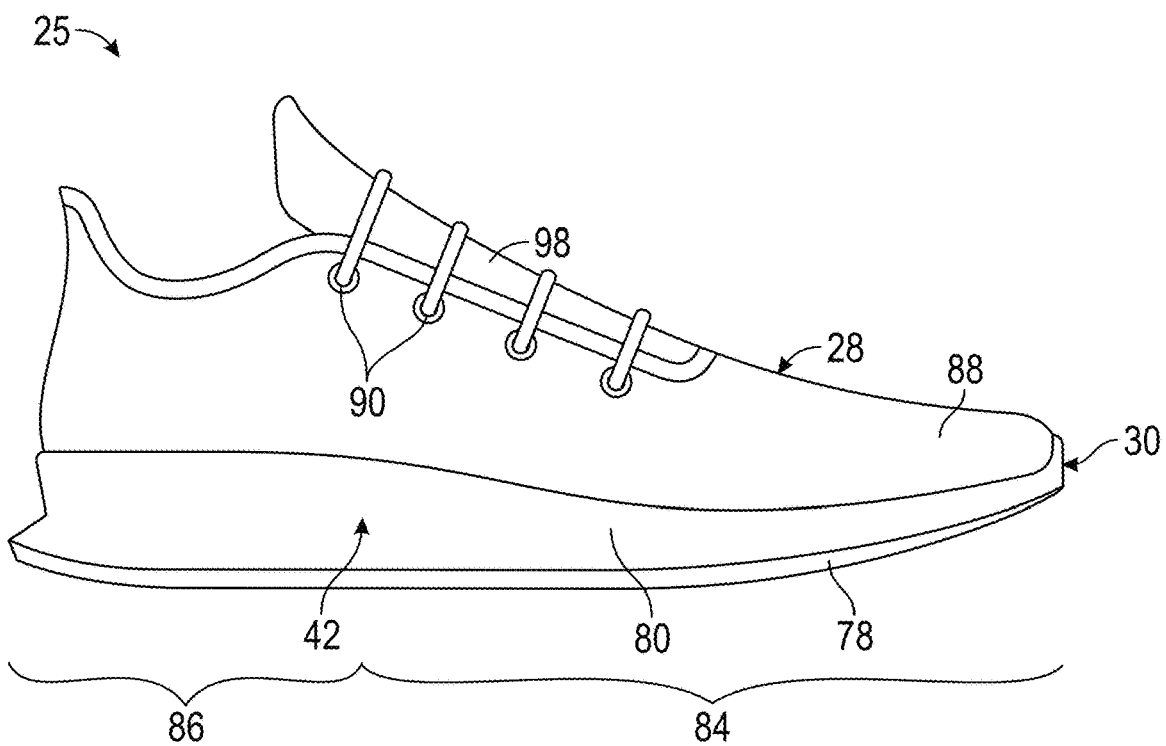
FIG. 3 is a right or medial side view of the article footwear of FIG. 2.
Figure 4:
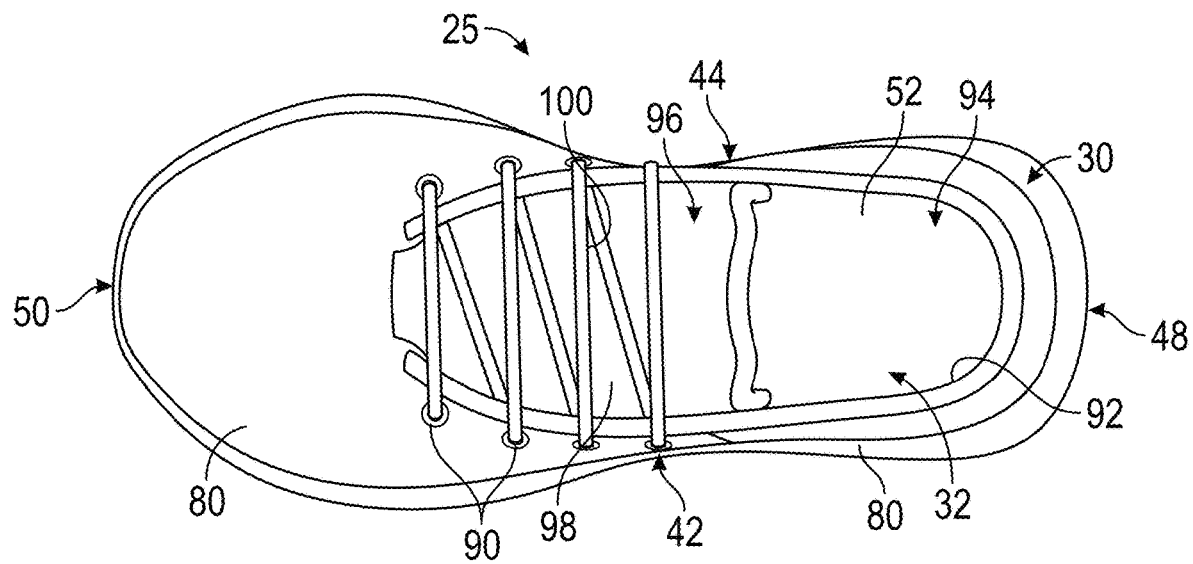
FIG. 4 is a top view of the article of footwear of FIG. 2.

The article of footwear 25 defines a lateral side 42 (see FIG. 2) and a medial side 44 (see FIG. 3). When a user is wearing the shoes, the lateral side 42 corresponds with an outside-facing portion of the article of footwear 25 while the medial side 44 corresponds with an inside-facing portion of the article of footwear 25. As such, the left shoe 24 and the right shoe 26 have opposing lateral sides 42 and medial sides 44, such that the medial sides 44 are closest to one another when a user is wearing the shoes 22, while the lateral sides 42 are defined as the sides that are farthest from one another while the shoes 22 are being worn.

Figure 5:
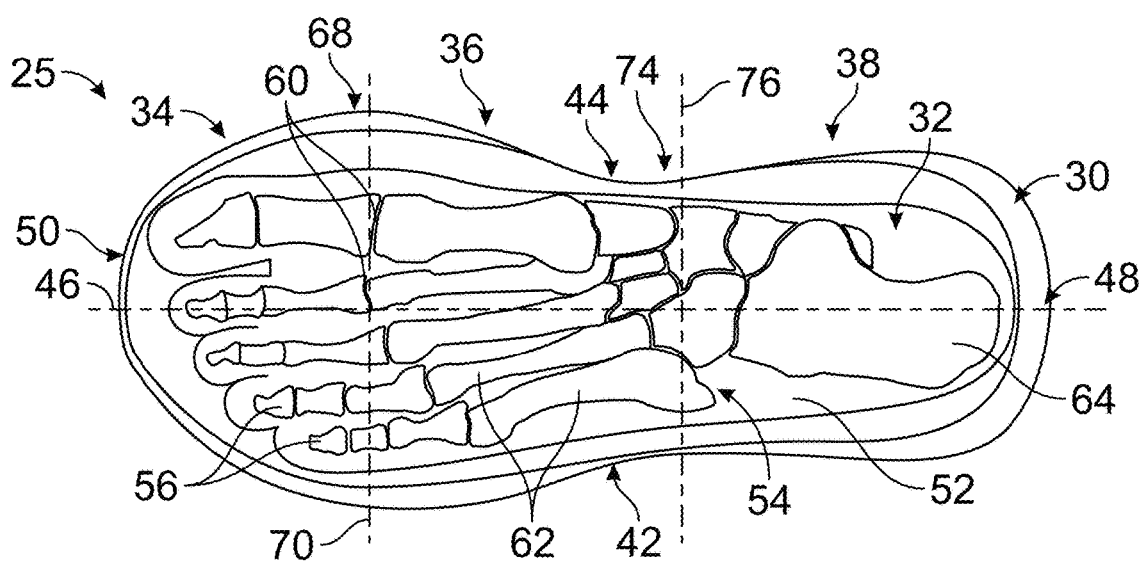
FIG. 5 is a top plan view of the article of footwear of FIG. 2, with an upper removed and a user's skeletal foot structure overlaid on the article of footwear.

The medial side 44 and the lateral side 42 adjoin one another along a longitudinal central plane or axis 46 of the article of footwear 25 (see FIG. 5). As will be further discussed herein, the longitudinal central plane or axis 46 may demarcate a central, intermediate axis between the medial side 44 and the lateral side 42 of the article of footwear 25. Put differently, the longitudinal plane or axis 46 may extend between a rear distal end 48 of the article of footwear 25 and a front distal end 50 of the article of footwear 25 and may continuously define a middle of an insole 52, the sole assembly 30, and/or the upper 28 of the article of footwear 25, i.e., the longitudinal plane or axis 46 is a straight axis extending through the rear distal end 48 of the heel region 38 to the front distal end 50 of the forefoot region 34.

The forefoot region 34 may generally correspond with portions of the article of footwear 25 that encase portions of a foot 54 that include the toes or phalanges 56, the ball of the foot 54, and one or more of the joints 60 that connect the metatarsals 62 of the foot 54 with the toes or phalanges 56 (see FIG. 5). The midfoot region 36 is proximate and adjoins the forefoot region 34. The midfoot region 36 generally corresponds with portions of the article of footwear 25 that encase an arch of a foot 54, along with a bridge of the foot 54. The heel region 38 is proximate to the midfoot region 36 and adjoins the midfoot region 36. The heel region 38 generally corresponds with portions of the article of footwear 25 that encase rear portions of the foot 54, including the heel or calcaneus bone 64, the ankle (not shown), and/or the Achilles tendon (not shown).

The forefoot region 34, the midfoot region 36, the heel region 38, the medial side 44, and the lateral side 42 are intended to define boundaries or areas of the article of footwear 25. To that end, the forefoot region 34, the midfoot region 36, the heel region 38, the medial side 44, and the lateral side 42 generally characterize sections of the article of footwear 25. Certain aspects of the disclosure may refer to portions or elements that are coextensive with one or more of the forefoot region 34, the midfoot region 36, the heel region 38, the medial side 44, or the lateral side 42. Further, both the upper 28 and the sole assembly 30 may be characterized as having portions within the forefoot region 34, the midfoot region 36, the heel region 38, and/or along the medial side 44 and/or the lateral side 42. Therefore, the upper 28 and the sole assembly 30, and/or individual portions of the upper 28 and the sole assembly 30, may include portions thereof that are disposed within the forefoot region 34, the midfoot region 36, the heel region 38, and/or along the medial side 44 and/or the lateral side 42.

The forefoot region 34 extends from the front distal end 50 to a widest portion 68 of the article of footwear 25. The widest portion 68 is defined or measured along a first line 70 that is perpendicular with respect to the longitudinal axis 46 that extends from the front distal end 50 to the rear distal end 48, which is opposite the front distal end 50. The midfoot region 36 extends from the widest portion 68 to a thinnest portion 74 of the article of footwear 25. The thinnest portion 74 of the article of footwear 25 is defined as the thinnest portion of the article of footwear 25 measured across a second line 76 that is perpendicular with respect to the longitudinal axis 46. The heel region 38 extends from the thinnest portion 74 to the rear distal end 48 of the article of footwear 25.

The medial side 44 begins at the front distal end 50 and bows outward along an inner side of the article of footwear 25 along the forefoot region 34 toward the midfoot region 36. The medial side 44 reaches the first line 70, at which point the medial side 44 bows inward, toward the central, longitudinal axis 46. The medial side 44 extends from the first line 70, i.e., the widest portion 68, toward the second line 76, i.e., the thinnest portion 74, at which point the medial side 44 enters into the midfoot region 36, i.e., upon crossing the first line 70. Once reaching the second line 76, the medial side 44 bows outward, away from the longitudinal, central axis 46, at which point the medial side 44 extends into the heel region 38, i.e., upon crossing the second line 76. The medial side 44 then bows outward and then inward toward the rear distal end 48, and terminates at a point where the medial side 44 meets the longitudinal, center axis 46.

The lateral side 42 begins at the front distal end 50 and bows outward along an outer side of the article of footwear 25 along the forefoot region 34 toward the midfoot region 36. The lateral side 42 reaches the first line 70, at which point the lateral side 42 bows inward, toward the longitudinal, central axis 46. The lateral side 42 extends from the first line 70, i.e., the widest portion 68, toward the second line 76, i.e., the thinnest portion 74, at which point the lateral side 42 enters into the midfoot region 36, i.e., upon crossing the first line 70. Once reaching the second line 76, the lateral side 42 bows outward, away from the longitudinal, central axis 46, at which point the lateral side 42 extends into the heel region 38, i.e., upon crossing the second line 76. The lateral side 42 then bows outward and then inward toward the rear distal end 48, and terminates at a point where the lateral side 42 meets the longitudinal, center axis 46.

It should be understood that numerous modifications may be apparent to those skilled in the art in view of the foregoing description, and individual components thereof, may be incorporated into numerous articles of footwear. Accordingly, aspects of the article of footwear 25 and components thereof, may be described with reference to general areas or portions of the article of footwear 25, with an understanding the boundaries of the forefoot region 34, the midfoot region 36, the heel region 38, the medial side 44, and/or the lateral side 42 as described herein may vary between articles of footwear.

However, aspects of the article of footwear 25 and individual components thereof, may also be described with reference to exact areas or portions of the article of footwear 25 and the scope of the appended claims herein may incorporate the limitations associated with these boundaries of the forefoot region 34, the midfoot region 36, the heel region 38, the medial side 44, and/or the lateral side 42 discussed herein.

With continued reference to FIGS. 2-5, the sole assembly 30 is connected or secured to the upper 28 and extends between a foot of a user and the ground when the article of footwear 25 is worn by the user. The sole assembly 30 may also include one or more components, which may include an outsole, a midsole, a heel, a vamp, a stiffening member (e.g. a carbon plate) or an insole. For example, in some embodiments, a sole assembly may include an outsole that provides structural integrity to the sole assembly, along with providing traction for a user, a midsole that provides a cushioning system, and an insole that provides support for an arch of a user.

The sole assembly 30 may be characterized by an outsole or outsole region 78, a midsole or a midsole region 80, and the insole or insole region 52. The outsole 78, the midsole 80, and the insole 52, and/or any components thereof, may include portions within the forefoot region 34, the midfoot region 36, and/or the heel region 38. Further, the outsole 78, the midsole 80, and the insole 52, and/or any components thereof, may include portions on the lateral side 42 and/or the medial side 44.

In other instances, the outsole 78 may be defined as a portion of the sole assembly 30 that at least partially contacts an exterior surface, e.g., the ground, when the article of footwear 25 is worn. The insole 52 may be defined as a portion of the sole assembly 30 that at least partially contacts a user's foot when the article of footwear is worn. Finally, the midsole 80 may be defined as at least a portion of the sole assembly 30 that extends between and connects the outsole 78 with the insole 52. In some embodiments, the outsole 78 may be fabricated from an injection molded thermoplastic material (e.g., thermoplastic polyurethane), a molded polyurethane material, or a rubber material. In some embodiments, the outsole 78 may define a shore A hardness between about 55 and about 75.

As described herein, the sole assembly 30 may be connected or secured to the upper 28. Many conventional footwear uppers are formed from multiple elements, e.g., textiles, polymer foam, polymer sheets, leather, and/or synthetic leather, which are joined through bonding or stitching at a seam. In some embodiments, the upper 28 of the article of footwear 25 is formed from a knitted structure or knitted components. In various embodiments, a knitted component may incorporate various types of yarn that may provide different properties to an upper. For example, one area of the upper 28 may be formed from a first type of yarn that imparts a first set of properties, and another area of the upper 28 may be formed from a second type of yarn that imparts a second set of properties. Using this configuration, properties of the upper 28 may vary throughout the upper 28 by selecting specific yarns for different areas of the upper 28. In some embodiments, the article of footwear 25 may include a first or mesh layer and a second or base layer. The base layer may include multiple layers, such as an outer surface 88 upon which a plurality of eyelets 90 may be provided, and an interior surface 92 that engages with a foot when a user puts on the article of footwear 25. The mesh layer and the base layer may be connected at one or more locations along the article of footwear 25.

With reference to the material(s) that comprise the upper 28, the specific properties that a particular type of yarn will impart to an area of a knitted component may at least partially depend upon the materials that form the various filaments and fibers of the yarn. For example, cotton may provide a soft effect, biodegradability, or a natural aesthetic to a knitted material. Elastane and stretch polyester may each provide a knitted component with a desired elasticity and recovery. Rayon may provide a high luster and moisture absorbent material, wool may provide a material with an increased moisture absorbance, nylon may be a durable material that is abrasion-resistant, and polyester may provide a hydrophobic, durable material.

Other aspects of a knitted component may also be varied to affect the properties of the knitted component and provide desired attributes. For example, a yarn forming a knitted component may include monofilament yarn or multifilament yarn, or the yarn may include filaments that are each formed of two or more different materials. In addition, a knitted component may be formed using a particular knitting process to impart an area of a knitted component with particular properties. Accordingly, both the materials forming the yarn and other aspects of the yarn may be selected to impart a variety of properties to particular areas of the upper 28.

In some embodiments, an elasticity of a knit structure may be measured based on comparing a width or length of the knit structure in a first, non-stretched state to a width or length of the knit structure in a second, stretched state after the knit structure has a force applied to the knit structure in a lateral direction. In further embodiments, the upper 28 may also include additional structural elements. For example, in some embodiments, a heel plate or cover (not shown) may be provided on the heel region 38 to provide added support to a heel of a user. In some instances, other elements, e.g., plastic material, logos, trademarks, etc., may also be applied and fixed to an exterior surface using glue or a thermoforming process. In some embodiments, the properties associated with the upper 28, e.g., a stitch type, a yarn type, or characteristics associated with different stitch types or yarn types, such as elasticity, aesthetic appearance, thickness, air permeability, or scuff-resistance, may be varied.

In the illustrated embodiment, the upper 28 extends upwardly from the sole assembly 30 and defines the interior cavity 32 that receives and secures a foot of a user. The upper 28 may be defined by a foot region 84 and an ankle region 86. In general, the foot region 84 extends upwardly from the sole assembly 30 and through the forefoot region 34, the midfoot region 36, and the heel region 38. The ankle region 86 is primarily located in the heel region 38; however, in some embodiments, the ankle region 86 may partially extend into the midfoot region 36.

The upper 28 extends along the lateral side 42 and the medial side 44, and across the forefoot region 34, the midfoot region 36, and the heel region 38 to house and enclose a foot of a user. When fully assembled, the upper 28 also includes the interior surface 92 and the outer surface 88. The interior surface 92 faces inward and generally defines the interior cavity 32, and the outer surface 88 of the upper 28 faces outward and generally defines an outer perimeter or boundary of the upper 28. The interior surface 92 and the outer surface 88 may comprise portions of the base and/or mesh layers disclosed above. The upper 28 also includes an opening 94 that is at least partially located in the heel region 38 of the article of footwear 25, that provides access to the interior cavity 32 and through which a foot may be inserted and removed. In some embodiments, the upper 28 may also include an instep area 96 that extends from the opening 94 in the heel region 38 over an area corresponding to an instep of a foot to an area adjacent the forefoot region 34. The instep area 96 may comprise an area similar to where a tongue 98 of the present embodiment is disposed. In some embodiments, the upper 28 does not include the tongue 98, i.e., the upper 28 is tongueless.

A lace 100 may be threaded through the plurality of eyelets 90. The lace 100 may be manipulated by a user to allow the user to modify dimensions of the upper 28, e.g., to tighten or loosen portions of the upper 28, around a foot as desired by the user. In some embodiments, the article of footwear 25 may not be provided with a manually-operated lace 100, and may instead include an automatic lacing system that is electronically operated.

As described herein, a midsole may provide cushioning and to a user wearing an article of footwear. In general, midsoles are manufactured or formed using a mold and the finished midsole is required to be demolded and removed from the mold prior to assembling into an article of footwear. The demolding requirement of the formed midsole significantly restricts the geometry of the midsole and the mold. For example, the inclusion of undercuts is not possible with conventional molding processes. And apertures, openings, interconnected winding channels, or other recesses that are not formed in a demolding direction are prohibitively complex to produce with conventional molding technologies.

The inability of conventional molding processes to produce midsoles with complex geometric features prevents the formation of midsoles with customized and improved cushioning properties. For example, the inclusion of a lattice or gyroid structure in a midsole may enable the midsole to leverage geometric shapes that provide improved cushioning properties, when compared to conventional midsole designs. And the geometric features of the lattice structure may be customized to a user's footprint, pressure points, stride, etc.

The present disclosure provides system and methods for forming or manufacturing a midsole with complex and customizable geometric features using a molding process that is not limited by midsole design. The molding process of the present disclosure utilizes an additive manufacturing processes (e.g., printed layer by layer) to print a negative mold of a positive midsole model (i.e., a model of a midsole that is to be formed during the molding process). Additive manufacturing enables the negative mold to be printed with a nearly unlimited number geometric shapes, structures, and/or patterns, which cannot be formed with conventional molding processes. The negative mold may be placed in or formed unitarily with a mold base and a material may be supplied to the negative mold and the surrounding mold base to form the midsole. The formed midsole may include properties that are determined by the model of the midsole that was used to generate and print the negative mold. That is, the negative mold may include geometric features (e.g., interconnected segments, interconnected channels, openings, apertures, etc.) that result in the formation of one or more intended geometric structures in the midsole. In some embodiments, the intended geometric structures include an aperture, opening, a channel, a tunnel, or void formed in the midsole.

The various methods of additive manufacturing used to manufacture a negative mold and/or a portion of an article of footwear according to the present disclosure may include binder jetting, direct energy deposition, selective laser melting (SLM), fused deposition modeling (FDM), electron beam melting, laser powered bed fusion (LPBF), ultrasonic additive manufacturing, material extrusion, material jetting, Joule printing, electrochemical deposition, cold spray metal printing, DLP metal printing, Ultrasonic Consolidation or Ultrasonic Additive Manufacturing (UAM), LENS laser-based printing, vat photopolymerization, sheet lamination, or electron beam freeform fabrication (EBF3).

The use of the terms "lattice portion" or "lattice structure," herein refer to portions of a negative mold and/or a portion of an article of footwear (e.g., a midsole) formed by one of a plurality of interconnected segments, interconnected shapes, interconnected channels, interconnected openings, and/or interconnected surfaces. In some embodiments, a lattice structure or lattice portion may be formed integrally with a negative mold or a portion of an article of footwear by an additive manufacturing process. In some embodiments, the lattice structure or lattice portion may define at least one cutout, opening, aperture, or absence of material that is formed within a unit cell (e.g., a repeated pattern defined by the lattice structure). The use of a lattice structure within a negative mold and/or a portion of an article of footwear may allow various manufacturing and performance characteristics to be modified, improved, and/or customized. For example, a lattice structure or lattice portion may define a substantially reduced weight or density when compared to a solid material. It follows that the incorporation of a lattice structure or a lattice portion into a shoe or sole may reduce the overall volume or mass of material needed to manufacture an article of footwear. Further, a lattice structure or a lattice portion may include geometric features with improved cushioning properties, when compared to solid material, so the incorporation of a lattice structure or a lattice portion into a midsole may reduce overall weight and improve cushioning performance in an article of footwear.

In some embodiments, the lattice structure may define a unit cell that is formed by a cutout, air space, or absence of material defined between interconnected intersection points. For example, a lattice structure may define triangular-, spherical-, square-, rectangular-, or diamond-shaped unit cells. Alternatively or additionally, in some embodiments, at least a portion of the unit cells in a lattice structure according to the present disclosure may define a pentagonal shape, a hexagonal shape, or any other polygonal shape.

In some embodiments, a unit cell defined by a lattice structure according to the present disclosure can be formed by interconnected shapes (e.g., ovals, circles, or another geometric shape) with varying orientations to form a repeated pattern, or unit cell. In some embodiments, a lattice structure according to the present disclosure may be formed by a differential geometry structure. For example, a lattice structure according to the present disclosure may be formed by a gyroid structure that includes a plurality of interconnected, periodic minimal surfaces. The gyroid structure may define a unit cell that is repeated in a pattern over a particular volume to form a lattice structure according to the present disclosure. In general, the use of a differential geometry structure (e.g., a gyroid) may reduce stress concentrations formed along the lattice structure due to the reduction in sharp edges formed on the lattice structure, which may provide improved cushioning performance, for example, in a midsole of an article of footwear, when compared to solid material used in conventional midsoles.

Figure 6:
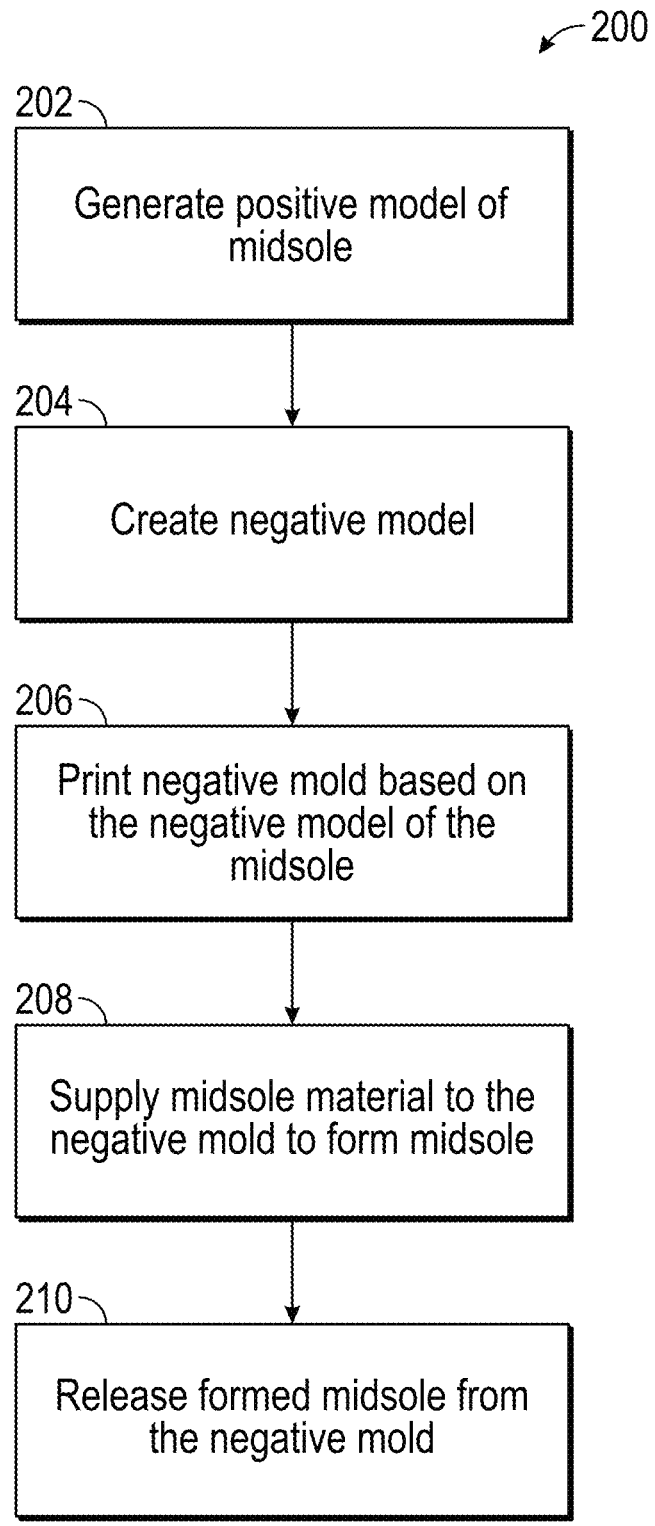
FIG. 6 is a flowchart outlining a method of forming a mold and manufacturing a midsole of an article of footwear using a casting-like process.

FIG. 6 outlines a method 200 for forming a mold and manufacturing a midsole of an article of footwear according to some embodiments of the present disclosure. In some embodiments, a portion of the method may be carried out using a controller that includes a processor and memory, and other portions of the method may be performed by an additive manufacturing system (e.g., a 3D printer). In some embodiments, the controller may be integrated into the additive manufacturing system. In other embodiments, the controller may be located remotely from the additive manufacturing system and may be in wireless communication with the additive manufacturing system.

Still referring to FIG. 6, the method 200 may initiate step 202 by generating a positive model of a midsole that is intended to be formed and manufactured with an article of footwear (e.g., the article of footwear 25). The positive model may be an electronic three-dimensional representation of a midsole that is intended to be formed for an article of footwear. In some embodiments, the positive model may be in the form of a 3D CAD file, or a 3D stereolithographic file (.STL file). In some embodiments, the positive model may be designed and generated by a user of a mold generating system that includes the controller. In some embodiments, the positive model may be generated by the controller based on a 3D scan of an existing physical midsole. Alternatively or additionally, the positive model may be generated by the controller in response to input data that includes information relating to an end users physical characteristics. For example, the physical characteristics that are input to the controller and used to design and generate a positive model may include an end users weight, an end users gate, and/or an end users foot pressure map measured during standing, walking, cutting movements, and/or running.

In some embodiments, the physical characteristics may be processed by the controller and generate a positive model that includes a lattice structure extending throughout the positive model of the midsole. The lattice structure may include a plurality of interconnected channels, shapes, surfaces, etc., that extend throughout the volume of the positive model. The lattice structure may be formed by a repetitive pattern (e.g., a plurality of differential surfaces that form a gyroid), and the geometric properties of the lattice structure may be varied along the positive model to provide increased or decreased cushioning performance at different areas along the midsole. For example, a size, thickness, or volume occupied by beams and/or openings that form the lattice structure may be varied along the positive model, which results in a midsole that is formed with varying cushioning performance at different locations on the midsole. Alternatively or additionally, the shape or type pattern defined by lattice structure may change over different portions of a formed midsole. For example, a formed midsole may include a gyroid structure throughout a heel and a midfoot region and a channel structure with cylindrical tunnels in a forefoot region.

Once the positive model is generated at step 202, a negative model may be generated at step 204. In general, the negative model may be an electronic three-dimensional representation of a negative mold that may be used to form a physical representation of the negative model. In some embodiments, the controller of the mold generating system may be configured to generate the negative model from the positive model. For example, the positive model may be surrounded and enclosed by a filler volume (e.g., a cuboid or a structure with a shape similar to the midsole in the positive model but larger in volume). The filler volume may be subtracted from the positive model and the remaining volume may represent the negative model.

During the subtraction of the filler volume from the positive model, regions with overlapping volumes between the filler volume and the positive model may result in regions of empty volume (e.g., voids, cavities, etc.) in the negative model, and regions without overlapping volumes between the filler volume and the positive model may result in regions of solid volume in the negative model. In this way, for example, the negative model may define empty volume where the positive model defined solid volume, and may define solid volume where the positive model defined empty volume. These properties of the negative model enable it to be used as a design for a mold that can be filled with material and form a midsole with a design that mirrors the positive model.

In some embodiments, the negative model may be in the form of a 3D CAD file, or a 3D stereolithographic file (.STL file). With the negative model generated after step 204, the negative model may be used to print a negative mold that is based on the negative model at step 206. For example, the negative model may be input to the additive manufacturing system and the additive manufacturing system may print, layer by layer, a physical representation of the negative model that can be used as a negative mold to form a positive structure of a midsole. In some embodiments, the negative mold is dimensioned to form a production-intent midsole. That is, the size of the midsole formed by the negative mold may be in 1:1 correlation with a production-intent size of the midsole. In some embodiments, the negative mold that is printed layer by layer may be fabricated from a soluble material (e.g., a soluble resin, a soluble plastic, etc.) that is dissolvable in a chemical solvent and/or a liquid material, a sand material that is bonded with a dissolvable resin, or a wax material.

As described herein, the positive model may include a lattice structure with a plurality of interconnected channels, shapes, surfaces, etc., that extend throughout the volume of the positive model. It follows that the negative model and the printed negative mold include the subtracted, or negative, version of the lattice structure. For example, an interconnected solid volume defined by the lattice structure may transform to an interconnected network of channels, voids, apertures, etc., which provides an interconnected flow path that is configured to allow fluid to flow throughout the entire volume of the negative mold and form a midsole.

In some embodiments, the negative mold that is printed at step 206 may be placed in and at least partially attached to a mold base that structurally supports the negative mold. For example, the mold base may include a recess that is dimensioned to receive the negative mold therein. In some embodiments, the mold base may be fabricated from a resin material or a silicon material. With the negative mold arranged within the mold base, a midsole material may then be supplied to the negative mold at step 208. In some embodiments, the midsole material supplied to the negative mold may partially fill the negative mold, and a foaming expansion may fill the remaining volume of the negative mold. In some embodiments, the midsole material may be a liquid resin material that is combined with a foaming or blowing agent (e.g., water, carbon dioxide, or nitrogen). In some embodiments, the midsole material may be comprised of a polyol material and an isocyanate material that is combined with a foaming or blowing agent.

After the midsole material is supplied to the negative mold, the negative mold, and the midsole material supplied to the negative mold, may be enclosed by a cover plate. The foaming or blowing agent in the midsole material may begin to react after a predetermined amount of time, which causes the midsole material to expand throughout and fill the negative mold. For example, the reaction caused by the foaming or blowing agent may increase an expansion pressure of the midsole material within the negative mold. This, combined with the generally low viscosity defined by the liquid midsole material, may promote expansion of the midsole material throughout the interconnected network of channels, voids, or apertures in the negative mold, thereby forming a midsole around the negative mold. After a predetermined amount of time, a crosslinking process occurring as a result of the reaction in the midsole material may be completed and the negative mold may be removed from the mold base. The midsole material may now be in the form of a solid foamed resin material that defines a midsole formed around the negative mold.

After the crosslinking process is complete and the midsole is set and solidly formed around the negative mold, the negative mold and the formed midsole can be removed from the mold base, and subsequently, the formed midsole can be released from the negative mold at step 210. In some embodiments, the negative mold may be mechanically, chemically, or thermally released from the formed midsole. For example, the negative mold can be manually scraped (e.g., when the negative mold is fabricated from a sand material, or a specific type of sand material, such as silica sand or desert sand that defines more spherical particles than other types of sand) away from the formed midsole or manually crushed to crack the resin of the mold and enable the mold to be removed of blown away from the formed midsole. In some embodiments, the negative mold may be formed from a soluble resin that is at least partially dissolvable in the presence of a solvent (e.g., water, alcohol, etc.), and the midsole material may be insoluble to the solvent that is used to dissolve the negative mold. In some embodiments, the midsole material may define a higher melting point than the negative mold (e.g., when the negative mold is fabricated from a wax material), and the negative mold may be melted away without damaging the structural integrity of the formed midsole. In some embodiments, the release or removal of the negative mold from the formed midsole may include one or more steps. For example, the mechanical, chemical, and/or thermal removal approaches described herein may be combined or used in sequence to remove the negative mold from the formed midsole.

In any case, with the formed midsole removed from the negative mold, the formed midsole may be manufactured into an article of footwear (e.g., the article of footwear 25). Further, the formed midsole may include the lattice structure (e.g., a gyroid pattern) that was present in the positive model, which provides reduced weight properties and improved cushioning properties to the formed midsole and the article of footwear. In some embodiments, openings, apertures, or voids arranged throughout the lattice structure in the formed midsole may be filled with a foam material that defines a softer grade than the midsole material to further reinforce the cushioning performance of the formed midsole.

In some embodiments, the negative mold and the mold base may be printed, layer by layer, as a unitary component at step 206. In these embodiments, the negative mold and the mold base may be secured within a support frame to avoid damage of the printed molds during handling or during the formation process. The forming of the midsole from the negative mold may occur as described above in steps 208 and 210, but the mold base and the negative mold are fabricated from the same material in this embodiment, and the support frame is removed prior to the formed midsole being released from the negative mold and the mold base.

In general, after the midsole material is supplied to the negative mold at step 208 and the expansion of the midsole material within the negative mold occurs, it is desirable to avoid air or gas from being trapped within the negative mold and/or the formed midsole. In some embodiments, the mold base may be designed to include a gap between the periphery of the negative mold and a portion of the mold base surrounding the negative mold. In this way, for example, the expanding midsole material within the negative mold is provided with a space to fill in (flash), and the resulting flashed material may be removed in post processing of the formed midsole. In some embodiments, the negative mold may be fabricated from a material that includes microperforations to aid in releasing air from within the negative mold during the forming process. Alternatively or additionally, the mold base may include an overflow reservoir formed therein to allow excess material to flow into the overflow reservoir and ensure that the negative mold is fully expanded into and filled with midsole material. Alternatively or additionally, the cover plate used to enclose the negative mold during the expansion of the midsole material may be used to apply a vacuum to the negative mold and remove air during the formation of the midsole.

In some embodiments, the midsole material supplied to the negative mold at step 208 may not include a blowing or a foaming agent. In these embodiments, the negative mold may be completely filled, rather than partially filled, with the midsole material at step 208, and the negative mold is enclosed with the cover plate until the formed midsole is set around the negative mold. The formed midsole may then be released from the negative mold as described above during step 210.

Figure 7:
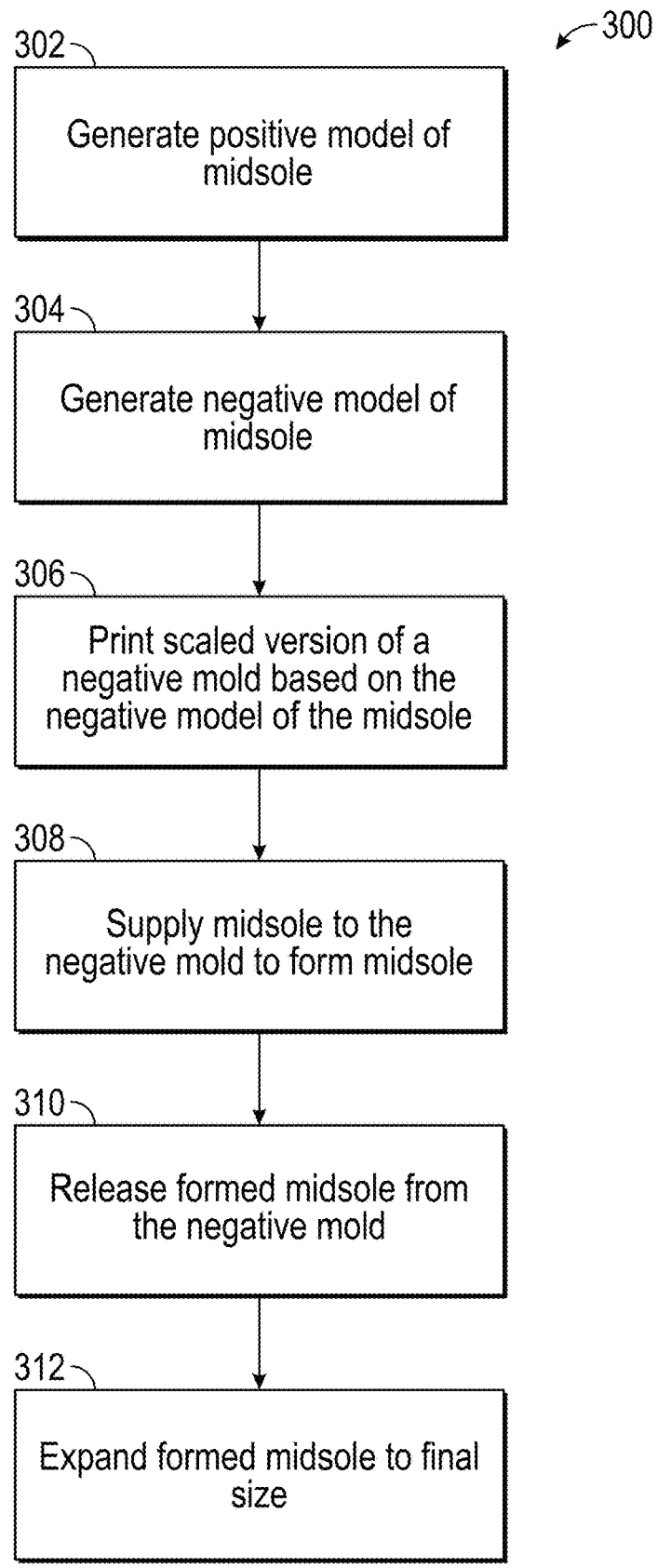
FIG. 7 is a flowchart outlining a method of forming a mold and manufacturing a midsole of an article of footwear using an injection molding process.

In general, the method 200 described herein may form a midsole from a negative mold via a casting-like process. However, in some embodiments, the negative mold approach may be utilized with an injection molding process. For example, FIG. 7. outlines a method 300 for forming a mold and manufacturing a midsole of an article of footwear according some embodiments of the present disclosure. In some embodiments, a portion of the method may be carried out using a controller that includes a processor and memory, and other portions of the method may be performed by an additive manufacturing system (e.g., a 3D printer). In some embodiments, the controller may be integrated into the additive manufacturing system. In other embodiments, the controller may be located remotely from the additive manufacturing system and may be in wireless communication with the additive manufacturing system.

Similar to the method 200, the method 300 may initiate at step 302 by generating a positive model of a midsole that is intended to be formed and manufactured with an article of footwear (e.g., the article of footwear 25). The positive model may be an electronic three-dimensional representation of a midsole that is intended to be formed for an article of footwear. In some embodiments, the positive model may be in the form of a 3D CAD file, or a 3D stereolithographic file (.STL file). In some embodiments, the positive model may be designed and generated by a user of a mold generating system that includes the controller. In some embodiments, the positive model may be generated by the controller based on a 3D scan of an existing physical midsole. Alternatively or additionally, the positive model may be generated by the controller in response to input data that includes information relating to an end users physical characteristics. For example, the physical characteristics that are input to the controller and used to design and generate a positive model may include an end users weight, an end users gate, and/or an end users foot pressure map measured during standing, walking, and/or running.

In some embodiments, the physical characteristics may be processed by the controller and generate a positive model that includes a lattice structure extending throughout the positive model of the midsole. The lattice structure may include a plurality of interconnected channels, shapes, surfaces, etc., that extend throughout the volume of the positive model. The lattice structure may be formed by a repetitive pattern (e.g., a plurality of differential surfaces that form a gyroid), and the geometric properties of the lattice structure may be varied along the positive model to provide increased or decreased cushioning performance at different areas along the midsole. For example, a size, thickness, or volume occupied by beams and/or openings that form the lattice structure may be varied along the positive model, which results in a midsole that is formed with varying cushioning performance at different locations on the midsole.

Once the positive model is generated at step 302, a negative model may be generated at step 304. In general, the negative model may be an electronic three-dimensional representation of a negative mold that may be used to form a physical representation of the positive model. In some embodiments, the controller of the mold generating system may be configured to generate the negative model from the positive model. For example, the positive model may be surrounded and enclosed by a filler volume (e.g., a cuboid or a structure with a shape similar to the midsole in the positive model but larger in volume). The filler volume may be subtracted from the positive model and the remaining volume may represent the negative model.

During the subtraction of the filler volume from the positive model, regions with overlapping volumes between the filler volume and the positive model may result in regions of empty volume (e.g., voids, cavities, etc.) in the negative model, and regions without overlapping volumes between the filler volume and the positive model may result in regions of solid volume in the negative model. In this way, for example, the negative model may define empty volume where the positive model defined solid volume, and may define solid volume where the positive model defined empty volume. These properties of the negative model enable it to be used as a design for a mold that can be filled with material and form a midsole with a design that mirrors the positive model.

In some embodiments, the negative model may be in the form of a 3D CAD file, or a 3D stereolithographic file (.STL file). With the negative model generated after step 304, the negative model may be used to print a scaled version of a negative mold that is based on the negative model at step 306. For example, the negative model may be input to the additive manufacturing system and the additive manufacturing system may print, layer by layer, a scaled version of a physical representation of the negative model that can be used as a negative mold to form a positive structure of a midsole. In some embodiments, the negative mold that is printed layer by layer may be fabricated from a soluble material (e.g., a soluble resin, a soluble plastic, etc.), a sand material that is bonded with a dissolvable resin, or a wax material.

As described herein, the positive model may include a lattice structure with a plurality of interconnected channels, shapes, surfaces, etc., that extend throughout the volume of the positive model. It follows that the negative model and the printed negative mold include the subtracted, or negative, version of the lattice structure. For example, an interconnected solid volume defined by the lattice structure may transform to an interconnected network of channels, voids, apertures, etc., which provides an interconnected flow path that is configured to allow fluid to flow throughout the entire volume of the negative mold and form a midsole.

In general, the midsole material that is used to form the midsole (e.g., a thermoplastic material) may produce a heavier final component, when compared to the foamed materials described herein, due to the need for more robust materials during an injection molding process. One or more weight reduction strategies may be implemented with the method 300.

In some embodiments, the scaled version of the negative mold may be scaled down by a scale factor relative to a final or production-intent size (e.g., volume) of the midsole that is manufactured with an article of footwear (e.g., the article of footwear 25). For example, the scaled version of the negative mold that is printed at step 306 may be about 70% smaller, about 65% smaller, about 60% smaller, about 55% smaller, about 50% smaller, about 45% smaller, about 40% smaller, about 35% smaller, or about 30% smaller than the production-intent size of the midsole. In some embodiments, the scaled version of the negative mold may be between about 70% and about 30% smaller, between about 65% and about 35% smaller, or between about 60% and about 40% smaller than the production-intent size of the midsole. In some embodiments, the scaled version of the negative mold may be between about 70% and about 60% smaller, between about 50% and about 40% smaller, or between about 30% and about 20% smaller than the production-intent size of the midsole. The scale factor of the printed negative mold may reduce a size of the formed midsole a predetermined amount, so that the scaled down version of the formed midsole may be expanded to the production-intent size after a foaming process, as will be described herein.

In some embodiments, the scale factors described herein are uniformly scaled down relative to the final size of the midsole. For example, the scaling is uniform in volume about all coordinate axes defined by the midsole. In some embodiments, the scale factors described herein may define a gradient across the negative mold. For example, some portions of the negative mold may be scaled down in volume greater or less than other portions of the negative mold. In some embodiments, the mass properties of the formed midsole may determine the magnitude of the scale factor along various portions of the printed negative mold, with portions of the negative mold that form regions with greater thickness or volume in the formed midsole being scaled down more than portions of the negative mold that form regions with lesser thickness or volume in the formed midsole. That is, in some embodiments, a gradient defined by the scale factor may be correlated to a geometric characteristic of the formed midsole (e.g., thickness, volume, or a geometric property defined along at least one coordinate axis), with areas that define a larger geometric characteristic being scaled down more than areas that define a smaller geometric characteristic. In some embodiments, the scale factors described herein may scale down the formed midsole relative to the final size of the midsole in one direction or along one coordinate axis defined by the midsole. For example, the formed midsole may be structurally supported by a mold base to prevent expansion along two directions (e.g., an x-axis and a z-axis, or a plane that is parallel to a ground plane that an article of footwear rests upon while being worn by a user), and the size of the formed midsole may be approximately equal to the final size of the midsole along these two directions. The formed midsole, with the scaled down size in one direction, may then be expanded along the one direction that is allowed by the mold base (e.g., a y-axis or the coordinate axis that is perpendicular to a ground upon which a user walks).

In some embodiments, the scale factor and the type of scaling defined by the negative mold and the formed midsole may be automatically generated by a controller based on a volume and shape defined by the final midsole and the corresponding article of footwear with which the midsole is to be manufactured.

In some embodiments, the scaled version of the negative mold that is printed at step 306 may be placed in and at least partially attached to a mold base that structurally supports the negative mold. With the scaled version of the negative mold printed at step 306, a midsole material may then be supplied to the negative mold at step 308. In some embodiments, the midsole material may be a thermoplastic material (e.g., thermoplastic polyurethane, thermoplastic acrylic, thermoplastic elastomer, etc.). The midsole material may be injection molded into the scaled version of the negative mold to fill the negative mold with the midsole material. As described herein, the positive model may include a lattice structure with a plurality of interconnected channels, shapes, surfaces, etc., that extend throughout the volume of the positive model. It follows that the negative model and the scaled version of the printed negative mold include the subtracted, or negative, version of the lattice structure. For example, an interconnected solid volume defined by the lattice structure may transform to an interconnected network of channels, voids, apertures, etc., which provides an interconnected flow path that is configured to allow midsole material to flow throughout the entire volume of the negative mold during the injection molding process and form a midsole.

Once the midsole material has be injected into and set around the negative mold, the scaled version of the formed midsole may be released from the mold base and the negative mold at step 310. In some embodiments, the negative mold may be mechanically, chemically, or thermally released from the formed midsole. For example, the negative mold can be manually scraped (e.g., when the negative mold is fabricated from a sand material) away from the formed midsole. In some embodiments, the negative mold may be formed from a soluble resin that is at least partially dissolvable in the presence of a solvent (e.g., water, alcohol, etc.), and the midsole material may be insoluble to the solvent that is used to dissolve the negative mold. In some embodiments, the midsole material may define a higher melting point than the negative mold (e.g., when the negative mold is fabricated from a wax material), and the negative mold may be melted away without damaging the structural integrity of the formed midsole. In some embodiments, the release or removal of the negative mold from the formed midsole may include one or more steps. For example, the mechanical, chemical, and/or thermal removal approaches described herein may be combined or used in sequence to remove the negative mold from the formed midsole.

With the scaled version of the formed midsole released from the negative mold, the scaled version of the formed midsole may be expanded to the final or production-intent size at step 312. For example, the scaled version of the formed midsole may be enclosed in a pressurized autoclave and supplied with pressurized gas (e.g., nitrogen on the order of several thousand pounds per square inch). The high pressure gas within the autoclave may transmit into the scaled version of the formed midsole. Upon depressurization of the autoclave, a pressure differential between the high pressure gas that transmitted into the scaled version of the formed midsole and the depressurized autoclave may cause the formed midsole to expand from the scaled version to the final or production-intent size, which reduces a density of the formed midsole and provides improved cushioning properties. And the formed midsole may include the lattice structure (e.g., a gyroid pattern) that was present in the positive model, which further provides reduced weight properties and improved cushioning properties to the formed midsole and the article of footwear.

In some embodiments, the midsole material may include a blowing agent and the expansion at step 312 may include activated after forming the midsole. For example, the formed midsole that is fabricated from a material with a blowing agent infused therein may be heated to initiate the expansion process and the accompanying expansion of the formed midsole to the final size. In some embodiments, the blowing agent may be infused into the midsole material during a transporting and softening phase as the midsole material is being supplied to the negative mold at step 308 (e.g., MuCell® process).

In some embodiments, the expansion of the formed midsole at step 312 may be a multi-step process. For example, the formed midsole may initially be expanded, via one of the expansion processes described herein, to an intermediate size that is greater than the size of the negative mold but less than the final size of the midsole. The formed midsole with the intermediate size may then be placed into a forming mold that defines the shape and size of the final midsole (e.g., the forming mold represents the size of the shoe that the midsole is to be formed into). Once the midsole is in the forming mold, the midsole may be expanded (e.g., via temperature and/or pressure supplied to the midsole within the forming mold) to the final size. When the final midsole has cooled, the formed midsole defining the final size may be removed from the forming mold.

In some embodiments of the method 300, the scaled version of the negative mold printed at step 306 may be printed in a 1:1 scale factor relative to the final or production-intent size of the midsole, rather than a scale factor that reduces a size of the negative mold relative to the final or production-intent size of the midsole. In these embodiments, the expansion step 312 may not be required and the midsole material supplied to the negative mold at step 308 may be a gas-loaded thermoplastic material. The gas-loaded thermoplastic material may be injected to at least partially fill the negative mold and the material may expand to fill the negative mold completely.

In general, the methods 200 and 300 utilize additive manufacturing to print a negative mold that can form a midsole with complex geometrical features. In addition to the unmolding techniques described herein, the negative mold that is printed may be treated with a release agent (e.g., silicon or wax) to avoid a mechanical or chemical interaction between the negative mold and the midsole material. Alternatively or additionally, the midsole material may include additives that reduce or prevent adhesion between the negative mold and the midsole material.

Figure 8:
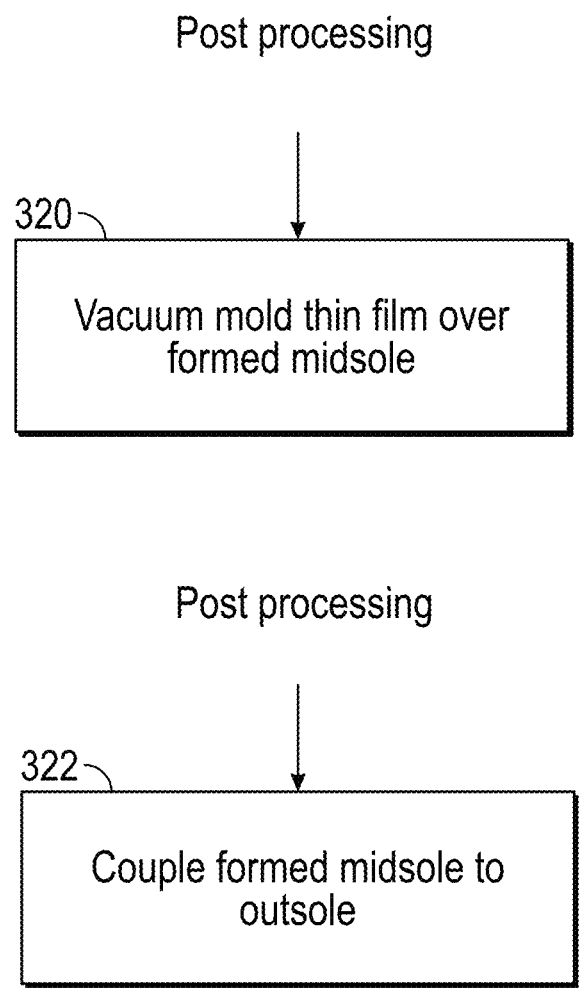
FIG. 8 is a flowchart outlining post processing steps for the methods of FIG. 6 and FIG. 7.

Turning to FIG. 8, in some embodiments after the midsole is formed, either by the method 200 or the method 300, the midsole may undergo one or more post-processing steps after formation. For example, at step 320, a thin film may be vacuum molded over the formed midsole. As described herein, the techniques described herein enable the formation of a midsole that includes a lattice structure extending throughout the formed midsole. The inclusion of a lattice structure may introduce openings, voids, apertures, channels, and/or passages into the formed midsole, which may allow the introduction of moisture and dirt/other particles into the midsole. Vacuum sealing a thin film around the formed midsole may prevent moisture and dirt/particles from entering into the midsole.

In some embodiments, the formed midsole may be placed into a vacuum molding machine below a film layer. The film layer may define a thickness between about 0.1 millimeters (mm) and about 0.6 mm. The film layer may be fabricated from a thermoplastic material (e.g., thermoplastic polyurethane, thermoplastic acrylic, thermoplastic elastomer, etc.). In some embodiments, the thin film may be treated with a heat-activated adhesive that is activated at a similar temperature to which the film is preheated prior to molding. For example, the thin film may be heated to between about 100° C. and about 160° C. (e.g., by lamps), and the heat-activated adhesive applied to the thin film may be activated at a temperature within this range. In some embodiments, the adhesive is transparent or translucent, and non-yellowing. In some embodiments, the adhesive may be a reactive hot melt material or a 1K hot melt material.

Once the thin film is heated and the adhesive is activated, the thin film may be wrapped around the formed midsole and a vacuum may be applied to suction the thin film around the formed midsole. The heated film may extend into the openings, voids, apertures, channels, and/or passages of the formed midsole. A penetration depth of the thin film into the openings, voids, apertures, channels, and/or passages of the formed midsole may be dependent on the thickness and viscosity of the heated thin film, and on the magnitude of the vacuum applied to the thin film. For example, a thinner film, a higher heating temperature, and a stronger vacuum may all provide a deeper penetration depth. As the thin film penetrates into and covers the formed midsole, the activated adhesive may bond to the formed midsole and may be trimmed after cooling, if necessary. With the thin film vacuum molded around the formed midsole, the midsole may be protected from moisture and dirt/particle penetration. And, in some embodiments, the thin film may be also be used to secure components inserted into the formed midsole prior to vacuum molding.

In some embodiments, the thin film may be transparent to enable a user to see through the thin film and visualize the structure of the formed midsole. In some embodiments, the thin film may be transparent, translucent, or opaque, e.g., a solid color or multiple colors. In some embodiments, the thin film may be comprised of smaller portions of film with different transmission characteristics (e.g., transparent portions and opaque portions) that overlay the formed midsole. In some embodiments, the thin film may be comprised of a single layer or a multiple layers. For example, the thin film may comprise a first film layer that is transparent and a smaller, second film layer that is opaque to allow for some portions of the midsole to be transparent and other portions of the midsole to be opaque. In the embodiments where the thin film is comprised of multiple layers, the thin film layers may sandwich a stretchable fabric between the layers of thin film.

In some embodiments, the thin film may be a 3D molded or a 3D pre-formed negative (i.e., a component that is shaped to receive the formed midsole) that is formed with or without co-molded handles or lugs. In some embodiments, the thin film may be printed or decorated prior to the vacuum molding process. Alternatively or additionally, a laser-activated additive may be integrated into the thin film and utilized for laser decorating of the midsole after the vacuum molding process.

With continued reference to FIG. 8, the formed midsole may be coupled to an outsole at step 322 to form a portion of a sole assembly for an article of footwear (e.g., the article of footwear 25). As described herein, the incorporation of a lattice structure into a midsole provides several performance advantages, however, the attachment to an outsole may add difficulties to a traditional cementing process that is used to attach a midsole to an outsole in a sole assembly on an article of footwear. For example, a midsole formed with a lattice structure may not include as much bonding surface area due to the inclusion of the openings, voids, apertures, channels, and/or passages in the midsole.

In some embodiments, the midsole may include adhesive pads that are inserted into the formed midsole and used to couple the midsole to an outsole. The adhesive pads may be surrounded by an adhesive layer to enable bonding to the midsole and the outsole, which results in a bond between the midsole and the outsole. For example, the negative mold may be designed to form cavities in a bottom side of the midsole (i.e., a side that faces the outsole) within which the adhesive pads may be inserted. The cavities may be formed by a continuous surface that is recessed into the bottom side of the midsole to ensure that the adhesive pads form a good bond with the midsole, as well as the outsole. An outer surface of the adhesive pads (i.e., a surface that faces the outsole) is configured to bond to an inner surface of the outsole and couple the midsole to the outsole.

In some embodiments, the adhesive pads may be arranged at selective locations along a bottom side of the midsole. For example, the adhesive pads may be placed in specific high-abrasion areas, such as the forefoot region 34, the heel region 38 of the midsole, and/or under an area where a user's big toe may be placed while wearing an article of footwear. In other embodiments, the adhesive pads may be selectively arranged in a predetermined pattern along the bottom side of the formed midsole.

In some embodiments, the outsole may be coupled to the midsole at step 322 prior to the negative mold being released from the formed midsole at step 210. In these embodiments, the adhesive bonding between the midsole and the outsole provided by the adhesive pads is required to be resistant to the release mechanism utilized to release the negative mold from the formed midsole. For example, the adhesive bond may be insoluble in the presence of a solvent used to dissolve the negative mold and release the formed midsole.

In some embodiments, the coupling between the midsole and the outsole at step 322 may be alternatively or additionally achieved via the use of protrusions or pins that extend upwardly from an inner surface of the outsole (i.e., toward the midsole), and the midsole may include mating recesses formed therein that are configured to receive the protrusion or pins that extend from the outsole. The mating between the pins in the outsole and the surfaces forming the recesses in the midsole may provide a mechanical coupling between the outsole and the midsole.

In some embodiments, the midsole may be formed with cavities that are dimensioned to receive lugs that protrude from the outsole. In these embodiments, the outsole and the midsole may be formed together during either step 208 or 308, and the coupling between the outsole and the midsole at step 322 may occur simultaneously during step 208 or step 308.

FIGS. 9-13 illustrate one embodiment of the forming of a negative mold from a positive model and the subsequent manufacturing of a portion of a midsole, as described herein with reference to the methods 200 and 300. With specific reference to FIG. 9, a portion of a positive model 350 of a midsole is illustrated. The portion of the positive model 350 may represent a two-dimensional section of a unit cell 352 from a lattice structure that extends throughout the positive model 350. That is, the unit cell 352 may define a three-dimensional shape that is repeated in a tiled pattern over the entire volume of the positive model to define the lattice structure.

In general, the portion of the positive model 350 may include at least one region of solid volume that defines a geometric shape or surface and results in the formation of an aperture, opening, void, channel, or passageway in the formed midsole. In the illustrated embodiment, the portion of the positive model 350 includes a plurality of interconnected apertures 354 that are surrounded by model midsole material 356. The number and orientation of the plurality of interconnected apertures 354 illustrated in FIGS. 9-13 is not meant to be limiting, and the specific pattern defined by the unit cell 352 within the portion of the positive model 350 may be customized to include any number of apertures arranged in a particular orientation within the unit cell. Further, the number of apertures 354 that are illustrated as being in the same plane in FIG. 9 also may be varied depending on the design of the unit cell 352.

In the illustrated embodiment, the plurality of interconnected apertures 354 define a generally round shape that is defined by an inner surface 358. The inner surface 358 may define a boundary within which the portion of the positive model 350 may define an empty volume, a cavity, or a void (i.e., an absence of material in the formed midsole). The plurality of interconnected apertures 354 may be connected by one or more segments 360. In the illustrated embodiment, the segments 360 are hollow, or define an empty volume, like the plurality of interconnected apertures 354. The dashed lines on the segments 360 in FIGS. 9-13 indicate that the segments are connecting the plurality of interconnected apertures 354 in a different plane than the two-dimensional section illustrated in FIGS. 9-13. In some embodiments, the segments 360 may connect the plurality of interconnected apertures 354 along one or more common planes along the positive model 350.

In some embodiments, the plurality of interconnected apertures 354 may define a different shape. For example, the plurality of interconnected apertures 354 may define a triangular, spherical, square, rectangular, diamond, pentagonal, hexagonal, and/or any other polygonal shape. In some embodiments, the plurality of interconnected apertures 354 may include differently shaped apertures within the same unit cell. In some embodiments, the plurality of interconnected apertures 354 may combine with the segments 360 to form one or more surfaces formed in the unit cell (e.g., opposing minimal surfaces that form a gyroid pattern) that define apertures, openings, voids, channels, or passageways through the positive model 350, as will be described herein.

With reference to FIGS. 9 and 10, during the generation of the negative mold, the portion of the positive model 350 may be overlaid with a filler volume 362. In the illustrated embodiment, the filler volume 362 defines generally the same shape as the periphery of the positive model 350. In some embodiments, the filler volume 362 may define a shape that is larger than and encloses the positive model 350 (e.g., a cuboid).

To generate a portion of a negative model from the portion of the positive model 350, the filler volume 362 may be subtracted from the portion of the positive model 350. Moving from FIG. 10 to FIG. 11, a portion of a negative model 364 is illustrated and is the result of the subtracting of the filler volume 362 from the portion of the positive model 350. In general, overlapping volumes between the filler volume 362 and the model midsole material 356 in the positive model 350 may result in regions of empty volume (e.g., voids, cavities, apertures, channels, etc.) in the negative model 364, and regions without overlapping volumes between the filler volume 362 and the positive model 350 (i.e., the intersection between the filler volume 362 and the plurality of interconnected apertures 354 and the segments 360) may result in regions of solid volume in the negative model 364. In this way, for example, the negative model 364 may define empty volume where the positive model 350 defined solid volume, and the negative model 364 may define solid volume where the positive model 350 defined empty volume. These properties of the negative model 364 enable it to be used as a design for a mold that can be filled with material and form a midsole with a design that mirrors the positive model 350.

The portion of the negative model 364 may then be used as a design to print a solid version of a negative mold (see FIG. 20), layer by layer, using an additive manufacturing system. Turning to FIG. 12, once a negative mold 366 is printed based on the negative model 364, the negative mold 366 may be supplied with a midsole material 370. In general, a negative mold that is formed according to the present disclosure may include a solid surface (e.g., filled with material) that is configured to form an aperture in the formed midsole. In some embodiments, the negative mold may include a plurality of interconnected surfaces or shapes that are configured to form a plurality of interconnected apertures, openings, voids, channels, or passageways in the formed midsole. In the illustrated embodiment, the portion of the negative mold 366 includes a plurality interconnected solid surfaces 368. The plurality of interconnected surfaces 368 may define a shape and size that conforms to the size and shape of the plurality of interconnected apertures 354 and the segments 360 connected thereto.

The processes of supplying a midsole material is described herein with reference to the methods 200 and 300. In the illustrated embodiment, the midsole material 370 may surround the negative mold 366. Once the midsole material 370 is set around the negative mold 366, the negative mold 366 may be released from the formed midsole 371 according to the techniques described with reference to the methods 200 and 300. FIG. 13 illustrates a portion of the formed midsole 371 that was formed based on the positive model 350. The portion of the positive midsole 371 includes the plurality of interconnected apertures 354 and the segments 360 connected thereto.

In general, the design of the positive model 350 may be replicated in the formed midsole 371, as illustrated in FIGS. 9-13. In this way, for example, the positive model 350 may be designed to include any shape and structure. The complexity of the shape and structure of the positive model 350 is not limited by the printing of the negative mold 366, because of the design freedoms provided by additive manufacturing systems.

The geometric features of a unit cell within a positive model are not limited to interconnected shapes, as illustrated in FIGS. 9-13. In some embodiments, a positive model may include interconnected surfaces (e.g., minimal surfaces of a gyroid) that combine to define one or more apertures, channels, or passageways through the positive model, and thereby in the formed midsole. For example, FIGS. 14-18 illustrate another embodiment of the forming of a negative mold from a positive model and the subsequent manufacturing of a portion of a midsole, as described herein with reference to the methods 200 and 300.

With specific reference to FIG. 14, a portion of a positive model 372 of a midsole is illustrated. The portion of the positive model 372 may represent a two-dimensional section of a unit cell 374 from a lattice structure that extends throughout the positive model 372. That is, the unit cell 374 may define a three-dimensional shape that is repeated in a tiled pattern over the entire volume of the positive model to define the lattice structure.

In general, the portion of the positive model 372 may include at least one region of solid volume that defines a geometric shape or surface and results in the formation of an aperture, opening, void, channel, or passageway in the formed midsole. In the illustrated embodiment, the portion of the positive model 372 includes a solid volume e.g., an interconnected surface, or a plurality of interconnected surfaces 376 that are surrounded by model midsole material 378. The number and orientation of the interconnected surface(s) 376 illustrated in FIGS. 14-18 is not meant to be limiting, and the specific pattern defined by the unit cell 374 within the portion of the positive model 372 may be customized to include any number of surfaces arranged in a particular orientation. Further, the number of surfaces 376 that are illustrated as being in the same plane in FIG. 14 (the dash border lines indicating that the surfaces are out of plane) also may be varied depending on the design of the unit cell 374. It should be appreciated that the plurality of interconnected surfaces 376 illustrated in FIG. 14 may not be discrete and may be formed by a continuous surface that extends in a repeating pattern throughout the positive model 372. Accordingly, the interconnected surfaces 376 in FIG. 14 may be formed by a single interconnected surface that expands in a predetermined pattern throughout the positive model 372. It should be further noted that the appearance of individual surfaces in FIG. 14 is due to the planar view being illustrated.

In the illustrated embodiment, the interconnected surface(s) 376 define an alternating curved shape. In some embodiments, the plurality of interconnected surfaces 376 may define minimal surfaces that combine to form a gyroid structure or pattern. For example, the interconnected surface 376 may be a periodic minimal surface (e.g., a triply periodic minimal surface) that forms a gyroid throughout the positive model 372.

The interconnected surface(s) 376 may define a boundary within which the portion of the positive model 372 may define an empty volume, a cavity, channel, passageway, or a void (i.e., an absence of material in the formed midsole). For example, the interconnected surface(s) 376 may outline one or more interconnected channels or passageways that extend through the positive model 372, resulting in portions of the formed midsole that also include one or more interconnected channels or passageways. In the illustrated embodiment, the interconnected surface(s) 376 define one or more channels or passageways 380 that extend through, or define empty volumes within, the model midsole material 378. In some embodiments, the one or more channels or passageways 380 may be formed by a single interconnected channel or passageway that extends through the positive model 372. Alternatively, the one or more channels or passageways 380 may include a plurality of interconnected channels and passageways 380 that extend and connect throughout the positive model 372.

With reference to FIGS. 14 and 15, during the generation of the negative mold, the portion of the positive model 372 may be overlaid with a filler volume 382. In the illustrated embodiment, the filler volume 382 defines generally the same shape as the periphery of the positive model 372. In some embodiments, the filler volume 382 may define a shape that is larger than and encloses the positive model 372 (e.g., a cuboid).

To generate a portion of a negative model from the portion of the positive model 372, the filler volume 382 may be subtracted from the portion of the positive model 372. Moving from FIG. 15 to FIG. 16, a portion of a negative model 384 is illustrated and is the result of subtracting the filler volume 382 from the portion of the positive model 372. In general, overlapping volumes between the filler volume 382 and the model midsole material 378 in the positive model 372 may result in regions of empty volume (e.g., voids, cavities, apertures, channels, passageways, etc.) in the negative model 384, and regions without overlapping volumes between the filler volume 382 and the positive model 372 (i.e., the intersection between the filler volume 382 and the one or more channels or passageways 380) may result in regions of solid volume in the negative model 384. In this way, for example, the negative model 384 may define empty volume where the positive model 372 defined solid volume, and the negative model 384 may define solid volume where the positive model 372 defined empty volume. These properties of the negative model 384 enable it to be used as a design for a mold that can be filled with material and form a midsole with a design that mirrors the positive model 350.

The portion of the negative model 384 may then be used as a design to print a solid version of a negative mold (see FIG. 20), layer by layer, using an additive manufacturing system. Turning to FIG. 17, once a negative mold 386 is printed based on the negative model 384, the negative mold 386 may be supplied with a midsole material 390. In general, a negative mold that is formed according to the present disclosure may include a solid surface (e.g., filled with material) that is configured to form an aperture, passageway, or channel in the formed midsole. In some embodiments, the negative mold may include one or more interconnected surfaces or shapes that are configured to form one or more interconnected apertures, openings, voids, channels, or passageways in the formed midsole. In the illustrated embodiment, the portion of the negative mold 386 includes one or more solid interconnected segments 392. In some embodiments, the one or more solid interconnected segments 392 may be formed by a single continuous interconnected segment that extends throughout the negative mold. In some embodiments, the one or more solid interconnected segments 392 may be formed by a plurality of solid segments. In any case, the solid interconnected segments 392 may define exterior surfaces that correspond with the shape of the interconnected surface(s) 376. For example, the exterior surfaces of the solid interconnected segments 392 may define minimal surfaces (e.g., periodic minimal surfaces or triply periodic minimal surfaces).

The processes of supplying a midsole material is described herein with reference to the methods 200 and 300. In the illustrated embodiment, the midsole material 390 may surround the negative mold 386. Once the midsole material 390 is set around the negative mold 386, the negative mold 386 may be released from the formed midsole 394 according to the techniques described with reference to the methods 200 and 300. FIG. 18 illustrates a portion of the formed midsole 394 that was formed based on the positive model 372. The portion of the formed midsole 394 includes the interconnected surface(s) 376 formed therein and the accompanying one or more channels or passageways 380 formed by the interconnected surface(s) 376.

Figure 19:
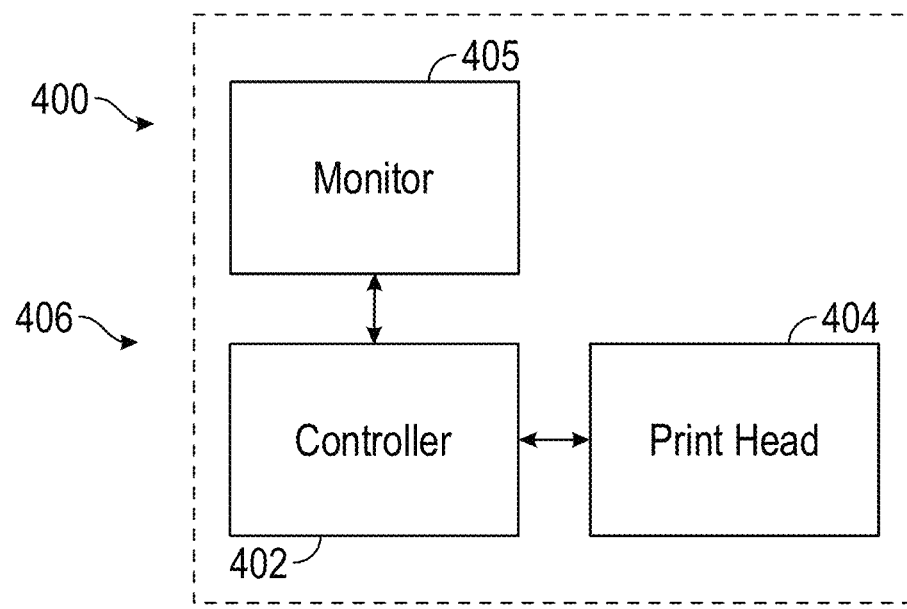
FIG. 19 is a block diagram of a mold generating system.
Figure 20:
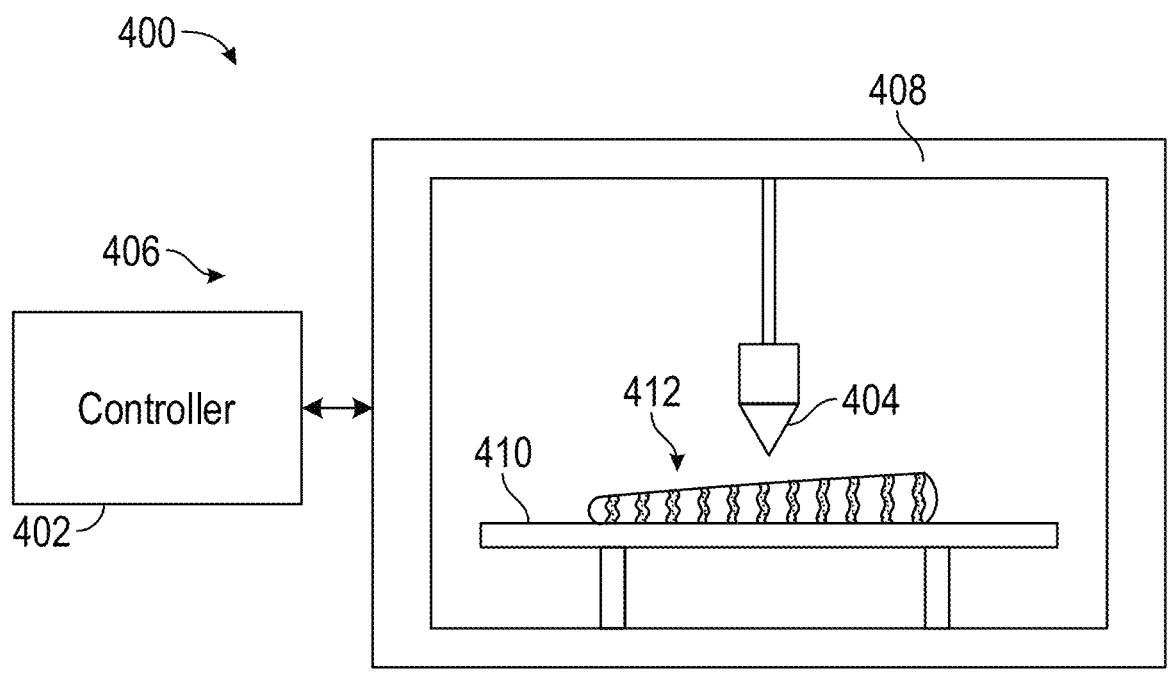
FIG. 20 is a schematic illustration of the mold generating system of FIG. 19.

FIGS. 19 and 20 illustrate one embodiment of a mold generating system 400 that may be used to design and print a mold according to the present disclosure. The mold generating system 400 may include a controller 402 and a print head 404. The controller 402 may include a processor with memory that includes instructions, which are carried out by the processor. The controller 402 may be in communication with the print head 404 and may be configured to instruct the print head 404 to deposit material layer by layer in a predetermined pattern. In some embodiments, the controller 402 and the print head 404 may be integrated into an additive manufacturing system 406 (see FIG. 20). In some embodiments, the controller 402 may be separate from but in communication with the print head 404.

In some embodiments, the controller 402 may be configured to design or receive a file that includes a positive model of a midsole. For example, the controller 402 may in communication with a monitor 405 that allows a user to visualize and design a positive model of a midsole. In some embodiments, a positive model of a midsole may be generated by the controller 402 based on a 3D scan of an existing physical midsole that is input to the controller 402. Alternatively or additionally, a positive model of a midsole may be generated by the controller 402 in response to input data that includes information relating to an end users physical characteristics. For example, the physical characteristics that are input to the controller 402 and used to design and generate a positive model may include an end users weight, an end users gait, and/or an end users foot pressure map measured during standing, walking, and/or running.

Regardless of how the positive model of a midsole is generated by the controller 402, the controller 402 may generate a negative model based on the positive model, according to the methods and techniques described herein. The negative model may be output from the controller 402 to the additive manufacturing system 406. For example, the negative model may be in a 3D printing format (e.g., an STL file), and the print head 404 of the additive manufacturing system 406 may proceed to print a negative mold, layer by layer, based on the negative model (see FIG. 20). In any case, the print head 404 may be configured to print a negative mold according to the methods 200 and 300, and the exemplary embodiments described with respect to FIGS. 9-18.

With specific reference to FIG. 20, the print head 404 may be enclosed within a housing 408 that supports a build bed or build plane 410. In some embodiments, the build bed 410 may be filled with the midsole material (e.g., in powder or particle form) and the print head 404 may be configured to bind, melt, and/or fuse the midsole material in the build bed 410, layer by layer, to print a negative mold 412. The negative mold 412 may include any of the geometries, lattice structures, unit cells, surface, and/or shapes described herein for the negative model and the negative mold, which may then form any of the geometries, lattice structures, unit cells, surfaces, and/or shapes described herein for the positive model and the formed midsole. In the illustrated embodiment, the negative mold 412 may include the one or more solid interconnected segments 392 with exterior surfaces that define minimal surfaces (e.g., periodic minimal surfaces or triply periodic minimal surfaces) that form a gyroid pattern in the formed midsole.

Figure 21:
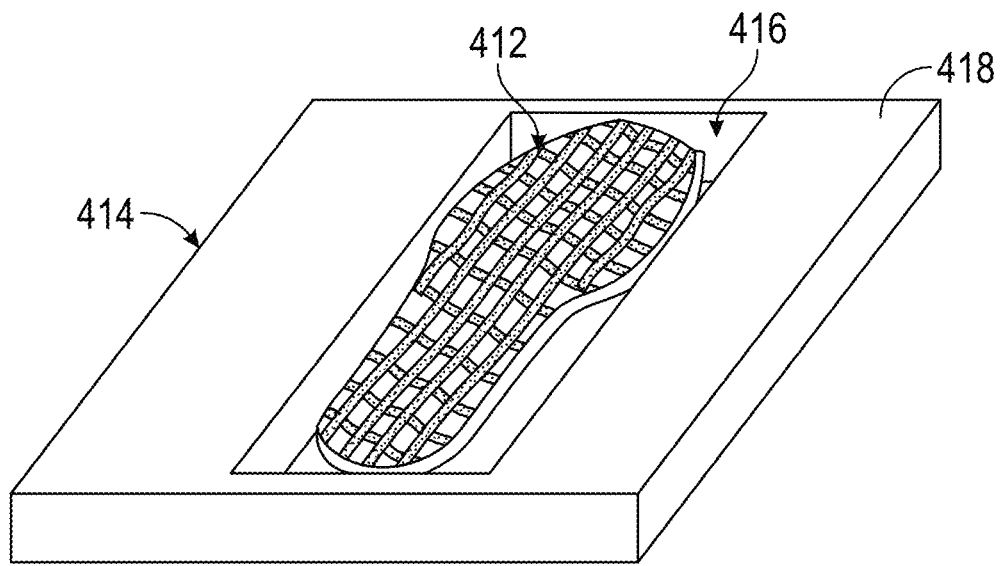
FIG. 21 is a perspective view of a negative mold within a mold base.

As described in the methods 200 and 300, once a negative mold is printed, the negative mold may be secured within a mold base. Turning to FIG. 21, the negative mold 412 may be placed in a mold base 414. In the illustrated embodiment, the mold base 414 defines a generally rectangular prism shape. In other embodiments, the mold base 414 may define any shape as required by the forming technique being utilized to form the midsole from the negative mold 412.

Figure 22:
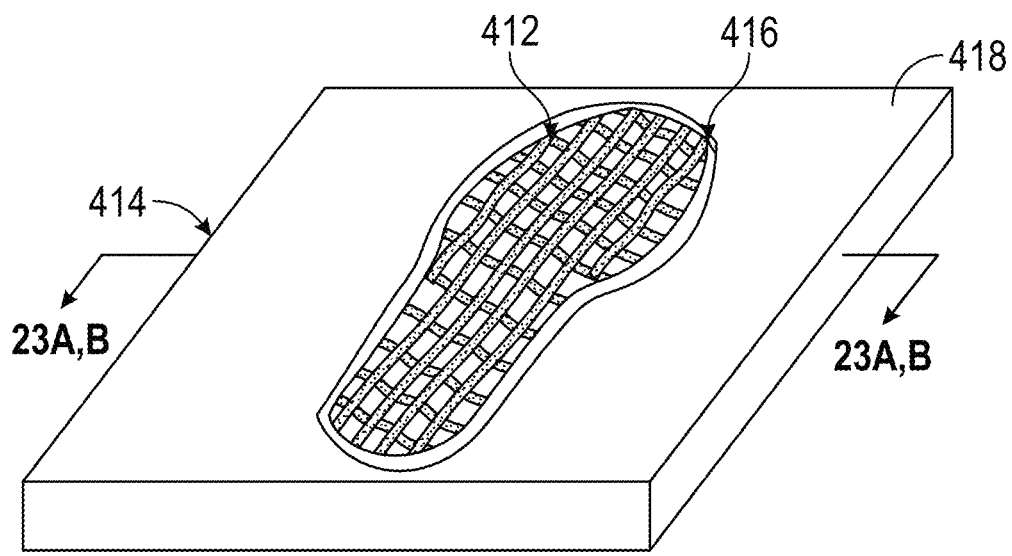
FIG. 22 is a perspective view of a negative mold within a mold base, where the mold base include a recess that is similarly shaped to the negative mold.
Figure 23A:
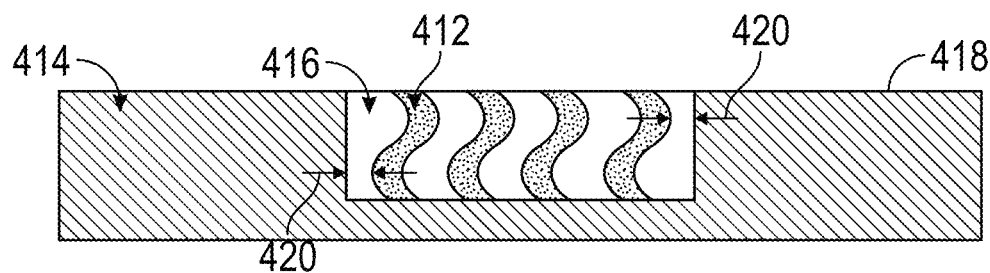
FIG. 23A is a cross-sectional view of the negative mold and the mold base of FIG. 22 taken along line 23-23.

The mold base 414 includes a base recess 416 that is recessed into a top surface 418 of the mold base 414. In the illustrated embodiment, the base recess 416 may include a peripheral edge 417 that defines a rectangular shape. In another embodiment, the peripheral edge 417 may define a shape that conforms to the outer periphery of the negative mold 412 (see FIG. 22). In some embodiments, the base recess 416 may be dimensioned to provide a predetermined gap 420 between the outer periphery of the negative mold 412 and the peripheral edge 417 of the base recess 416 (see FIG. 23A). As described in the methods 200 and 300, the gap 420 may provide a space for the midsole material to fill in (flash) during the forming process and assist in preventing air from being trapped during the forming process.

In some embodiments, the predetermined gap 420 between the outer periphery of the negative mold 412 and the peripheral edge 417 of the base recess 416 may be configured to form closed outer walls or surfaces (e.g., walls or surfaces formed of solid material with no apertures or channels extending therethrough). For example, the predetermined gap 420 may provide a space for the midsole material to flow around the negative mold 412 and result in the formation of a solid sidewall that surrounds the periphery of the formed midsole. The solid sidewalls may enclose the lattice structure, lattice pattern, aperture, opening, tunnel, channel, or other structure that is formed in the midsole by the negative mold 412, and prevent debris from entering the formed midsole.

Figure 23B:
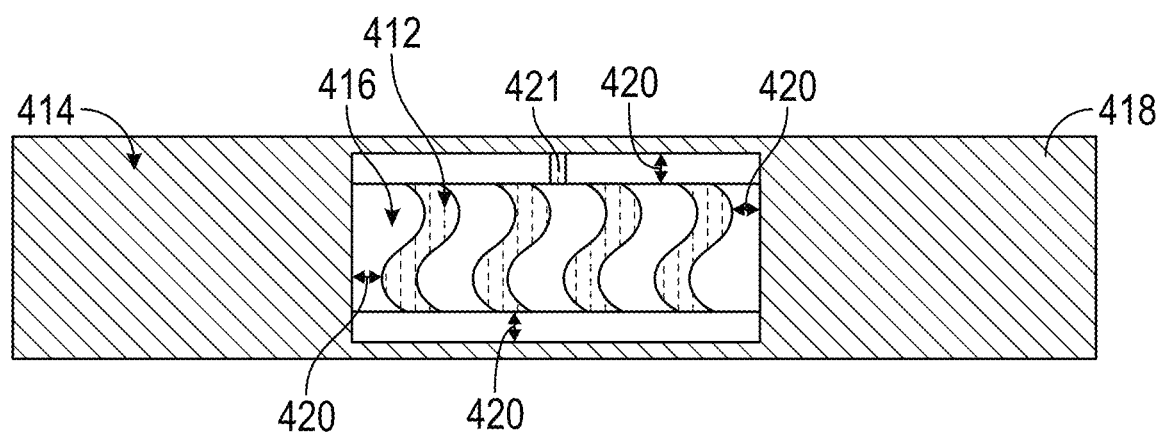
FIG. 23B is a cross-sectional view of the negative mold and the mold base of FIG. 22 taken along line 23-23 with a gap formed around the negative mold.

In some embodiments, as illustrated in FIG. 23B, the predetermined gap 420 may surround all outer surfaces of the negative mold 412 to form a solid outer wall that surrounds the formed midsole, except for at least one opening or channel may be arranged in the predetermined gap. For example, the negative mold 412 may include a solid rod or pin 421 that results in the formation of an opening or channel through the solid outer wall. In the illustrated embodiment, the solid rod or pin 421 is formed in an upper surface of the negative mold 412. In other embodiments, the solid rod or pin 421 may be formed one or more of the side surfaces or the bottom surface. Regardless of the orientation of the solid rod or pin 421, the formed midsole may be enclosed on all surfaces by a solid outer wall, except for the opening or channel that is formed through at least one of the solid outer walls. The opening or channel formed in at least one of the solid outer walls may provide an outlet for the negative mold 412 to be removed from the formed midsole (e.g., after the material that forms the negative mold 412 is chemically, mechanically, or thermally broken down). In some embodiments, the predetermined gap 420 formed along the top surface of the negative mold 412 may be provided by a cover 426 (see FIG. 28) that is placed on top of the mold base 414.

In some embodiments, the predetermined gap 420 formed between the mold base 414 and the negative mold 416 along the bottom surface of the negative mold 416 may be dimensioned to receive an outsole. For example, the shape and size of the predetermined gap 420 formed between the bottom surface of the negative mold 416 and the mold base 414 (e.g., an upper surface of the base recess 416) may conform to an outsole. In some embodiments, the outsole may be formed with geometric features (e.g., lattice structures, apertures, channels, tunnels, etc.) that match the formed midsole to ensure that the outsole engages with and may adhere to the formed midsole.

Figure 24:
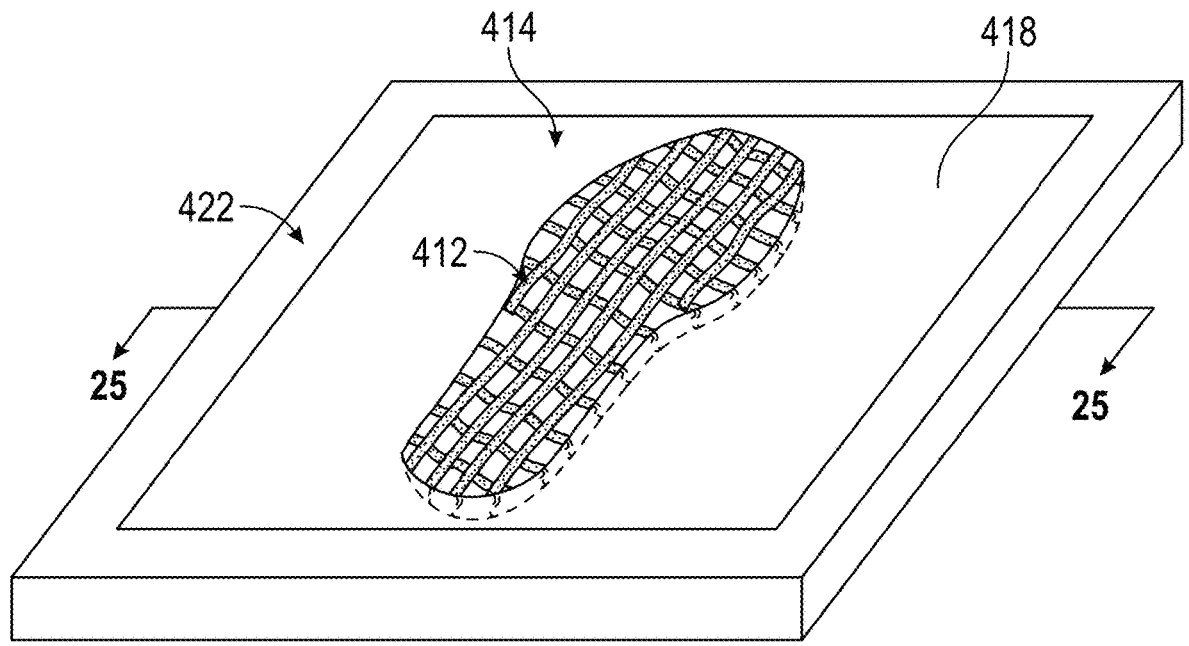
FIG. 24 is a perspective view of a negative mold and a mold base being formed as a unitary component.
Figure 25:
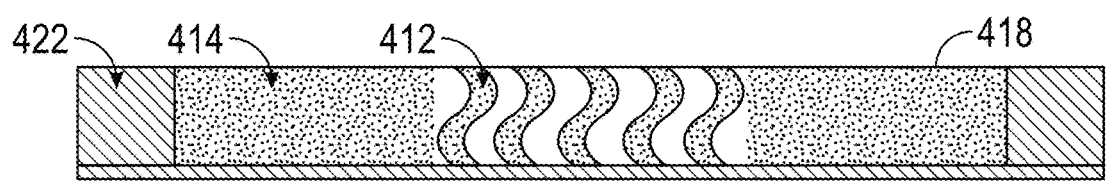
FIG. 25 is a cross-sectional view of the negative mold and the mold base of FIG. 24 taken along line 25-25.

As described in the methods 200 and 300, in some embodiments, a negative mold may be printed integrally with the mold base. FIGS. 24 and 25 illustrate one embodiment with the negative mold 412 and the mold base 414 being formed as a unitary component. For example, the print head 404 may simultaneously print the negative mold 412 and the mold base 414, layer by layer. The combined negative mold 412 and the mold base 414 may be inserted into a support frame 422. The support frame 422 may at least partially enclose the mold base 414. For example, in the illustrated embodiment, the support frame 422 may enclose all the outer surfaces of the mold base 414, except the top surface 418. In general, the support frame 422 may be configured to avoid damage of the negative mold 412 and the mold base 414 during handling or during the formation process.

Figure 26:
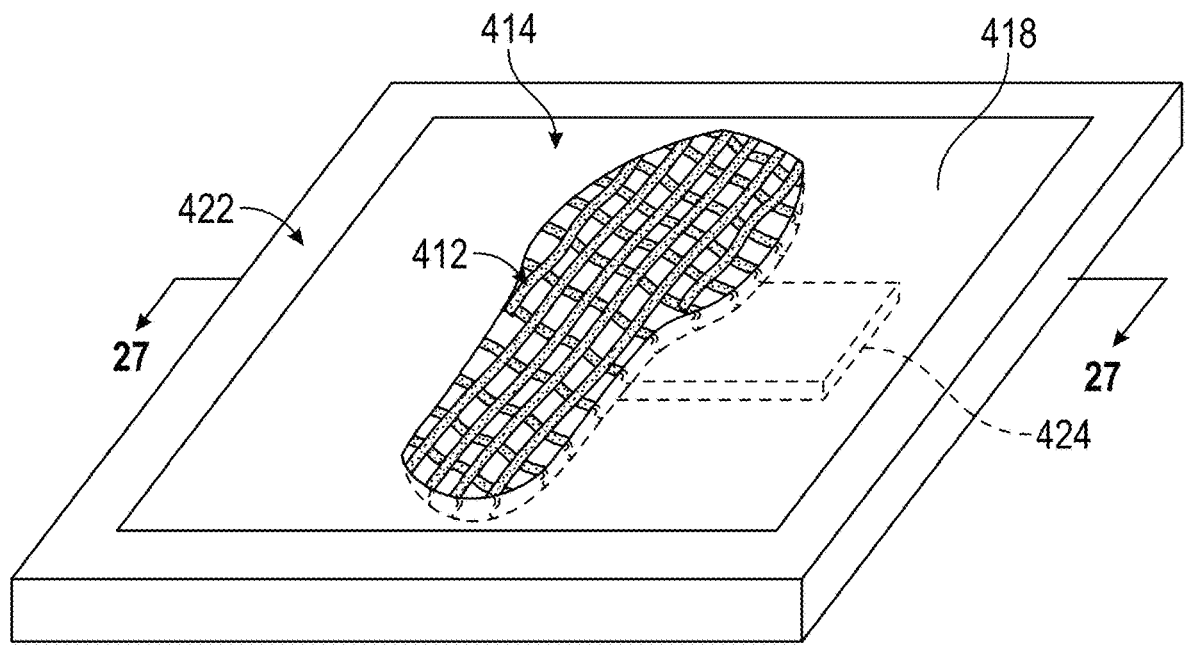
FIG. 26 is a perspective view of a negative mold and a mold base, where the mold base includes a reservoir.
Figure 27:
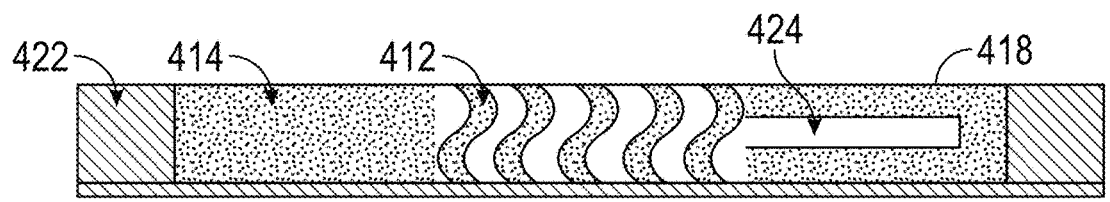
FIG. 27 is a cross-sectional view of the negative mold and the mold base taken along line 27-27.

In some embodiments, the mold base 414 may include a reservoir 424 arranged internally within the mold base 414, as illustrated in FIGS. 26 and 27. The reservoir 424 may be arranged within the mold base 414 regardless of whether the negative mold 412 and the mold base 414 are fabricated as unitary components. In the illustrated embodiment, the reservoir 424 defines a cavity in the mold base 414 within which excess midsole material may flow during the forming process. In the illustrated embodiment, the reservoir 424 defines a generally rectangular-prism cavity and extends from one side of the negative mold 412. In some embodiments, the reservoir 424 may extend around a periphery of the negative mold 412, and may define any shape as desired.

Figure 28:
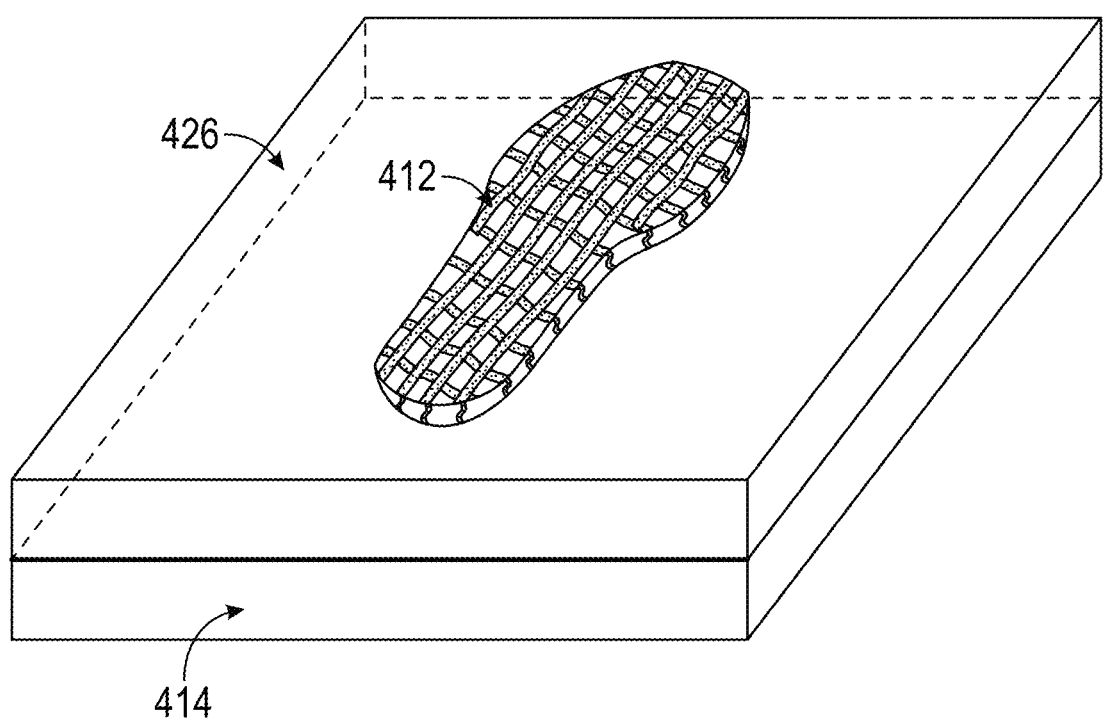
FIG. 28 is a perspective view of a cover plate arranged on a mold base and a negative mold.

Turning to FIG. 28, in some embodiments, the negative mold 412 and the mold base 414 may be enclosed by a cover plate 426 after the negative mold 412 is supplied with the midsole material. In some embodiments, the cover plate 426 may be clamped to the mold base 414 and/or to the support frame 422. In the illustrated embodiment, the cover plate 426 defines a similar shape as the mold base 414. In other embodiments, the cover plate 426 may define a shape that is similar to the outer periphery of the negative mold 412.

Figure 29:
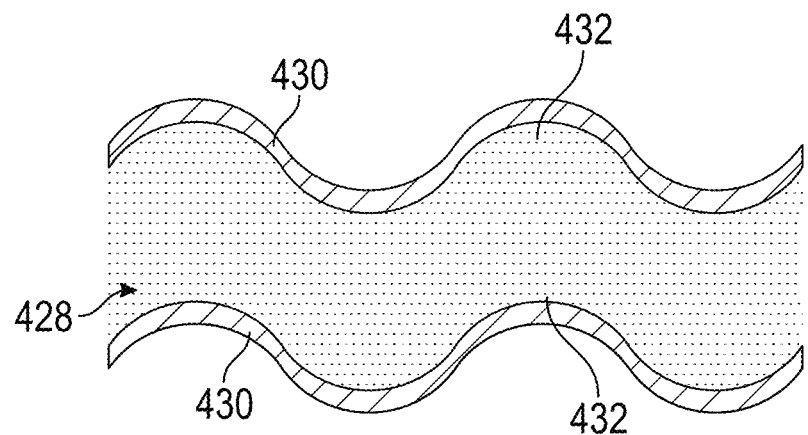
FIG. 29 is a schematic illustration of a thin film molded over a formed midsole, where the thin film engages the formed midsole.
Figure 30:
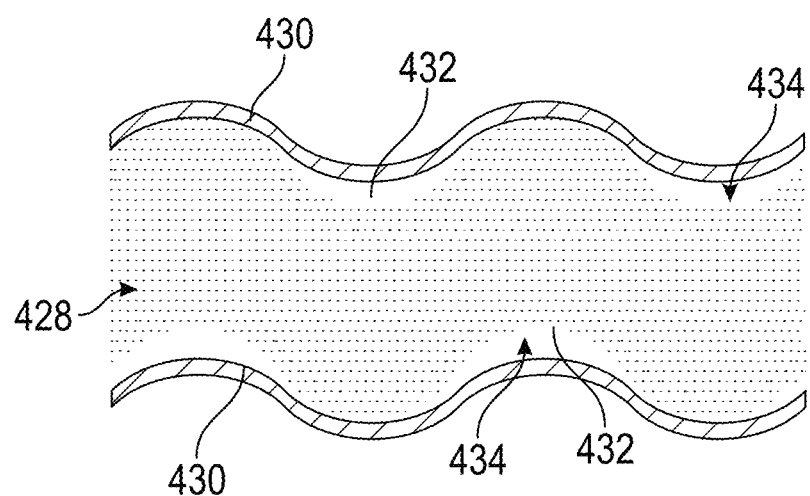
FIG. 30 is a schematic illustration of a thin film molded over a formed midsole, where the thin film partially engages the formed midsole.

As described herein at step 320, in some embodiments, a thin film may be vacuum molded over a formed midsole. FIGS. 29 and 30 illustrate embodiments of a formed midsole 428 having a film 430 that may be vacuum molded over the midsole 428 after forming via the method 200 or the method 300. In the embodiment of FIG. 29, the film 430 may be molded onto the midsole 428, so that the film 430 conforms to and is in engagement with exterior surfaces 432 of the midsole 428.

In some embodiments, the film 430 may not be in continuous engagement with the exterior surfaces 432 of the midsole 428. For example, the film 430 may partially extend into the openings, voids, apertures, channels, and/or passages 434 that extend along or are formed in the exterior surfaces 432 in the midsole 428. In other words, a penetration depth of the film 430 into the openings, voids, apertures, channels, and/or passages 434 may be controlled by the properties of the vacuum molding process.

Figure 31:
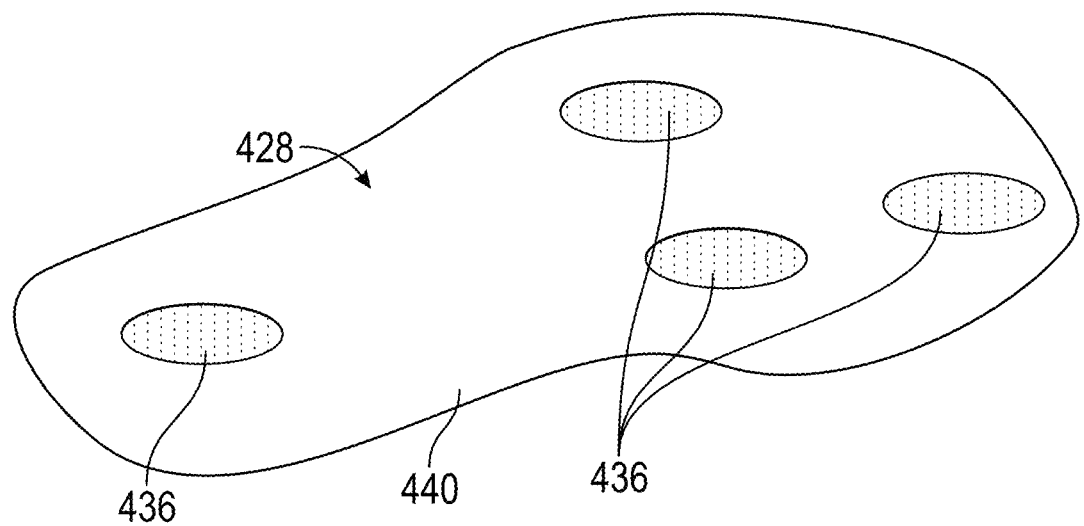
FIG. 31 is a bottom perspective view of a formed midsole having adhesive pads arranged in selective locations.
Figure 32:
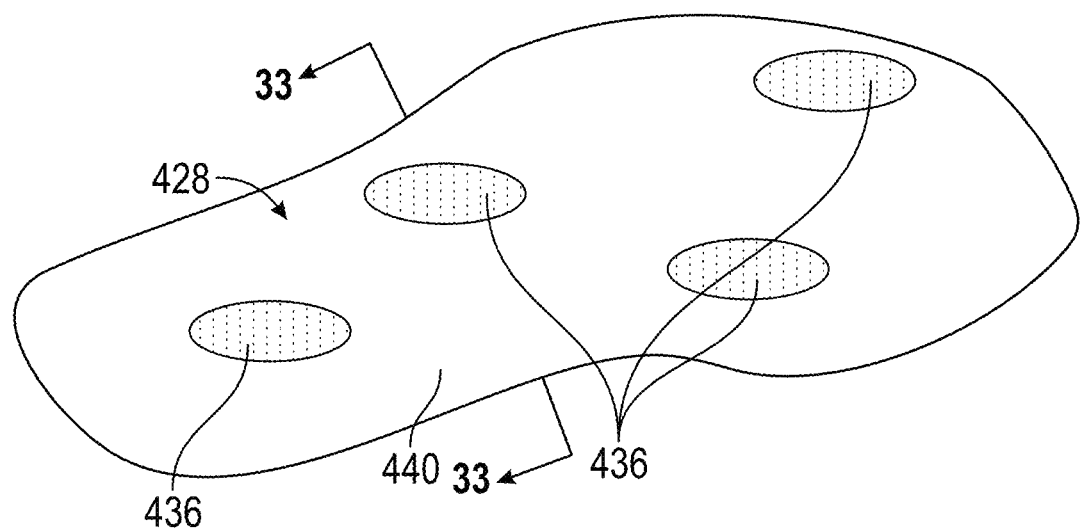
FIG. 32 is a bottom perspective view of a formed midsole having adhesive pads arranged in a predetermined pattern.
Figure 33:
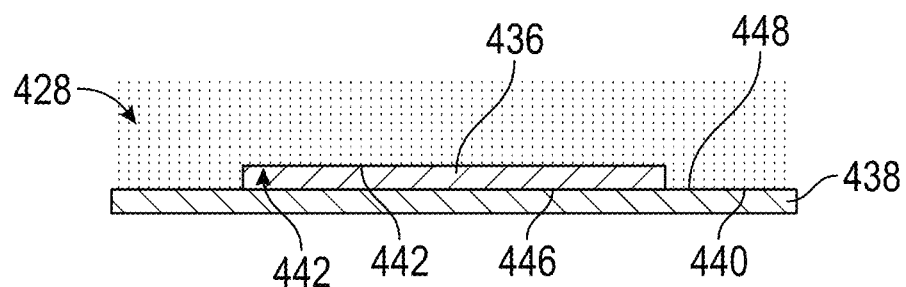
FIG. 33 is a partial cross-sectional view of the formed midsole and adhesive pad of FIG. 32 taken along line 33-33.

As described herein at step 322, in some embodiments, a formed midsole may be coupled to an outsole. FIGS. 31-33 illustrate the use of one or more adhesive pads 436 that are configured to couple the formed midsole 428 to an outsole 438. The adhesive pads 436 may be surrounded by an adhesive layer to enable bonding to the midsole 428 and the outsole 438. In some embodiments, as illustrated in FIG. 31, the adhesive pads 436 may be arranged in specific high-abrasion areas, such as a forefoot region (see, e.g., the forefoot region 34), a heel region (see, e.g., the heel region 38), and/or under an area where a user's big toe may be placed while wearing an article of footwear. In other embodiments, as illustrated in FIG. 32, the adhesive pads 436 may be selectively arranged in a predetermined pattern along a bottom side 440 of the formed midsole 428.

With specific reference to FIG. 33, in some embodiments, the negative mold may be designed to form cavities in the bottom side 440 of the midsole 428 (i.e., a side that faces the outsole) within which the adhesive pads 436 may be inserted. Each of the adhesive pads 436 may be received within a respective cavity 442. The cavities 442 may be formed by a continuous surface 444 that is recessed into the bottom side 440 of the midsole 428 to ensure that the adhesive pads form a good bond with the midsole 428, as well as the outsole 438. An outer surface 446 of the adhesive pads 436 (i.e., a surface that faces the outsole 438) is configured to bond to an inner surface 448 of the outsole 438 and couple the midsole 428 to the outsole 438.

Figure 34:
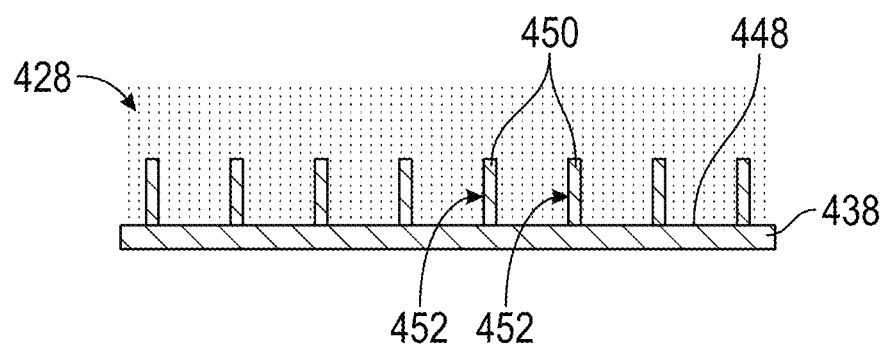
FIG. 34 is a schematic illustration of an outsole having pins coupled to a formed midsole.
Figure 35:
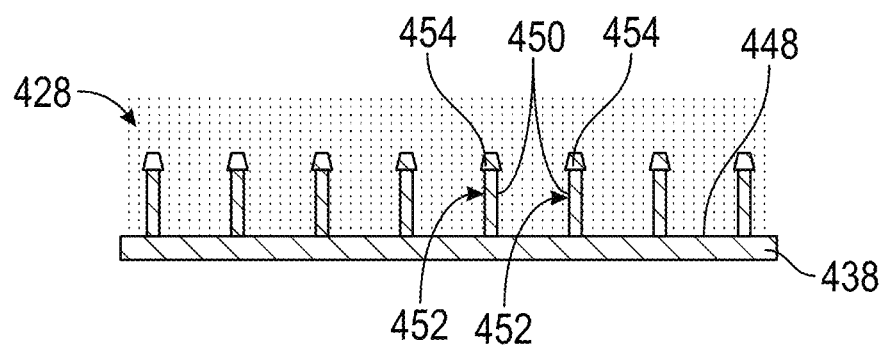
FIG. 35 is a schematic illustration of an outsole having pins with protruding heads coupled to a formed midsole.

In some embodiments, a formed midsole may include a mechanical coupling to an outsole either in addition to an adhesive bond or as an alternative to an adhesive bond. For example, FIG. 34 illustrates one embodiment were the outsole 438 includes a plurality of pins 450 that extend upwardly from the inner surface 448 of the outsole 438 (i.e., toward the midsole), and the midsole 428 may include mating recesses 452 formed therein that are configured to receive the pins 450 that extend from the outsole 438. The mating between the pins 450 in the outsole 438 and the surfaces forming the recesses 452 in the midsole 428 may provide a mechanical coupling between the outsole 438 and the midsole 428. In some embodiments, the pins 450 and the mating recesses 452 may define a geometry that inhibits or prevents the pins 450 from being removed, without excessive force, from the recesses 452. For example, FIG. 35 illustrates one embodiment where the ends of the pins 450 include a plug 454 that is configured to be received within the recess 452 and inhibit or prevent decoupling of the outsole 438 from the midsole 428.

Figure 38:
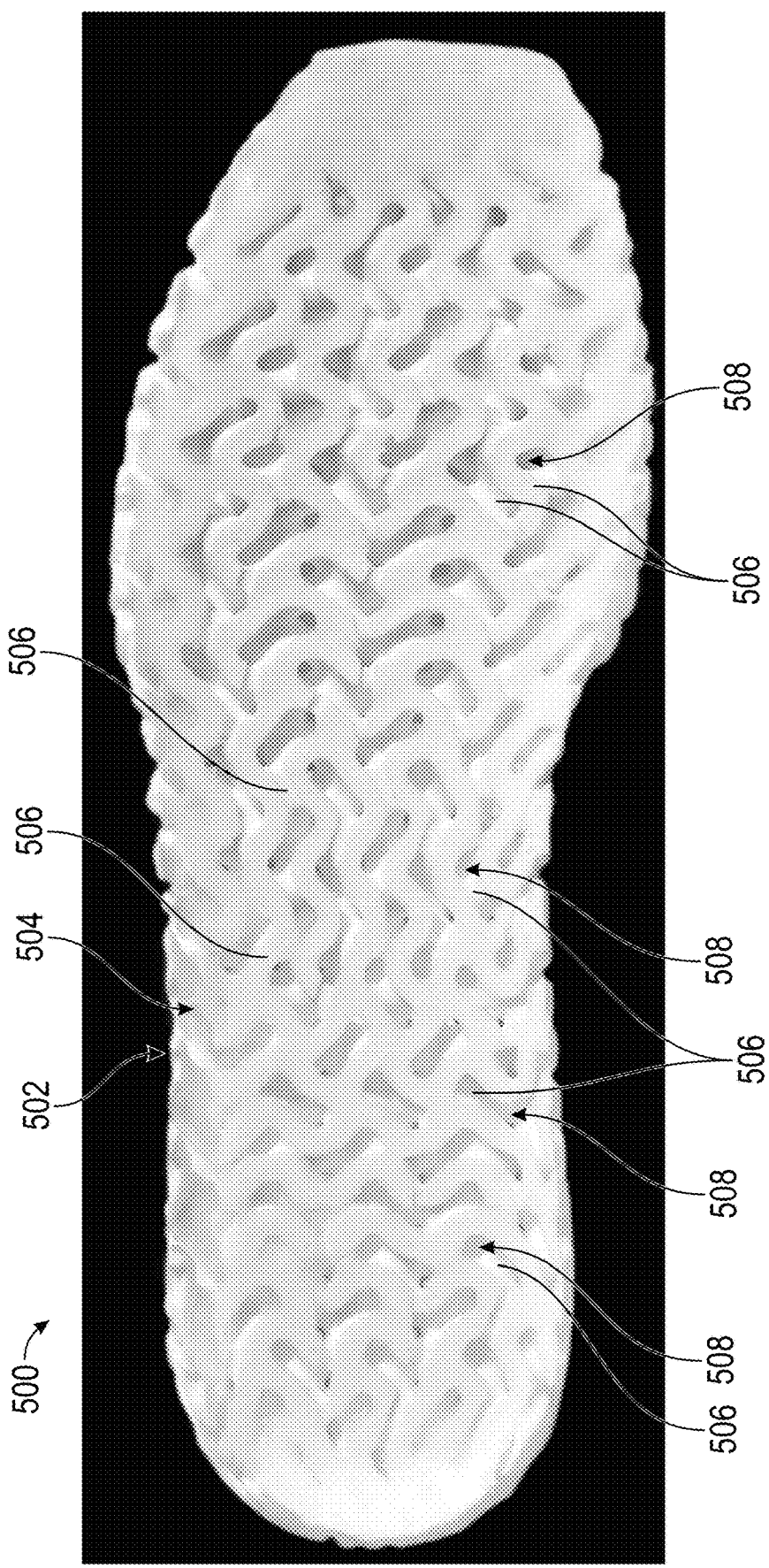
FIG. 38 is a bottom view of the formed midsole of FIG. 36.

As described herein, the methods 200 and 300 enable a negative mold to be printed via an additive manufacturing system and a midsole for an article of footwear may be formed from the negative mold. FIGS. 36-38 illustrate one embodiment of a midsole 500 that may be formed via either the method 200 or the method 300. In some embodiments, the midsole 500 may be formed and manufactured into an article of footwear (e.g., the article of footwear 25).

In general, the negative mold used to form the midsole 500 may include one or more solid interconnected surfaces or segments that result in the formation of one or more openings, voids, apertures, channels, and/or passages in the midsole 500. In the illustrated embodiment, the midsole 500 includes a lattice structure 502 with a unit cell 504 that is formed by interconnected minimal surfaces or segments 506. In general, the lattice structure 502 formed in the midsole 500 may define one or more openings, voids, apertures, channels, and/or passages 508 that are formed by the interconnected minimal surfaces or segments 506 and extend throughout the midsole 500. In the illustrated embodiment, the lattice structure 502 defines a gyroid structure that includes triply periodic minimal surfaces. In general, the use of a differential geometry structure (e.g., a gyroid) may reduce stress concentrations formed along the midsole 500 due to the reduction in sharp edges formed on the lattice structure 502, which may provide improved cushioning performance, for example, in the midsole 500.

In some embodiments, a mold according to the present disclosure may be formed, via additive manufacturing, from a sand material or a wax material. For example, a mold according to the present disclosure may be formed layer by layer via an additive manufacturing process, and the mold may include one or more surfaces or segments that forms one or more openings, voids, apertures, channels, or passages in the formed midsole. In some embodiments, a mold may be printed layer by layer from a sand material that may include a binder (e.g., a polymer or resin) added to the sand material to bind the sand particles together. In some embodiments, a mold that is printed layer by layer from a wax material or a sand material may include internal or external support segments that are connected to one or more peripheral segments. In some embodiments, a printed sand mold or a printed wax mold may be formed as a negative mold according to the method 200 or the method 300.

Figure 39:
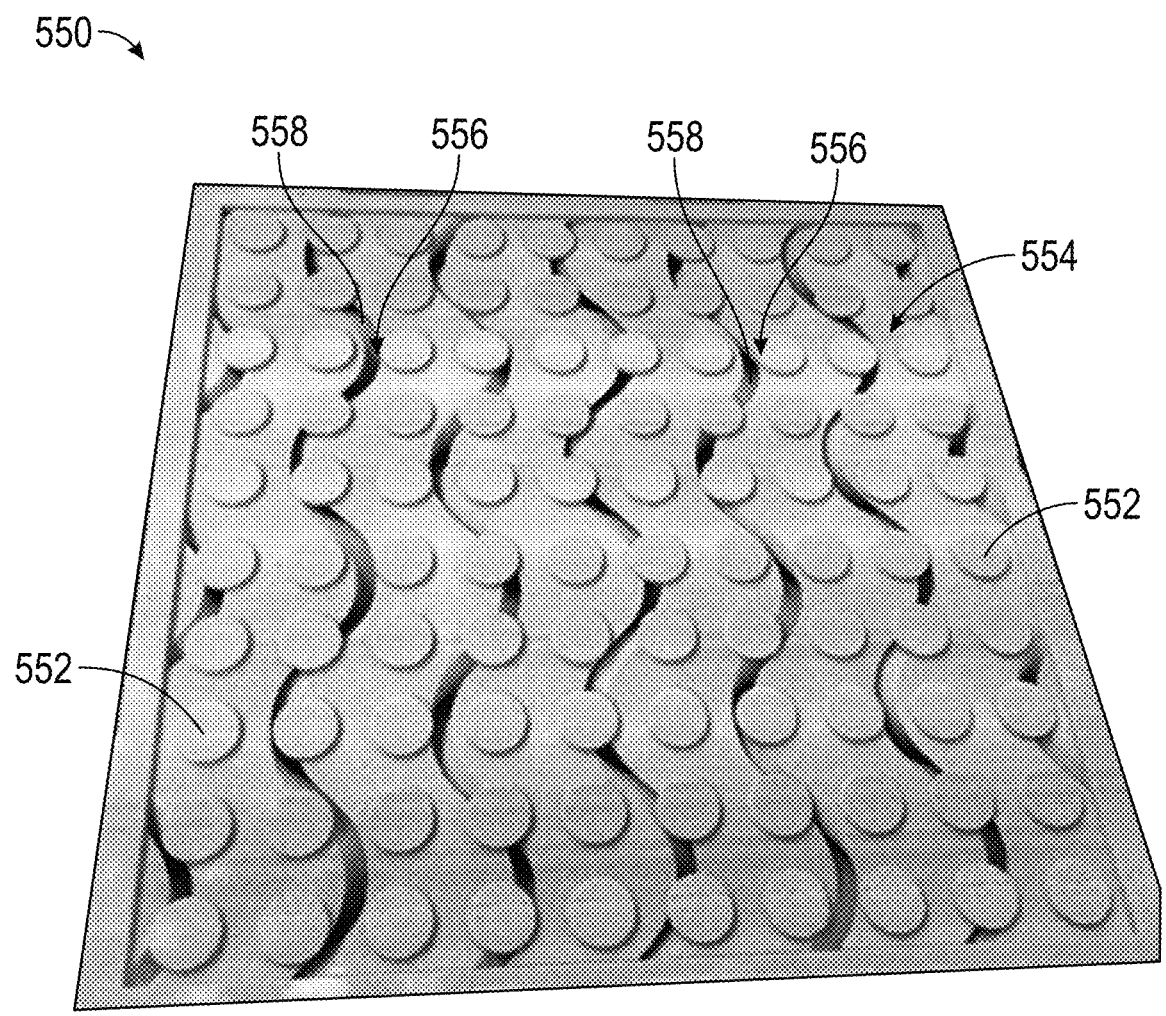
FIG. 39 is a top perspective view of a sand mold including a gyroid pattern.

FIG. 39 illustrates one embodiment of a sand mold 550 that may be formed according to the present disclosure. In the illustrated embodiment, the sand mold 550 may include a plurality of pads 552 formed over a first (e.g., upper) side 554 of the sand mold 550, and a plurality of channels 556 extending throughout the sand mold 550. In some embodiments, the pads 552 may result in the formation of similarly-shaped cavities in a midsole, or another component of an article of footwear (e.g., the article of footwear 25). In the illustrated embodiment, the plurality of channels 556 may be formed by one or more interconnected surfaces 558. The interconnected surfaces 558 may form a lattice structure in the formed midsole or in a portion of the formed midsole. The interconnected surfaces 558 may define positive structure that may result in the formation of one or more openings, voids, apertures, channels, or passages in the formed midsole or in a portion of the midsole (see FIG. 42).

Figure 40:
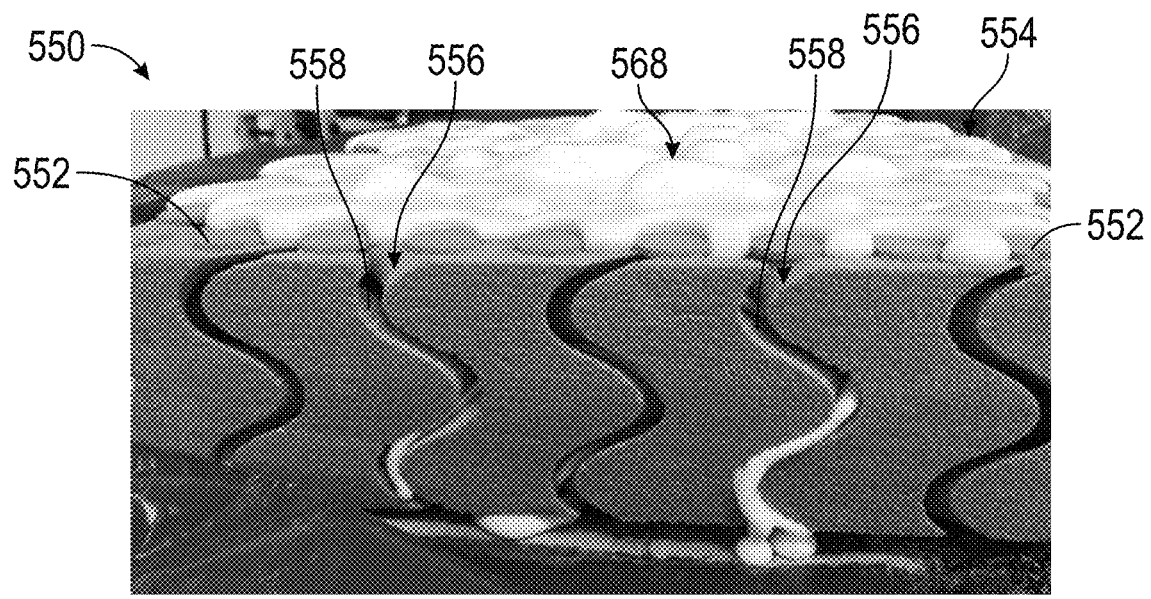
FIG. 40 is a side view of the sand mold of FIG. 39 being supplied with a midsole material.
Figure 41:
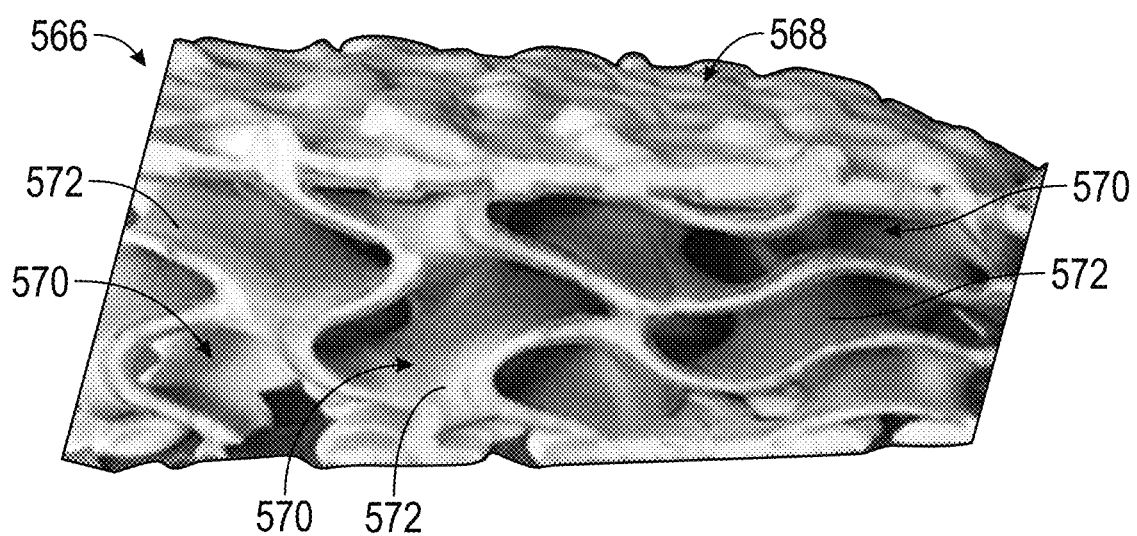
FIG. 41 is a partial cross-sectional view of a portion of a midsole formed from the sand mold of FIG. 39.

Turning to FIGS. 40 and 41, the embodiment of FIG. 39 is illustrated being formed into at least a portion of a midsole 566. For example, as illustrated in FIG. 40, a midsole material 568 may be supplied to the first surface 554 of the sand mold 550 and the midsole material 568 may fill the sand mold 550. In some embodiments, the midsole material may be a resin foam or polymer material (e.g., polyurethane or polyurethane foam). The resulting portion of a midsole 566, after the sand mold 550 has been removed from the formed portion of a midsole 566, is illustrated in FIG. 41. In some embodiments, the sand mold 550 may be mechanically (e.g., brushed) and/or chemically (e.g., solvent) removed from the formed midsole 566. As illustrated in FIG. 41, the portion of the midsole 566 includes one or more interconnected openings, voids, apertures, channels, or passages 570 that are formed by the interconnected surfaces 558 present in the sand mold 550. The one or more interconnected openings, voids, apertures, channels, or passages 570 may be surrounded and formed within one or more interconnected surfaces 572 of the formed midsole 566.

Figure 42:
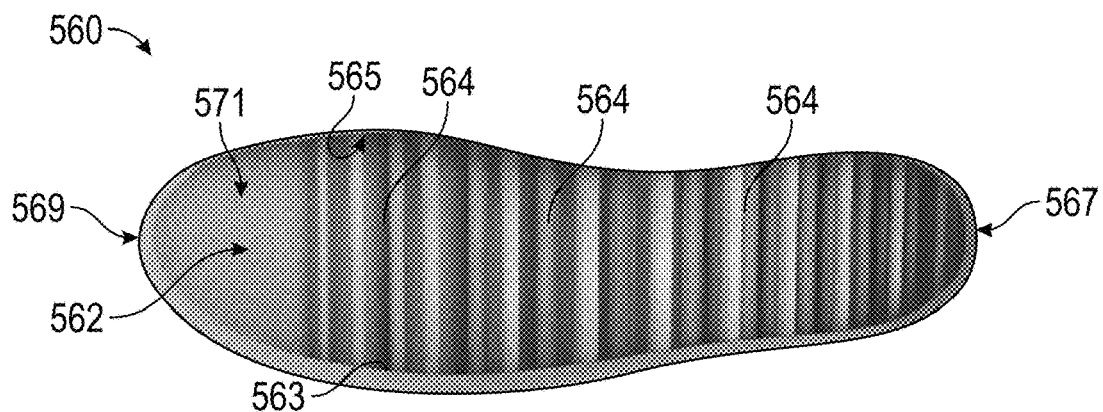
FIG. 42 is a top view of a sand mold including a plurality of beams.

FIG. 42 illustrates another embodiment of a sand mold 560 that may be formed according to the present disclosure. In the illustrated embodiment, the sand mold 560 defines a cavity 562 in the general shape of a midsole, and may include a plurality of beams or segments 564 extending laterally across the cavity 562. In the illustrated embodiment, the plurality of beams or segments 564 may define a generally cylindrical shape with varying diameters being defined by the plurality of beams or segments 564. The beams or segments 564 may define a solid volume in the sand mold 560 that may result in the formation of one or more openings, voids, apertures, channels, or passages in the formed midsole (see FIG. 41). For example, during a molding process, a midsole material (e.g., a resin foam, a polymer foam, a polyurethane foam, etc.) may be injected or poured into the cavity 562 of the sand mold 560 and the midsole material may form around the solid volume defined by the beams 564, such that similarly-shaped channels or tunnels (e.g., empty volume) with corresponding varying diameters are formed in the formed midsole.

In the illustrated embodiment, the beams or segments 564 extend laterally across the cavity 562 from a lateral side 563 of the cavity 562 to a medial side 565 of the cavity 562. The beams or segments 564 are arranged within the cavity 562 from a rear distal end 567 of the cavity 562 to a location between the rear distal end 567 and a front distal end 569. In this way, for example, the cavity 562 may define an empty region 571 that is devoid of the beams or segments 564. In the illustrated embodiment, the empty region 571 is arranged adjacent to the front distal end 569 of the cavity 562 (e.g., in a region where a user's toes may be arranged on a formed midsole). In some embodiments, the beams or segments 564 may be arranged longitudinally over the cavity 562 from the rear distal end 567 to the front distal end 569 with no empty region. In some embodiments, the empty region 571 may be arranged in a different location along the cavity 562. For example, the empty region 571 may be arranged adjacent to the rear distal end 567 (e.g., in a region where a user's heel may be arranged on a formed midsole).

Figure 43:
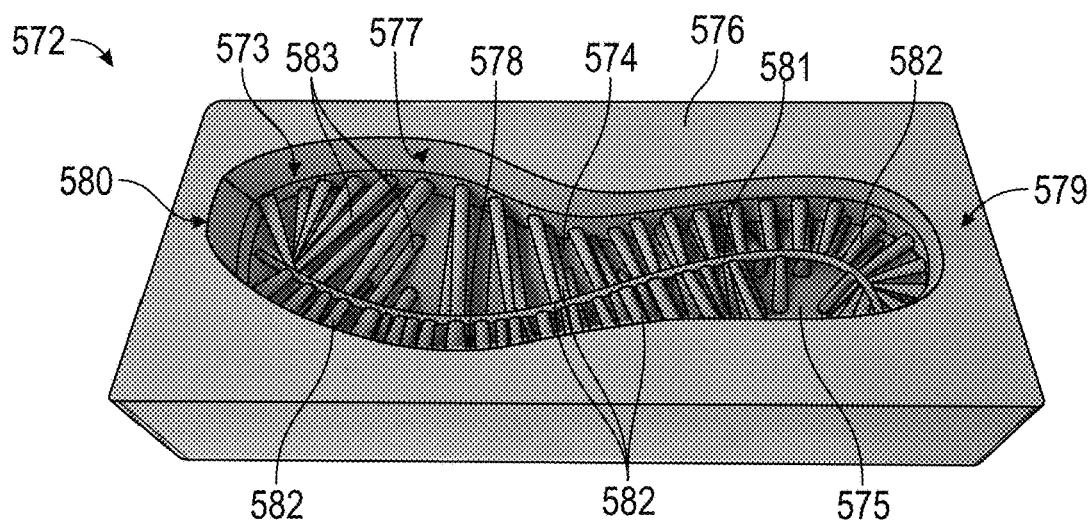
FIG. 43 is a top perspective view of a sand mold including a plurality of peripheral beams and a support beam.
Figure 44:
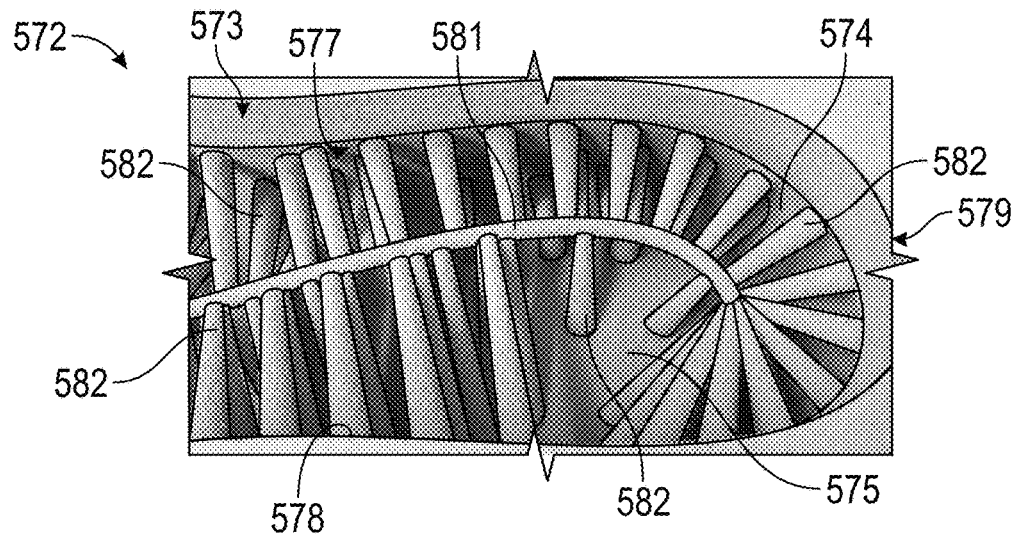
FIG. 44 is an enlarged view of a portion of the sand mold of FIG. 43.

FIGS. 43 and 44 illustrate another embodiment of a sand mold 572 that me be formed according to the present disclosure. In the illustrated embodiment, the sand mold 572 defines a cavity 573 in the general shape of a midsole. The cavity 573 is defined by a peripheral surface 574 that extends around the cavity 573 and a bottom surface 575 that is recessed into a top surface 576 of the sand mold 572 to define a depth of the cavity 573. The peripheral surface 574 extends around the cavity 573 to define a medial side 577, a lateral side 578, a rear distal end 579, and a front distal end 580.

The sand mold 572 includes a support segment or beam 581 and a plurality of peripheral segments or beams 582. The support beam 581 extends longitudinally in a curved shape along the cavity from a location adjacent to the rear distal end 579 to a location adjacent to the front distal end 580. Each of the peripheral beams 582 is connected between the support beam 581 and one of the peripheral surface 574 or the bottom surface 575. In the illustrated embodiment, each of the peripheral beams 582 defines a generally frustoconical shape with a gradually changing diameter being defined longitudinally along the peripheral beams 582. For example, each of the peripheral beams 582 may define a gradually increasing diameter in a direction from the support beam 581 toward the peripheral surface 574 or the bottom surface 575. In some embodiments, each of the peripheral beams 582 may define a generally constant diameter. In some embodiments, a portion of the peripheral beams 582 may define a generally constant diameter and a remaining portion of the peripheral beams 582 may define a gradually changing diameter.

In general, the support beam 581 may support an end of each of the peripheral beams 581 that is arranged opposite to the peripheral surface 574 or the bottom surface 575. In the illustrated embodiment, a peripheral beam 582 is connected between one or more of the support beam 581 and the medial side 577 of the peripheral surface 574, the support beam 581 and the lateral side 578 of the peripheral surface 574, the support beam 581 and the rear distal end 579 of the peripheral surface 574, the support beam 581 and the front distal end 580 of the peripheral surface 574, or the support beam 581 and the bottom surface 575. In other words, the peripheral beams 582 may be connected to various locations around the peripheral surface 574 and various locations along the bottom surface 575. At some locations along the support beam 581, two or more peripheral beams 582 extend from the support beam 581 and connect to the peripheral surface 574. At some locations along the support beam 581, two or more peripheral beams 582 extend from the support beam 581 and connect to the bottom surface 575. At some locations along the support beam 581, one support beam extends from the support beam 581 and connects to the peripheral surface 574 and another support beam extends from the same location along support beam 581 and connects to the peripheral surface.

A portion (e.g., two or more) of the peripheral beams 582 may be connected to the peripheral surface 574 at the same height along the peripheral surface 574 (i.e., a distance between the bottom surface 575 and the location on the peripheral surface 574 where the peripheral beam 582 is connected). A portion (e.g., two or more) of the peripheral beams 582 may be connected to the peripheral surface 574 at different heights along the peripheral surface 574.

In general, the support beam 581 and the peripheral beams 582 define solid volume in the sand mold 572 that result in the formation of empty volume (e.g., one or more openings, voids, apertures, channels, tunnels, or passages) in the formed midsole. For example, during a molding process, a midsole material (e.g., a resin foam, a polymer foam, a polyurethane foam, etc.) may be injected or poured into the cavity 573 of the sand mold 572 and the midsole material may form around the solid volume defined by the support beam 581 and the peripheral beams 582, such that a plurality of similarly-shaped apertures, channels, or tunnels are formed in the formed midsole. The apertures, channels, or tunnels formed in the midsole may extend to and through an outer peripheral surface of the formed midsole (i.e., a surface of the midsole that is formed by the midsole material forming in regions along the peripheral surface 574 that are devoid of peripheral beams 582).

In some embodiments, a segmented wax mold may be printed layer by layer from a wax material and then overmolded with a midsole material to form a midsole or a midsole assembly with a combined midsole and outsole.

Figure 45:
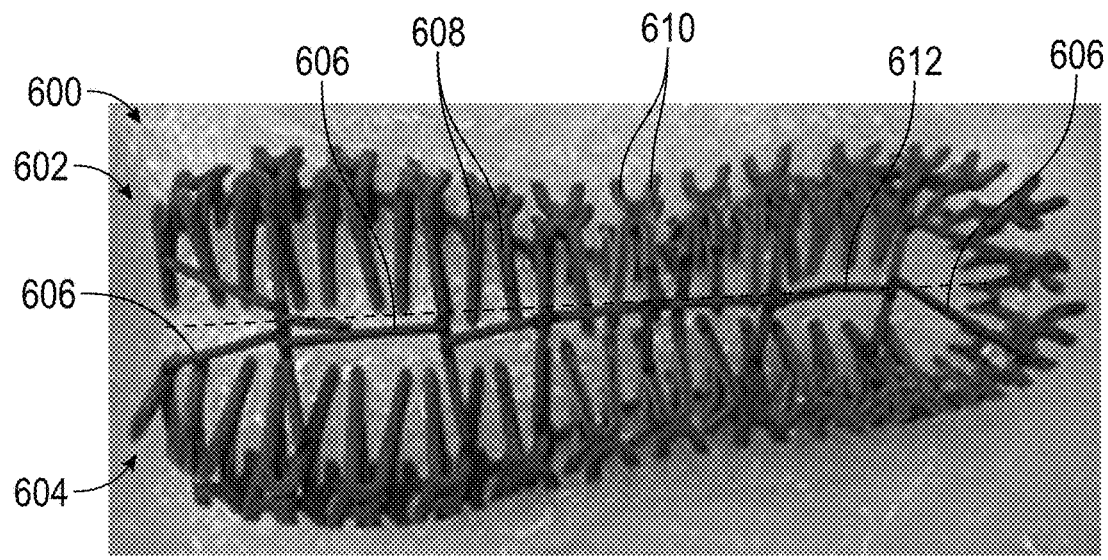
FIG. 45 is a top perspective view of a wax mold.

FIG. 45 illustrates one embodiment of a wax mold 600 that may be formed according to the present disclosure. The wax mold 600 includes a plurality of interconnected segments 602. In the illustrated embodiment example, the plurality of segments 602 includes a plurality of peripheral segments 604 and a plurality of internal segments 606 arranged laterally between the plurality of peripheral segments 604. The plurality of peripheral segments 604 may each include an inner portion 608 and an outer portion 610. The inner portions 608 may extend in a direction laterally inwardly toward a longitudinal axis 612 defined by the wax mold 600. The outer portions 610 may extend in a direction laterally away from the longitudinal axis 612 (e.g., in a direction toward the outer periphery of the wax mold). The outer portions 610 may combine to define an outer perimeter or periphery of the wax mold 600.

In the illustrated embodiment, the inner portions 608 define a generally fork-like shape with two prongs extending toward the longitudinal axis 612, and the outer portions 610 define a generally fork-like shape with two prongs extending outwardly toward the periphery of the wax mold 600. In other embodiments, the inner portions 608 and/or the outer portions 610 may define an alternative shape (e.g., single-pronged or more than two prongs). In the illustrated embodiment, the internal segments 606 interconnect to one another to form a continuous support structure along the wax mold 600. The internal segments 606 may extend out and connect to one or more of the plurality of peripheral segments 604. In this way, for example, the internal segments 606 may provide support to the peripheral segments 604 and promote overall structural integrity of the wax mold 600.

Figure 46:
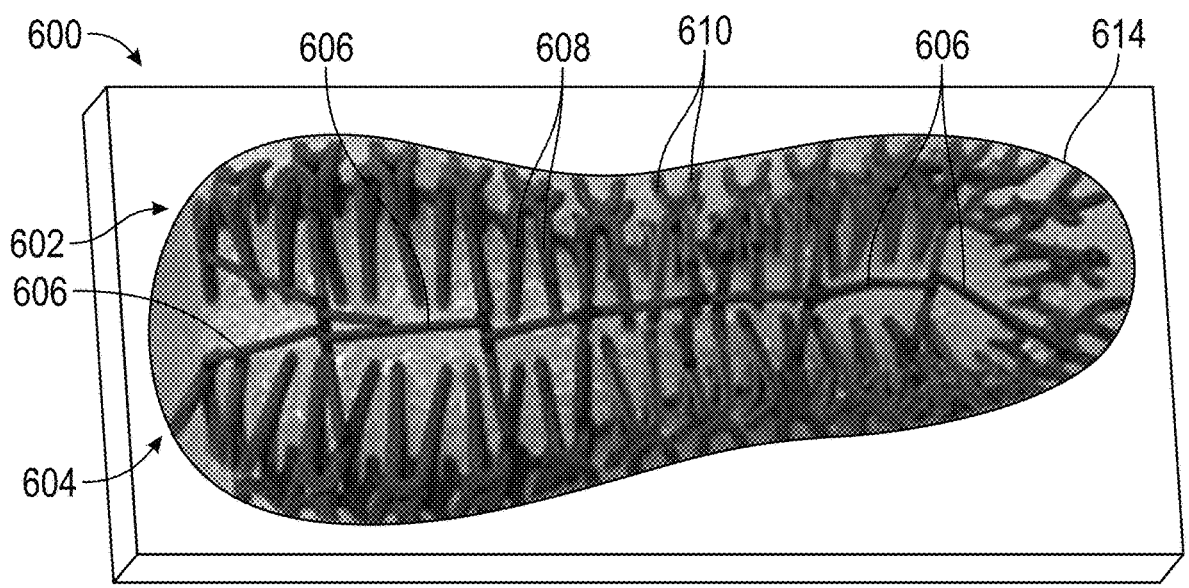
FIG. 46 is a top perspective view of the wax mold of FIG. 45 within a mold base.

Turning to FIG. 46, prior to forming a midsole or a midsole assembly, the wax mold 600 may be placed within a mold base 614 that is designed to enclose the wax mold 600. The wax mold 600 in combination with the mold base 614 may be configured to shape a midsole or a midsole assembly. In the illustrated embodiment, the outer portions 610 are in engagement with the mold base 614. In this way, for example, the mold base 614 may secure the wax mold 600 therein and prevent or inhibit the plurality of segments 602 from displacing during the molding process.

Figure 47:
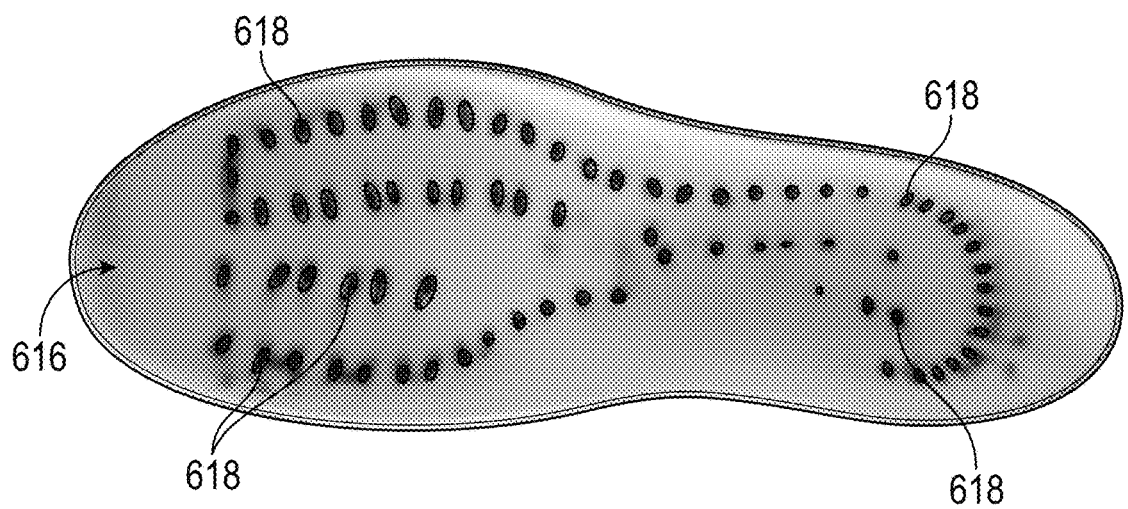
FIG. 47 is a top view of a sole assembly formed with the wax mold of FIG. 45.
Figure 48:
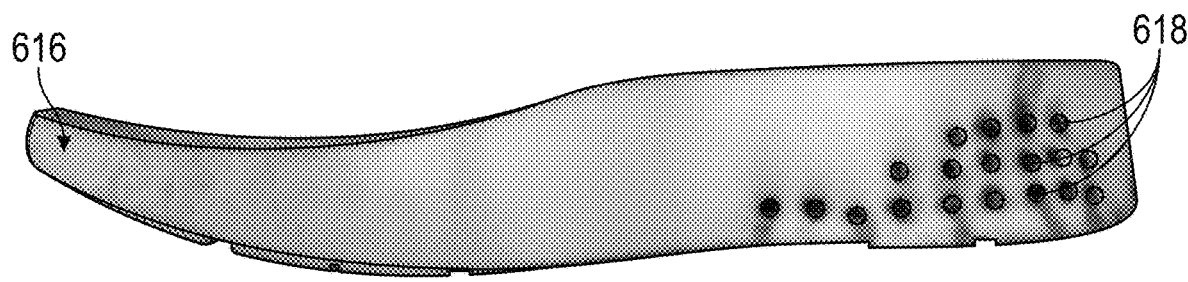
FIG. 48 is a side view of the sole assembly of FIG. 47.

During a molding process, a midsole material (e.g., a resin foam, a polymer foam, a polyurethane foam, etc.) may be injected or poured into the mold base 614 and over the wax mold 600. In other words, the midsole material may be overmolded around the wax mold 600 to form a midsole or a midsole assembly. Once the midsole material has cooled, the formed midsole or midsole assembly may be heated to a temperature above the melting point of the wax mold 600 but below a melting point of the formed midsole or midsole assembly. The wax mold 600 may then melt away and the formed midsole or midsole assembly 616 may remain (see FIGS. 47-49), and may be assembled into an article of footwear (e.g., the article of footwear 25). In some embodiments, the wax melted from the wax mold 600 may be collected and reused to print another wax mold.

In general, the segments 602 may be define solid volume in the wax mold 600 that form to form apertures, openings, channels, or tunnels in the formed midsole 616. For example, as the midsole material forms around the solid volume defined by the segments 602 and the segments 602 of the wax mold 600 are subsequently melted away, the formed midsole may include a plurality of apertures, tunnels, or channels 618 with shapes and sizes that conform to the segments 602 of the wax mold 600 (see FIGS. 47 and 48).

Figure 49:
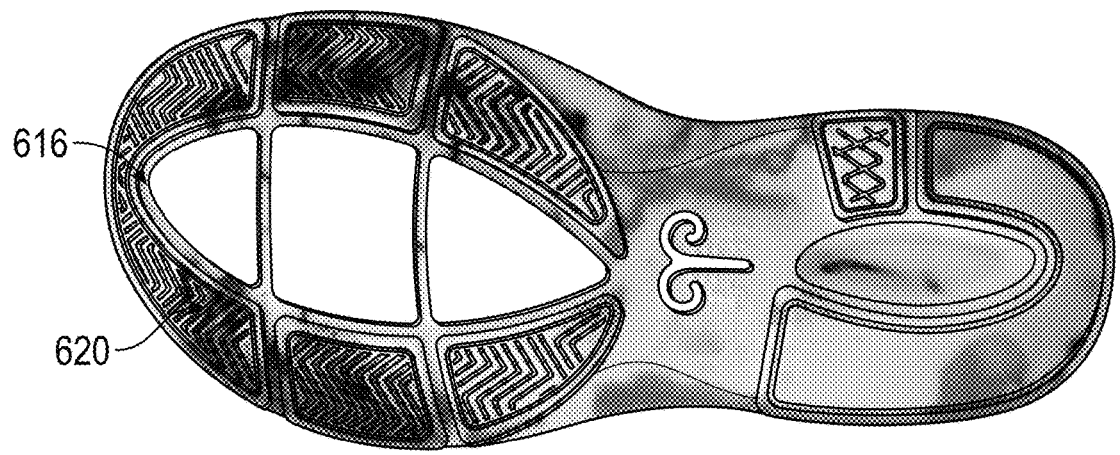
FIG. 49 is a bottom view of the sole assembly of FIG. 47.

In some embodiments, a bottom surface of the mold base 614 may include an empty volume that forms a sole integrally with the midsole. For example, as illustrated in FIG. 49, the formed midsole 616 includes a sole portion 620 that is formed integrally with the midsole 616.

Figure 50:
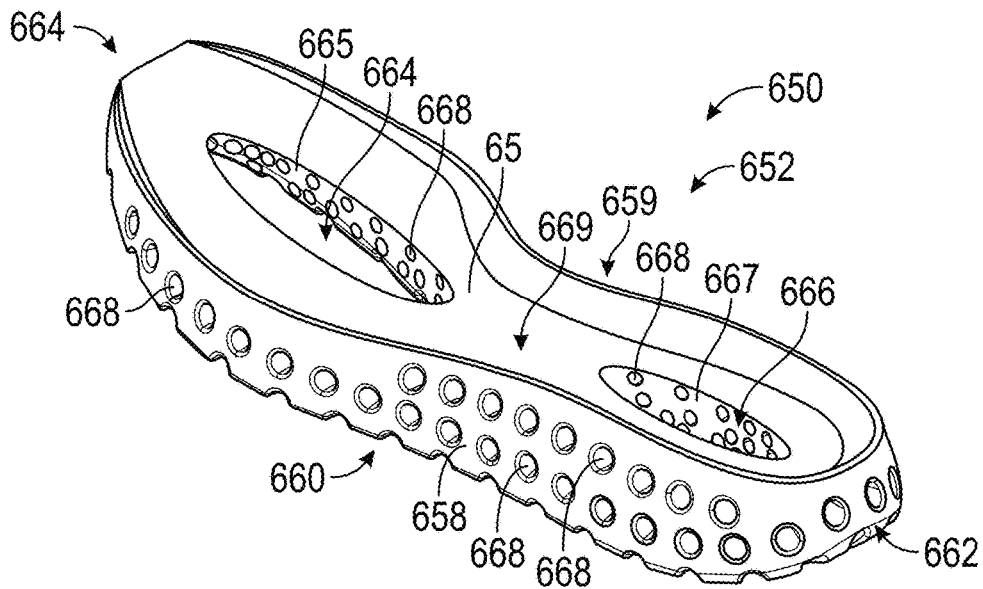
FIG. 50 is a top, rear, left isometric view of a midsole including a plurality of channels.
Figure 51:
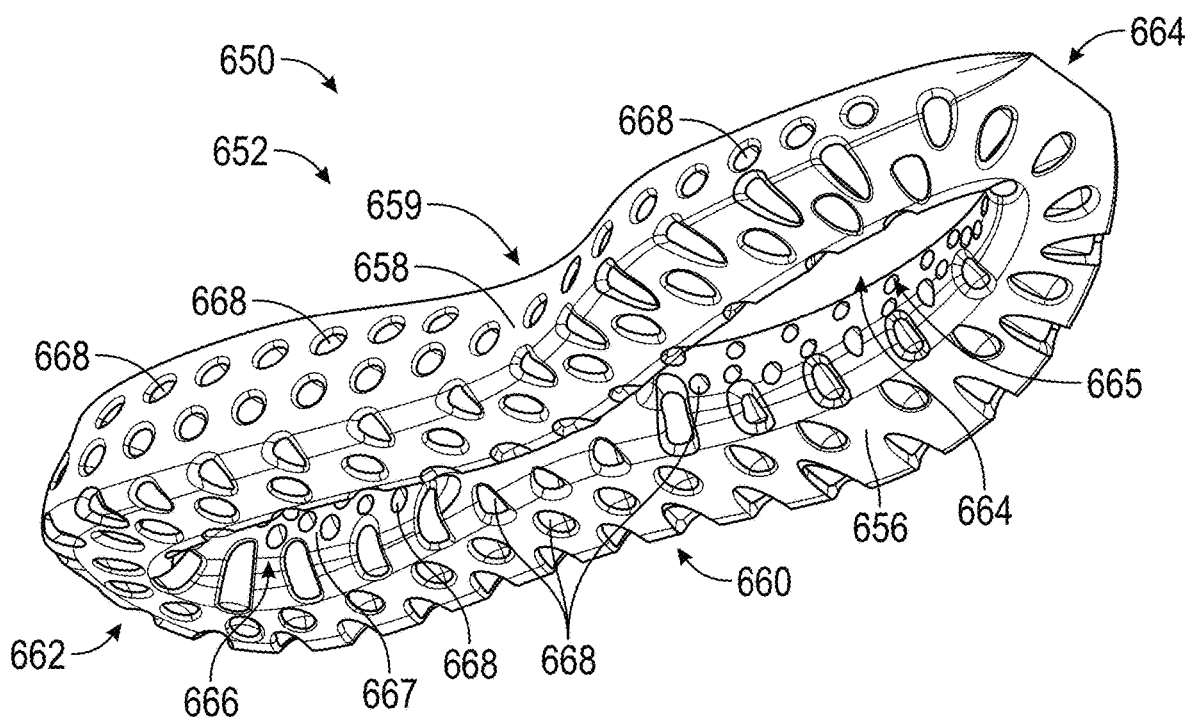
FIG. 51 is a bottom, front, right isometric view of the midsole of FIG. 50.
Figure 52:
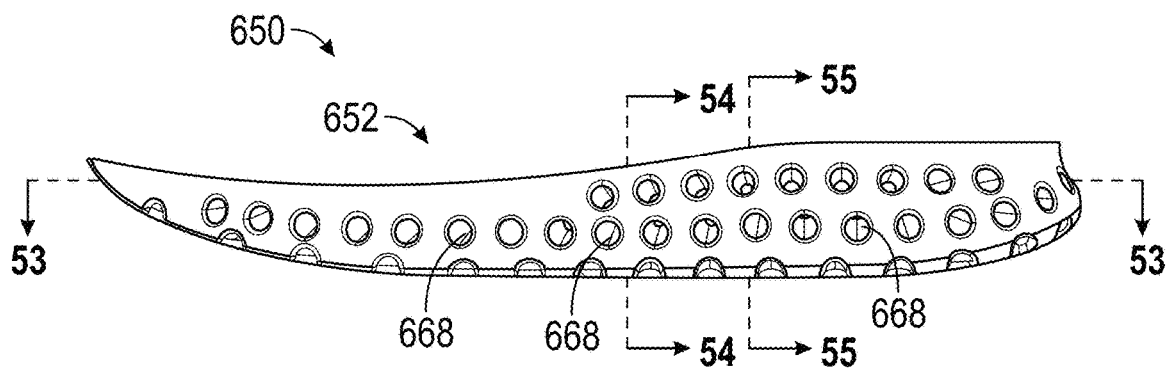
FIG. 52 is a left or lateral side view of the midsole of FIG. 50.
Figure 53:
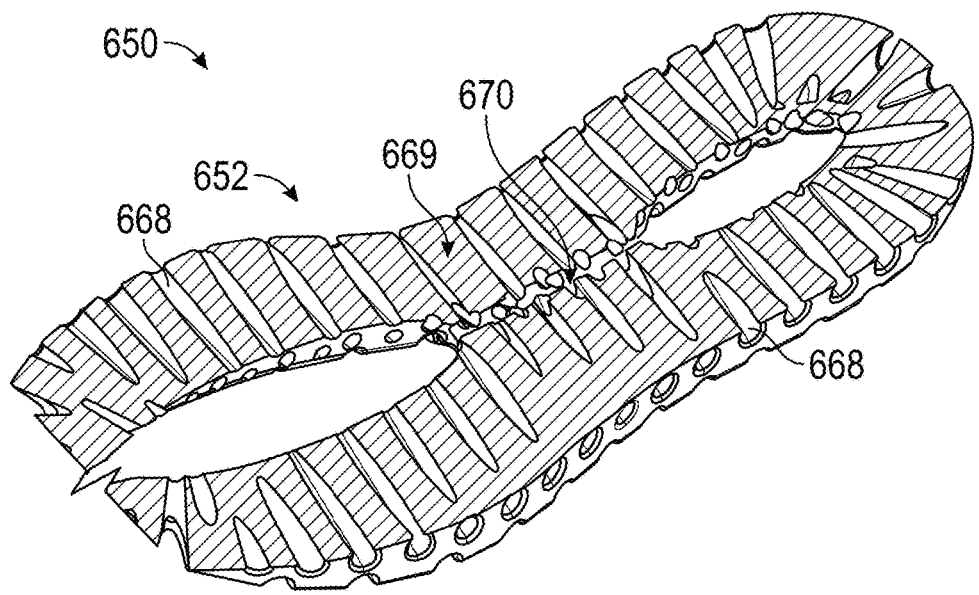
FIG. 53 is a perspective cross-sectional view of the midsole of FIG. 52 taken along line 53-53.
Figures 54, 55:
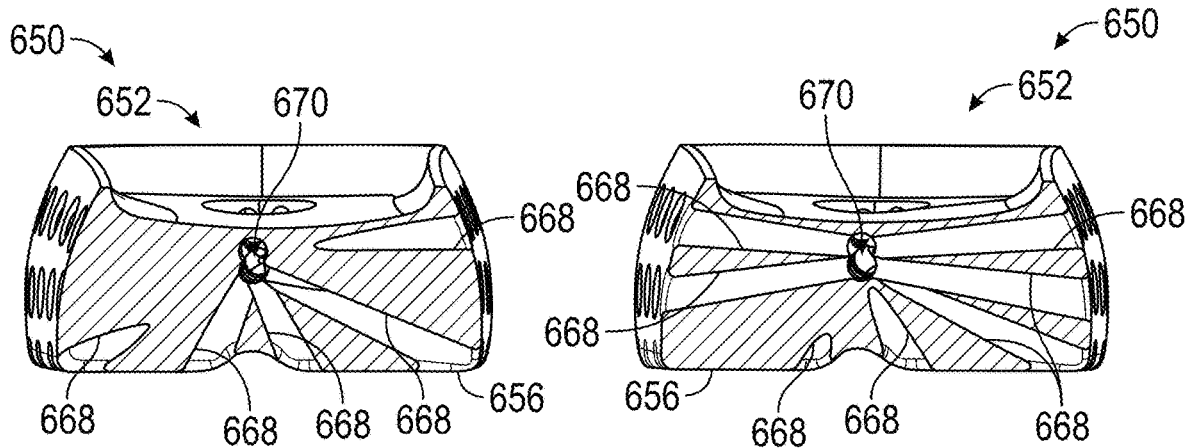
FIG. 54 is a cross-sectional view of the midsole of FIG. 52 taken along line 54-54.
FIG. 55 is a cross-sectional view of the midsole of FIG. 52 taken along line 55-55.

FIGS. 50 and 51 illustrate an embodiment of a midsole 650 according to the present disclosure. In some embodiments, the midsole 650 may be formed from a negative mold that is printed layer by layer according to the method 200 or the method 300. In some embodiments, the midsole 650 may be formed from a sand mold (e.g., the sand mold 572) or a wax mold (e.g., the wax mold 600). In some embodiments, the midsole 650 may be formed from a sand mold (e.g., the sand mold 572) or a wax mold (e.g., the wax mold 600) that is printed layer by layer from a positive model as a negative mold via the method 200 or the method 300. In some embodiments, the midsole 650 may be formed from a resin or plastic mold that is printed layer by layer from a positive model as a negative mold via the method 200 or the method 300.

The midsole 650 includes a body 652 that defines an upper surface 654, a bottom surface 656, and a peripheral surface 658. The body 652 further defines a medial side 659, a lateral side 660, a rear distal end 662, and a front distal end 664. In the illustrated embodiment, the body 652 includes a first internal cutout 664, a second internal cutout 666, a plurality of apertures, tunnels, or channels 668 extending through the body 652, and a middle portion 669 arranged between the first internal cutout 664 and the second internal cutout 666. The first internal cutout 664 defined by a first internal surface 665 and the second internal cutout 666 defined by a second internal surface 667. The first internal cutout 664 and the second internal cutout 666 are arranged internally on the body 652 and may define a generally oval shape. For example, the first internal cutout 664 and the second internal cutout 666 do not extend to or intersect with the peripheral surface 658. In the illustrated embodiment, the first internal cutout 664 and the second internal cutout 666 extend through the body 652 from the upper surface 654 to the bottom surface 656. The first internal cutout 664 is arranged adjacent to the front distal end 664 of the body 652. For example, the first internal cutout 664 may extend through a portion of a forefoot region and a portion of a midfoot region defined by the body 652. The second internal cutout 666 is arranged adjacent to the rear distal end 666 of the body 652. For example, the second internal cutout 666 may extend through a portion of a midfoot region and a portion of a heel region defined by the body 652.

In the illustrated embodiment, the upper surface 654 of the body 652 defines an uninterrupted surface area where the channels 668 do not extend through the upper surface 654. In some embodiments, the channels 668 may extend through the upper surface 654. In the illustrated embodiment, the channels 668 extend to and through the bottom surface 656 and the peripheral surface 658. For example, one or more of the channels 668 extend from the first internal surface 665 to the medial side 659 of the peripheral surface 658, one or more of the channels 668 extend from the first internal surface 665 to the lateral side 660 of the peripheral surface 658, and one or more of the channels 668 extend from the first internal surface 665 to the bottom surface 656. Similarly, one or more of the channels 668 extend from the second internal surface 667 to the medial side 659 of the peripheral surface 658, one or more of the channels 668 extend from the second internal surface 667 to the lateral side 660 of the peripheral surface 658, and one or more of the channels 668 extend from the first internal surface 665 to the bottom surface 656.

Turning to FIGS. 52-55, the middle portion 669 may include a support channel 670 extending therethrough in a direction between the rear distal end 662 and the front distal end 664. In some embodiments, the support channel 670 may be formed by the support beam 581 of the sand mold 572. In some embodiments, the support channel 670 may be formed by the internal segments 606 of the wax mold 600. One or more of the channels 668 may extend through the middle portion 669. For example, one or more of the channels 668 extend from the support channel 670 to the bottom surface 656, one or more of the channels 668 extend from the support channel 670 to the medial side 659 of the peripheral surface 658, and one or more of the channels 668 extend from the support channel 670 to the lateral side 660 of the peripheral surface 658 (see FIGS. 54 and 55).

In general, the formation of apertures, channels, or tunnels in a formed midsole via a negative mold according to the method 200, a negative mold according to the method 300, a wax mold, or a sand mold, or combinations thereof, may provide improved weight properties and improved cushioning properties when compared to conventional midsoles that are prevented from being formed with complex geometrical features.

Figure 56:
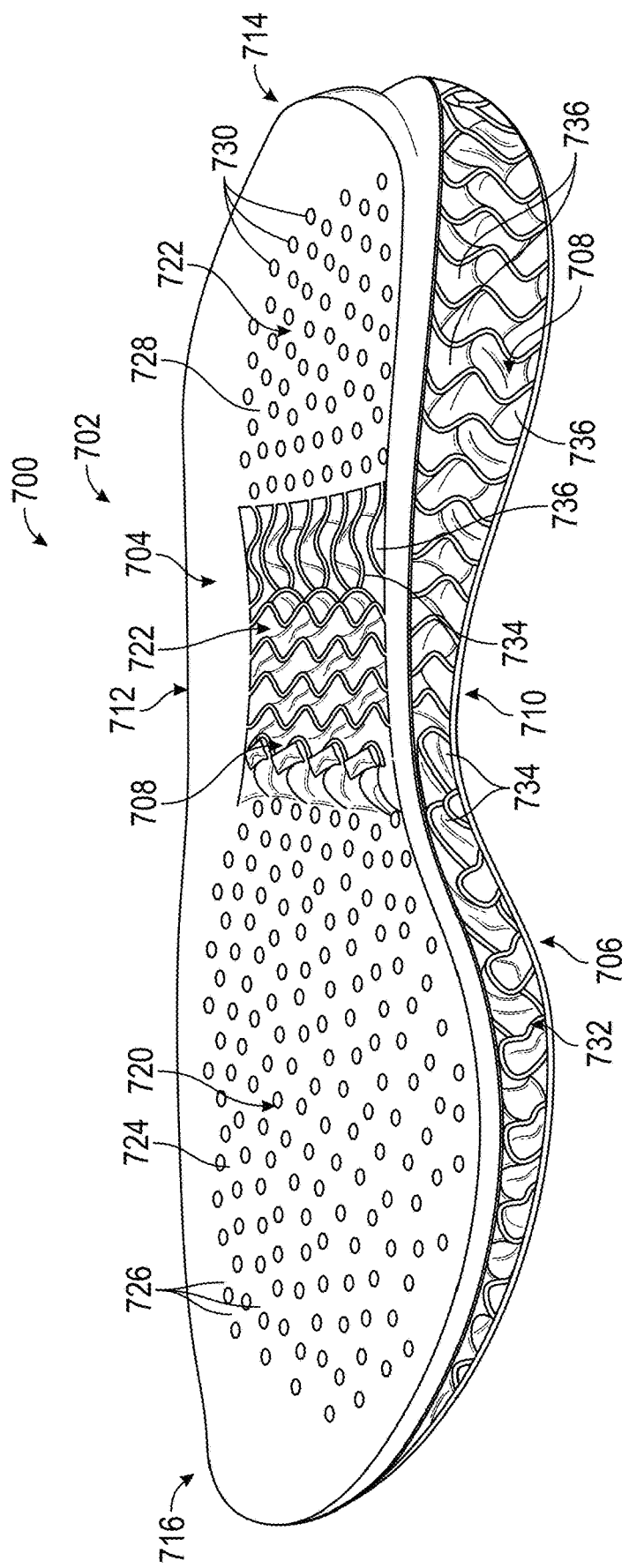
FIG. 56 is a top perspective view of a midsole including a variable pattern according to the present disclosure.

FIG. 56 illustrate an embodiment of a midsole 700 according to the present disclosure. In some embodiments, the midsole 700 may be formed from a negative mold that is printed layer by layer according to the method 200 or the method 300. In some embodiments, the midsole 700 may be formed from a sand mold or a wax mold. In some embodiments, the midsole 700 may be formed from a sand mold or a wax mold that is printed layer by layer from a positive model as a negative mold via the method 200 or the method 300. In some embodiments, the midsole 700 may be formed from a resin or plastic mold that is printed layer by layer from a positive model as a negative mold via the method 200 or the method 300.

In the illustrated embodiment, the midsole 700 includes a body 702 that defines an upper side 704, a bottom side 706, and a lattice structure 708 extending throughout the body 702 and between the upper surface 704 and the bottom surface 706. The body 702 further defines a medial side 710, a lateral side 712, a rear distal end 714, and a front distal end 716. In the illustrated embodiment, the upper surface 704 defines a variable geometric structure that includes a first portion 718, a second portion 720, and a third portion 722. The second portion 720 is arranged between the first portion 718 and the third portion 722. The first portion 718 extends from the front distal end 716 to an intersection between the first portion 718 and the second portion 720. The third portion 722 extends from the rear distal end 714 to an intersection between the third portion and the second portion 720. In some embodiments, the first portion 718 may extend over a forefoot region and at least partially into a midfoot region defined by the body 702. In some embodiments, the second portion 720 may extend at least partially over the midfoot region and into a heel region defined by the body 702. In some embodiments, the third portion 722 may extend at least partially over the heel region defined by the body 702.

The first portion 718 and the third portion 722 define differing geometric structures than the second portion 720. For example, the first portion 718 may include a first support surface 724 having a first plurality of apertures 726 that extend at least partially through the first support surface 724. The plurality of apertures 726 are arranged in an array pattern over the first support surface 724. Similar to the first portion 718, the third portion 722 includes a second support surface 728 having a second plurality of apertures 730 that extend at least partially through the second support surface 728. The second plurality of apertures 730 are arranged in an array pattern over the second support surface 728. The second portion 720 defines a generally open structure that is formed by the lattice structure 708. In other words, the first support surface 724 that extends over the first portion 718 and the second support surface 728 that extends over the third portion 722 may not extend over the second portion 720, and the lattice structure 708 may be visible through the upper side 704 of the body 702 at the second portion 720.

In the illustrated embodiment, the lattice structure 708 includes a unit cell 732 that is formed by interconnected surfaces or segments 734 that define one or more openings voids, apertures, channels, tunnels, or passages 736 that extend through the body 702. In some embodiments, the interconnected surfaces 734 may define minimal surfaces. In some embodiments, the interconnected surfaces 734 may define triply periodic minimal surfaces (e.g., a gyroid). In general, the use of a differential geometry structure (e.g., a gyroid) may reduce stress concentration formed along the midsole 700 due to the reduction in sharp edges formed in the body 702, which provides improved cushioning performance in the midsole 700. In addition, the variable geometries defined along the upper side 704 provides added support in regions of high force/pressure along the midsole 700. For example, the first support surface 724 may provide additional support to the forefoot region (e.g., under the ball of a user's foot and/or under the toes of a user) and the second support surface 728 may provide additional support to the heel region (e.g., under a user's heel). The added support provided by the first support surface 724 and the second support surface 728 may aid in spreading out or distributing the pressure/force exerted thereon over the lattice structure 708 and further leverage the improved cushioning properties of the lattice structure 708.

Figure 57:
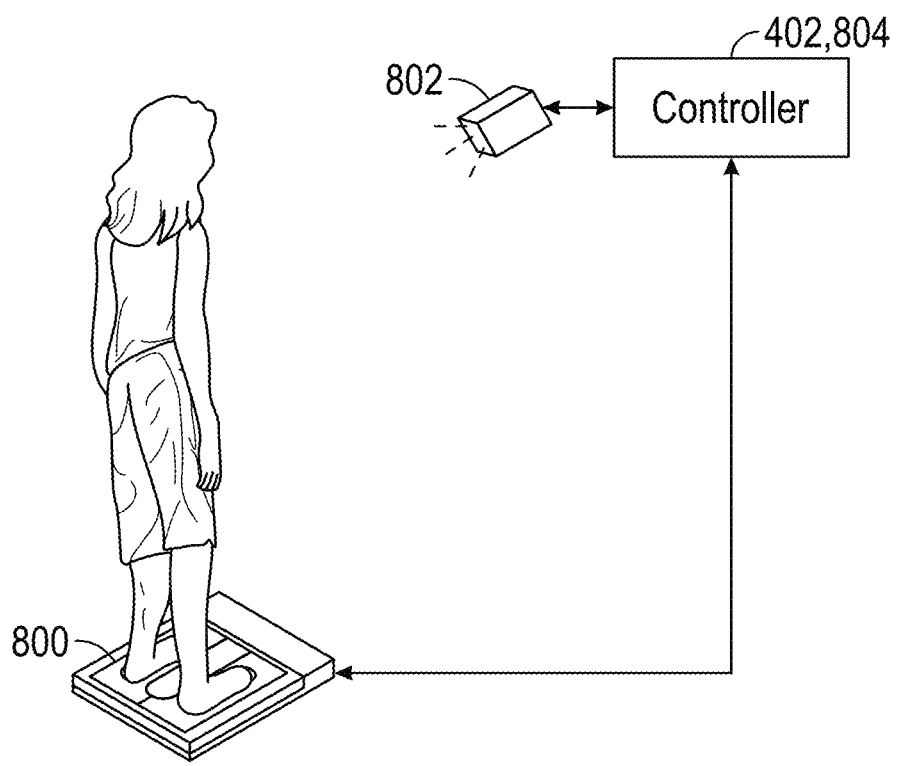
FIG. 57 is a schematic illustration of a process of measuring a user's stationary characteristics.
Figure 58:
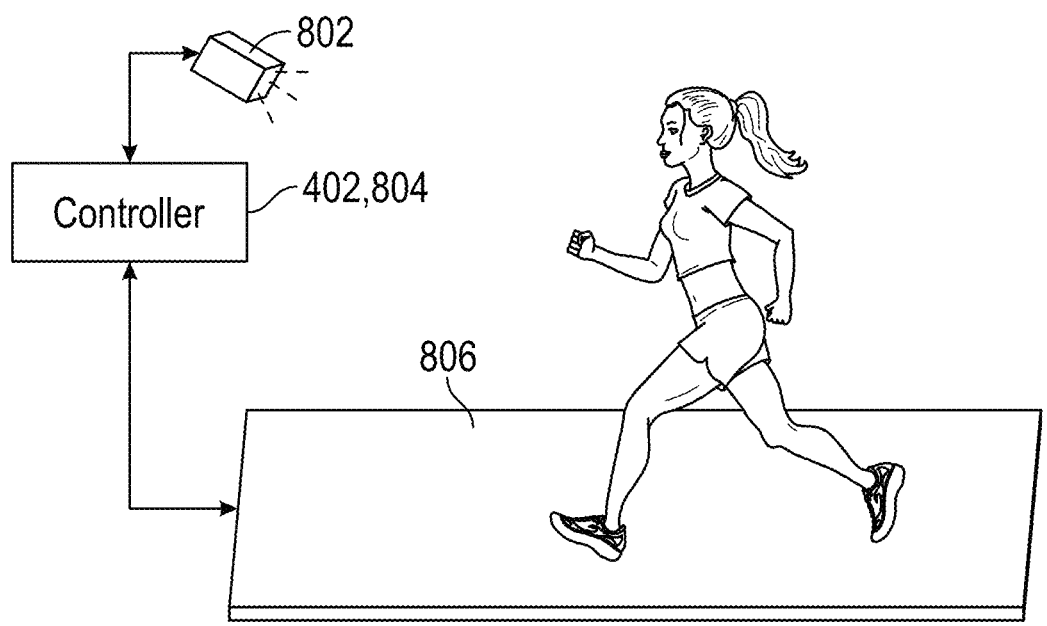
FIG. 58 is a schematic illustration of a process of measuring a user's running characteristics.

Turning to FIGS. 57 and 58, a mold according to the present disclosure may be printed layer by layer having a structure that is based on or determined by a user's physical characteristics. A method for forming a mold or for manufacturing a midsole of an article of footwear may include measuring a user's physical characteristics while stationary (see FIG. 56). In some embodiments, a user's physical characteristics while stationary may include a weight measured by a scale 800. Alternatively or additionally, a user's pressure points (e.g., force over area of the user's feet) may be measured by the scale 800, and the user's body may be scanned by an imaging sensor 802. In some embodiments, the imaging sensor 802 may be a 2-D camera that may capture an outline of a user's body and a controller 804 may process the outline the determine a users height and other geometric characteristics (e.g., leg length, distance between knee and hip, distance between knee and ankle, etc.). The controller 804 may include a processor with memory that includes instructions, which are carried out by the processor. In some embodiments, the imaging sensor 802 may be a 3-D camera (e.g., time-of-flight camera) that may capture a 3D scan of a user's body to measure the user's height, leg length, distance between knee and hip, distance between knee and ankle, etc. The weight and pressure points captured by the scale 800 and the user's physical characteristics measured by the imaging sensor 802 may be communicated to the controller 804.

After the users physical characteristics while stationary are measured, the user may run on a pressure mapping platform 806 and pressure mapping data may be captured and communicating to the controller 804 (see FIG. 58). Alternatively or additionally, the imaging senor 802 may capture the user's body posture while running on the pressure mapping platform 806. The controller 804 may process the posture data to determine the user's gate while running. The stationary data and the running data communicated to the controller 804 may be processed to customize a midsole that conforms to the user's stationary and running characteristics. For example, the mold generating system 400 (see FIG. 20) may be used to print a mold layer by layer that includes a solid volume that results in the formation of a lattice structure or one or more apertures, tunnels, openings, channels, or voids in the formed midsole. In these embodiments, the controller 804 may be the controller 402 from the mold generating system 400. Alternatively, the controller 402 may be in communication with the controller 804 and the stationary and running data measured may be communicated to the controller 804 from the controller 402. The solid volume defined by the midsole may be customized geometrically (e.g., size, shape, density, etc.) to conform to the user's stationary and running characteristics.

Once the mold is printed, a midsole material may be injected or poured into the mold and the midsole material forming around the solid volume of the mold may form the lattice structure or one or more apertures, tunnels, openings, channels, or voids in the midsole. In some embodiments, the midsole may be formed integrally with a sole. In some embodiments, the midsole may be attached to a sole after forming. The combined midsole and sole may be assembled to an upper to form an article of footwear, and the article of footwear may be provided to the user.

Any of the embodiments described herein may be modified to include any of the structures or methodologies disclosed in connection with different embodiments. Further, the present disclosure is not limited to articles of footwear of the type specifically shown. Still further, aspects of the articles of footwear of any of the embodiments disclosed herein may be modified to work with any type of footwear, apparel, or other athletic equipment.

As noted previously, it will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:

1. A method for manufacturing a midsole of an article of footwear, the method comprising:
   generating a positive model of a midsole, wherein the positive model includes a lattice structure defining a region of empty volume;
   creating a negative model based on the region of empty volume of the positive model;
   printing, layer by layer, a negative mold to form a physical representation of the negative model, wherein the negative mold includes a region of solid volume that corresponds with the region of empty volume in the positive model;
   supplying a midsole material to the negative mold to form the midsole, wherein the midsole includes a midsole lattice structure formed therein by the region of solid volume in the negative mold; and
   removing the negative mold from the midsole.

2. The method of claim 1, wherein the region of solid volume in the negative mold defines a mold repeating pattern that is based on the lattice structure in the positive model.

3. The method of claim 2, wherein the midsole includes the midsole lattice structure with a midsole unit cell that is formed by the mold repeating pattern and that includes the midsole aperture or channel.

4. The method of claim 1, further comprising:
   arranging the negative mold within a mold base; and
   enclosing the negative mold within the mold base using a cover plate.

5. The method of claim 1, wherein the region of empty volume in the positive model is defined by an inner surface, and wherein the inner surface is a minimal surface in a gyroid pattern.

6. The method of claim 1, wherein the negative mold defines a scaled down size relative to a final size of the midsole, and wherein the scaled down size is between about 70% and about 30% smaller than the final size.

7. The method of claim 6, further comprising:
   expanding the midsole from the scaled down size to the final size.

8. The method of claim 1, wherein the negative mold is at least one of mechanically, chemically, and thermally released from the formed midsole.

9. A method for manufacturing a midsole of an article of footwear, the method comprising:
   generating a positive model of a midsole, wherein the positive model includes a lattice structure with a surface defining an aperture or channel;
   creating a negative model based on the positive model;
   printing, layer by layer, a negative mold to form a physical representation of the negative model, wherein the negative mold includes a region of solid volume that corresponds with the aperture or channel in the positive model;
   arranging the negative mold within a mold base;
   supplying a midsole material to the negative mold and the mold base, so that the midsole material expands throughout and fills the negative mold;
   forming a midsole from the midsole material expanded throughout the negative mold, wherein the midsole material expanding around the negative mold forms a midsole with the lattice structure in the midsole; and
   removing the negative mold from the midsole.

10. The method of claim 9, wherein the positive model includes the lattice structure with a unit cell that defines a repeating pattern, and wherein the repeating pattern includes the aperture or channel.

11. The method of claim 9, wherein the region of solid volume in the negative mold defines a mold repeating pattern that is based on the lattice structure in the positive model.

12. The method of claim 11, wherein the midsole includes a midsole lattice structure with a midsole unit cell that is formed by the mold repeating pattern and that includes a midsole aperture or channel.

13. The method of claim 9, further comprising:
   enclosing the negative mold within the mold base using a cover plate.

14. The method of claim 9, wherein the negative mold defines a scaled down size relative to a final size of the midsole, and wherein the scaled down size is between about 70% and about 30% smaller than the final size.

15. A method for manufacturing a midsole of an article of footwear, the method comprising:
   generating a positive model of a midsole, wherein the positive model includes a lattice structure;
   creating a negative model based on the positive model;
   printing, layer by layer, a scaled negative mold to form a physical representation of the negative model, wherein the scaled negative mold includes a region of solid volume that corresponds with a region of empty volume of the lattice structure in the positive model, and wherein the scaled negative mold defines a scaled down size relative to a final size of the midsole;
   arranging the negative mold within a mold base;
   supplying a midsole material to the scaled negative mold, so that the midsole material expands throughout and fills the scaled negative mold;
   forming the midsole from the midsole material expanded and filled throughout the scaled negative mold, wherein the midsole material expanding around the scaled negative mold forms a midsole lattice structure in the midsole;
   removing the scaled negative mold from the midsole; and
   expanding the midsole from the scaled down size to a final size.

16. The method of claim 15, wherein the scaled down size is between about 70% and about 30% smaller than the final size.

17. The method of claim 15, wherein the positive model includes the lattice structure with a unit cell that defines a repeating pattern, and wherein the repeating pattern includes an aperture or channel.

18. The method of claim 17, wherein the region of solid volume in the scaled negative mold defines a mold repeating pattern that is based on the lattice structure in the positive model.

19. The method of claim 18, wherein the midsole includes a midsole lattice structure with a midsole unit cell that is formed by the mold repeating pattern and that includes a midsole aperture or channel.

20. The method of claim 15, further comprising:
   arranging the scaled negative mold within a mold base by printing, layer by layer, the negative mold and the mold as a unitary component.

21. The method of claim 15, further comprising:
   enclosing the negative mold within the mold base using a cover plate.

* * * * *